United States Patent [19]
Sakamoto et al.

[11] Patent Number: 5,980,420
[45] Date of Patent: Nov. 9, 1999

[54] CONTROL SYSTEM FOR TOROIDAL TYPE CONTINUOUSLY VARIABLE TRANSMISSION

[75] Inventors: Haruo Sakamoto, Higashihiroshima; Hidenao Takedomi, Hiroshima; Kazuhiko Ueda, Hatsukaichi; Toshihiko Osumi, Higashihiroshima, all of Japan

[73] Assignee: Mazda Motor Corporation, Hiroshima-ken, Japan

[21] Appl. No.: 09/046,263

[22] Filed: Mar. 23, 1998

[30] Foreign Application Priority Data

Mar. 22, 1997 [JP] Japan .................................. 9-087772
Jan. 29, 1998 [JP] Japan .................................. 10-033951

[51] Int. Cl.$^6$ .......................... B60K 41/12; F16H 61/30; F16H 15/38
[52] U.S. Cl. .................................................. 476/10; 477/50
[58] Field of Search ................................ 476/10; 477/50

[56] References Cited

U.S. PATENT DOCUMENTS 4,772,249  9/1988  Kouno et al. ............................. 474/28
5,194,052  3/1993  Ueda et al. ............................... 474/66
5,707,313  1/1998  Suzuki ..................................... 476/10

FOREIGN PATENT DOCUMENTS

0431771A2  6/1991  European Pat. Off. .
0507329A2  10/1992 European Pat. Off. .
0728965A2  8/1996  European Pat. Off. .
3-223555   10/1991 Japan .
6-101754   4/1994  Japan .

OTHER PUBLICATIONS

European Search report, EP 98 10 5232, dated Dec. 21, 1998.

Primary Examiner—Allan D. Herrmann
Attorney, Agent, or Firm—Sidley & Austin; Hugh A. Abrams

[57] ABSTRACT

A toroidal type continuously variable transmission whose gear ratio is varied by changing the position of a trunnion is provided with double-slider valves driven by stepping motors and linear solenoid valves. The gear ratio control is performed by controlling position of the double-slider valves when the vehicle travels at speeds higher than a specified speed or by controlling directly line and relief pressures applied to the trunnion through the solenoid valves.

48 Claims, 33 Drawing Sheets

| | STEEP ← DOWN-GRADE → GENTLE | | | | | FLAT | STEEP ← UP-GRADE → GENTLE | | | | |
|---|---|---|---|---|---|---|---|---|---|---|---|
| K | K1 | K2 | K3 | K4 | K5 | K0 | K6 | K7 | K8 | K9 | K10 |
| Tcd | 0 | 0 | 0 | 0 | 0 | 0 | Tcd1 | Tcd2 | Tcd3 | Tcd4 | Tcd5 |
| Prf | 0 | 0 | 0 | 0 | 0 | Prf0 | Prf1 | Prf2 | Prf3 | Prf4 | Prf5 |
| Tcd1 < Tcd2 < Tcd3 < Tcd4 < Tcd5  Prf0 > Prf1 > Prf2 > Prf3 > Prf4 > Prf5 ||||||||||||

CONTROL SYSTEM FOR TOROIDAL TYPE CONTINUOUSLY VARIABLE TRANSMISSION

BACKGROUND OF THE INVENTION

The invention relates to a control system for a continuously variable transmission.

Toroidal type continuously variable transmissions have recently been practiced. Such a toroidal type continuously variable transmission includes a roller interposed between input and output toroidal disks. Gear ratio of the CVD is varied by inclining the roller relative to the input and output toroidal disks to continuously vary the rate of torque transmission between the input and output toroidal disks. One of this type of toroidal type CVDs, such as described in, for example, Japanese Unexamined Patent Publications Nos. 3-223555 and 6-101754, is characterized in what is called a geared neutral starting system. In the toroidal type continuously variable transmission equipped with this system, the toroidal continuously variable transmission mechanism is mounted on a transmission input shaft connected to the engine, and a planetary gear set is mounted on a secondary shaft in parallel to the input shaft. The planetary gear set is comprised of three rotary elements, namely a sun gear, an internal gear and a pinion carrier supporting a pinion gear meshed with the sun gear and the internal gear. One of these rotary elements, i.e. the internal gear is used as an transmission output gear. Rotation of engine is imparted to the planetary gear set partly directly through the pinion carrier and partly through the sun gear via the toroidal continuously variable transmission mechanism.

The ratio of rotation between the pinion carrier and the sun gear is varied by controlling the gear ratio of the toroidal type continuously variable transmission mechanism so as to hold the transmission output element, i.e. the sun gear, remain stand still, providing a neutral condition. By increasingly or decreasingly varying the gear ratio of the continuously variable transmission mechanism causes the internal gear as the transmission output element to rotate in a forward direction or in a reverse direction. This type of toroidal continuously variable transmission permits the vehicle to start forward or back without use of a clutch and/or torque converter, which yields improvement of responsibility and power transmission efficiency of the toroidal continuously variable transmission.

The toroidal continuously variable transmission mechanism is controlled to vary its gear ratio so as to gain a target overall transmission gear ratio or to provide a target engine speed which is obtained from a control map which defines gear ratio change patterns according to vehicle speeds and throttle positions. As is known in the art, the gear ratio of the toroidal continuously variable transmission mechanism is varied by controlling angles of the roller with respect to the toroidal surface of the input and output disks. For this control, the toroidal continuously variable transmission mechanism is provided with two hydraulic piston chambers extending in a direction in which a trunnion moves with respect to the input and output disks to incline the roller, these hydraulic piston chambers being supplied with hydraulic line pressure and relief pressure, respectively. The trunnion is moved according to the difference in pressure between these hydraulic piston chambers. Double-slider shift valves are disposed in hydraulic lines leading to the hydraulic piston chambers from a line pressure regulation valve and a relief valve regulation valve, respectively. The pressure difference between the two hydraulic piston chambers is varied by controlling these double-slider valves.

The double-slider valve, which is generally comprised of a valve body, a valve sleeve movable in the valve body and a valve spool movable in the valve sleeve, shifts the sleeve to control and regulate the line pressure or the relief pressure so as to vary the pressure difference between the two hydraulic piston chambers. Accordingly, it is desirable that the shift distance of valve sleeve and the pressure difference unconditionally accord with each other for precise gear ratio control. While if there is an unconditional relationship between them, controlling the shift distance of the valve sleeve of a double-slider valves causes an overall range of gear ratios of the toroidal continuously variable transmission mechanism, whereas, it is difficult to control the shift distance of the valve sleeve due to frictional distance which is usually different according to directions in which the valve sleeve shifts, as a result of which the same shift distance does not always provide the same pressure difference. That is, the movement of the valve sleeve is subject to a hysteresis too significant to make desirably precise control of the pressure difference. In particular, in the event where the desired pressure difference is not developed at a geared neutral position which is a switching point for a directional reversal of output rotation of the toroidal continuously variable transmission mechanism, the toroidal continuously variable transmission mechanism causes reverse rotation even while the vehicle is moving forward at a low speed or forward rotation even while moving back at a low speed.

SUMMARY OF THE INVENTION

It is an objective of the invention to provide a control system for a toroidal type continuously variable transmission in which a trunnion of a continuously variable transmission mechanism is precisely controlled to vary a transmission gear ratio.

The foregoing objects of the present invention are achieved by providing a control system for controlling a toroidal type continuously variable transmission which is comprised of a rotary input disk having a torus surface and connected to a drive apparatus, such as a combustion engine, an electric motor and a combination of an combustion engine and an electric motor, of an automotive vehicle, a rotary output disk having an torus surface facing said rotary input disk through which driving force is transmitted to drive wheels of the automotive vehicle, a roller interposed between and in contact with the torus surface of the input and rotary output disks for transmitting rotation to the rotary output disk from the rotary input disk at a variable transmission ratio, and a roller support for supporting the roller which has first hydraulic drive means shown in the preferred embodiment as hydraulic pressure chamber $116_1$ and associated piston $114_1$ and hydraulic pressure chamber $116_2$ and associated piston $114_2$ for hydraulically driving the roller to vary an angle of inclination of the roller with respect to the input and rotary output disks in one direction so as to increase the transmission ratio and second hydraulic drive means shown in the preferred embodiment as hydraulic pressure chamber $115_1$ and associated piston $113_1$ and hydraulic pressure chamber $115_2$ and associated piston $113_2$ for hydraulically driving the roller to vary the angle of inclination of the roller with respect to the input and rotary output disks in another direction so as to decrease the transmission ratio. The control system is comprised of first hydraulic pressure generating means shown in the preferred embodiment as regulator valve 202 for generating and supplying a first hydraulic pressure to the first and second hydraulic drive means, second hydraulic pressure generating means shown in the preferred embodiment as relief valve 204 for generating and supplying a second hydraulic pressure lower than the first hydraulic pressure to the first and second hydraulic drive means, valve means such as a double slider valve shown in the preferred embodiment as the combination of forward shift valve 200 and reverse shift valve 230 for switching the supply of hydraulic pressure to the first and second hydraulic drive means between the first and second hydraulic pressures, hydraulic pressure varying means for varying at least one of the first and second hydraulic pressures, driving condition detecting means for detecting driving conditions of the vehicle including at least a value relating to a ratio of rotation between the drive apparatus and the drive wheels, and control means for controlling the valve means and the hydraulic pressure varying means according to the driving conditions to vary the transmission ratio, the control means controlling the valve means to vary the transmission ratio when the value indicates that the ratio of rotation is lower than a specified ratio for low speed control and controlling the hydraulic pressure varying means to vary the transmission ratio when the value indicates that the ratio of rotation is higher than the specified ratio.

The valve means is comprised of a valve body having a first pressure outlet port in communication with the first hydraulic drive means, a second pressure outlet port in communication with the second hydraulic drive means, a first pressure inlet port in communication with the first hydraulic pressure generating means, and a second pressure inlet port in communication with the second hydraulic pressure generating means, and slide means received for axial movement in the valve body and brings selectively the first and second pressure inlet ports into communication with both the first and second pressure outlet ports. The slide means varies an inter-communication openings between the first and second pressure inlet ports and second pressure outlet ports according to axial position depending on which the ratio of rotation between the drive apparatus and the drive wheels varies. The slide means may be comprised of a first slide member axially movable in the valve body and a second slide member axially movable in the valve body relative to the first slide member. When the first slide member is moved in one direction to bring selectively the first and second pressure inlet ports into communication with both the first and second pressure outlet ports, the second slide member is moved in the same direction as the one direction following the inclination of the roller to shut off communication between the first and second pressure inlet ports and the first and second pressure outlet ports. Further, two valve means may be provided, one of which is caused to operate only while the vehicle moves forward and the other is caused to operate only while the vehicle moves back.

The control means fixes the first movable member at an position where the valve means provides the specified ratio when the value indicates that the ratio of rotation is higher than the specified ratio so as to change operation of the hydraulic pressure varying means, thereby varying the transmission ratio between the input and rotary output disks.

The position of the slide means may be detected as the value. The control means controls operation of the valve means to vary the transmission ratio between the input and rotary output disks when the position indicates that the ratio of rotation is lower than the specified ratio and controls operation of the hydraulic pressure varying means to vary the transmission ratio between the input and rotary output disks ratio when the position indicates the position indicates that the ratio of rotation is higher than the specified ratio.

Otherwise, the vehicle speed of the automotive vehicle may be detected as the value. The control means controls the valve means to vary the transmission ratio when the vehicle speed is higher than a specified speed and controls the hydraulic pressure varying means to vary the transmission ratio when the vehicle speed is lower than the specified ratio.

The control means may control the second hydraulic pressure varying means to vary the second hydraulic pressure so as to vary the transmission ratio between the input and rotary output disks ratio when the value indicates the position indicates that the ratio of rotation is higher than the specified ratio.

In the control system for the toroidal type continuously variable transmission, the gear ratio control is performed by controlling supply of hydraulic pressure to the drive means of the continuously variable transmission mechanism through the double slide valve when the gear ratio is lower than a specified low ratio or when the vehicle speed is higher than a specified speed, and by controlling the hydraulic pressure generating means when the gear ratio is higher than the specified low ratio or when the vehicle speed is lower than the specified speed. As a result, the gear ratio controlled is stably and accurately performed without being accompanied with hysteresis, which is more significant in the geared neutral starting type of continuously variable transmission. In the case where the gear ratio control is performed by the difference between line pressure and relief pressure applied to the trunnion driving means, controlling the pressure which is lower than the other makes it precise to regulate the pressure difference. Further, the continuously variable transmission starting from the geared neutral position is prevented from being placed in reverse state when the vehicle starts to move forward.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Mechanical Control

Figure 1:
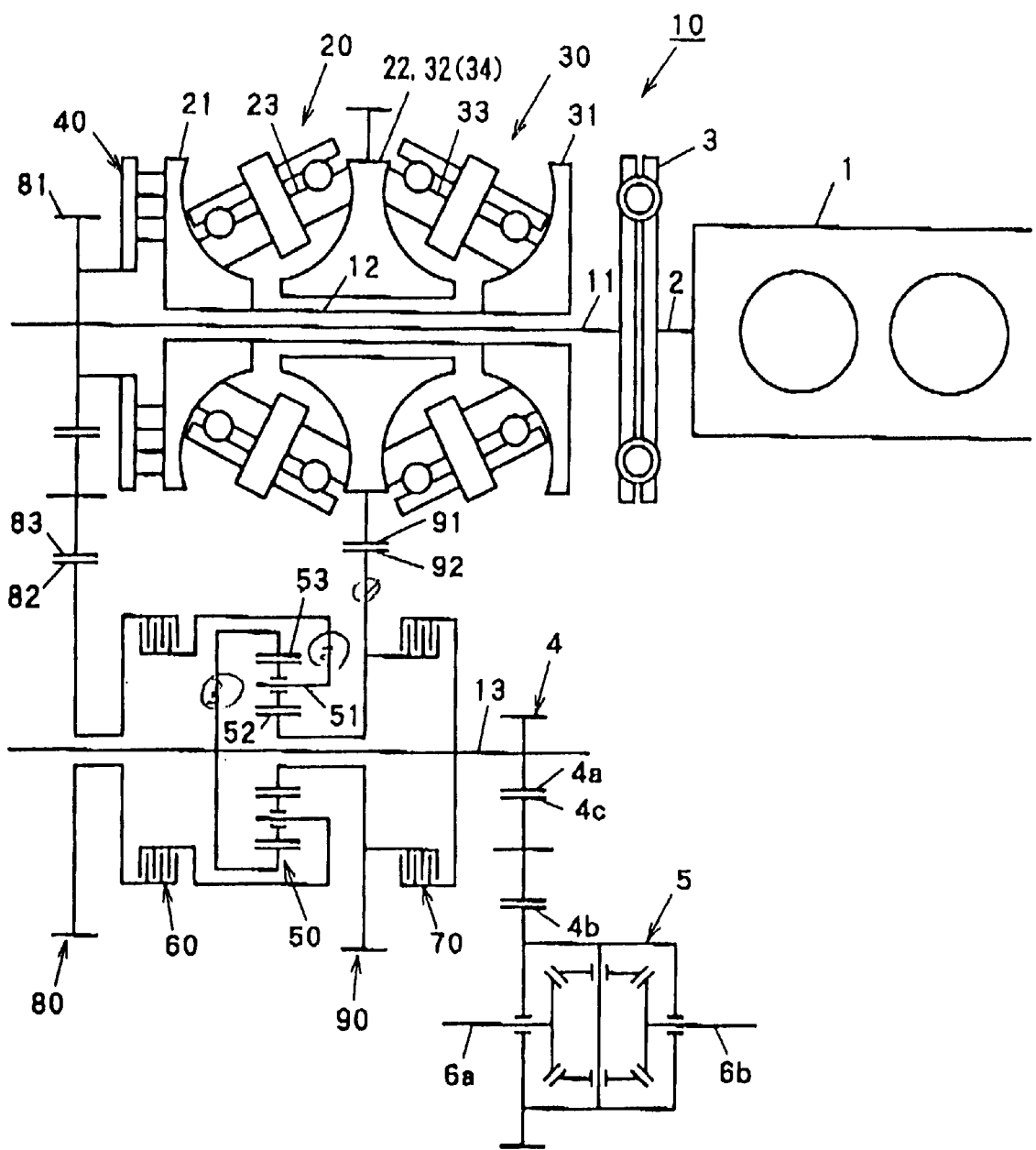
FIG. 1 is a skeleton view of a toroidal type continuously variable transmission controlled by a control system in accordance with an embodiment of the invention.

Referring to the drawings in detail and, in particular, to FIG. 1 showing a toroidal type continuously variable transmission (CVT) 10 with a control system in accordance with an embodiment of the invention, the continuously variable transmission 10 has three shafts, namely an input shaft (first shaft) 11 connected to an output shaft 2 of an engine 1 through a torsional damper 3, a hollow primary shaft (third shaft) 12 in which the output shaft 11 is coaxially disposed and a secondary shaft (second shaft) 13 disposed in parallel to the primary shaft 12. These transmission shafts 11–13 extend transversely in the vehicle body. The primary shaft 12 mounts thereon a toroidal type first or rear and second or front continuously variable transmission mechanisms 20 and 30 in order from a side remote from the engine 1 and a loading cam 40. The secondary shaft 13 mounts thereon a planetary gear set 50 and two clutches, namely a low mode clutch 60 and a high mode clutch 70. There are low and high mode gear trains 80 and 90 between input shaft 11 and the secondary shaft 13. The toroidal type first and second continuously variable transmission mechanisms 20 and 30 have the same mechanism. Each toroidal type continuously variable transmission mechanism 20, 30 comprises an input disk 21, 31, an output disk 22, 32 and a pair of first and second roller 23, 33 between the input and output surfaces to transmit driving power from one to another. The input disks 21 and 31 are mounted on the primary shaft 12 by means of spline-engagement. The output disks 22 and 32 are formed integrally as one whole, which is hereafter referred to as an integrated output disk 34.

First continuously variable transmission mechanism 20 is placed to direct the face of the input disk 21 toward the engine 1, and, however, the second continuously variable transmission mechanism 30 is placed to direct the face of the output disk 32 toward the engine 1. The input disks 21 and 31 of the first and second continuously variable transmission mechanisms 20 and 30 are fixedly mounted to opposite ends of the primary shaft 12, respectively, and the output disks 22 and 32 of the first and second continuously variable transmission mechanisms 20 and 30 are mounted for rotation on the primary shaft 12.

The input shaft 11 is provided with a low mode first gear 81 forming a part of the low mode gear train 80 secured to one end thereof remote from the engine 1 and the loading cam 40 between the low mode first gear 81 and the first continuously variable transmission mechanism 20. The integrated output disk 34 is provided with an peripheral first high mode gear 91 forming a part of the high mode gear train 90. The secondary shaft 13 mounts thereon for rotation a low mode second gear 82 forming a part of the low mode gear train 80 and a high mode second gear 92 for forming a part of the high mode gear train 90. These first and second low mode gears 81 and 82 of the low mode gear train 80 are connected through a high mode idle gear 83, and similarly, these high mode first and second gears 91 and 92 of the high mode gear train 90 are connected through a high mode idle gear 93. The secondary shaft 13 mounts thereon the planetary gear set 50 having a sun gear 52 meshed with the high mode second gear 92 and an internal gear 53 secured to the secondary shaft 13. The high mode clutch 70 is placed adjacent to the high mode second gear 92 to connect the high mode second gear 92 to the secondary shaft 13 and disconnect the high mode second gear 92 from the secondary shaft 13. The secondary shaft 13 at one of its end is connected to a differential 5 by means of an output gear train 4 comprising first and second gears 4a and 4b. Driving power is transmitted to right and left wheel drive axles 6a and 6b through the differential 5.

Hydraulic Control Circuit

As was previously described, because the continuously variable transmission mechanisms 20 and 30 have the same mechanism, the following description is relating to the continuously variable transmission mechanism 20 only.

Figure 3:
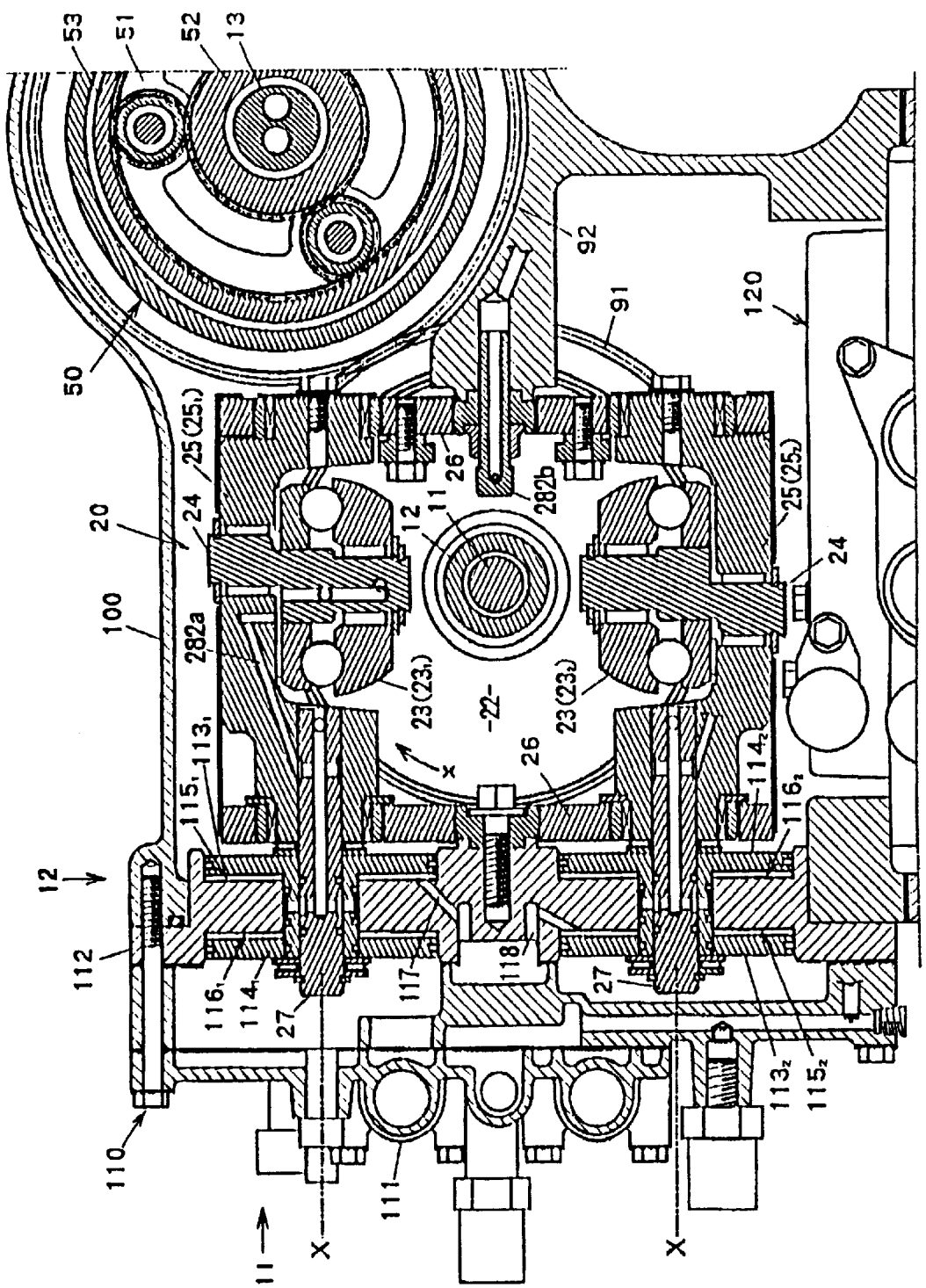
FIG. 3 is a cross-sectional view of FIG. 2 taken along line 3—3.

Referring to FIG. 3 in detail, each roller 22, 23 is supported by a trunnion 25 through a shaft 24 radially extending. Each roller 22, 23 at its both ends is in contact with the spherical surface defined by the toroidal surfaces of the input and output disks 21 and 22 in diametrically opposite positions. The first and second rollers 22 and 23 are placed in the same plane passing the rotational center axis of the input shaft 12 and on opposite sides of the rotational center axis of the input shaft 12. The trunnion 25 is held at axially opposite sides by supports 26 so as to rotate about a horizontal axis X tangential to the toroidal surface and perpendicular to the shafts 24 and to move back and forth along the axis X. The trunnion 25 is provided with a trunnion rod 27 extending in a direction of the axis X. The roller 23 is rolled by means of a speed change control unit 110 secured to the transmission housing 100 through the trunnion 25 and trunnion rod 27.

The speed change control unit 110 includes a hydraulic control section 111 and a trunnion drive section 112. The trunnion drive section 112 includes a piston $113_1$ and a piston $114_1$ both of which are attached to the rod 27 for the first roller $23_1$ and a piston $113_2$ and a piston $114_2$ both of which are attached to the rod 27 for the second roller $23_2$. Hydraulic pressure chambers $115_1$ and $116_1$ are formed facing to the first piston $113_1$ and the first piston $114_1$, respectively, and similarly, hydraulic pressure chambers $115_2$ and $116_2$ are formed facing to the second piston $113_2$ and the second piston $114_2$, respectively. The hydraulic pressure chamber $115_1$ for the first piston $113_1$ is placed close to the first roller $23_1$ and the hydraulic pressure chamber $116_1$ for the first piston $113_1$ is placed far from the first roller $23_1$. On the other hand, the hydraulic pressure chamber $116_2$ for the second piston $113_2$ is placed close to the second roller $23_2$ and the hydraulic pressure chamber $115_2$ for the second piston $113_2$ is placed far from the first roller $23_1$. Hydraulic pressure provided by the hydraulic control section 111 is delivered into the hydraulic pressure chambers $115_1$ and $115_2$ through oil paths 117 and 118, respectively, for and into the hydraulic pressure chambers $115_1$ and $116_2$ through oil paths (not shown).

In hydraulic pressure delivery control for the continuously variable transmission mechanism 20 by way of example, when the hydraulic pressure PH in the first and second hydraulic pressure chambers $115_1$ and $115_2$ becomes higher than a neutral level and relatively to the hydraulic pressure PL in the first and second reduction hydraulic pressure chambers $116_1$ and $116_2$, the first trunnion $25_1$ is forced to move horizontally toward the right as viewed in FIG. 3 and the second trunnion $25_2$ is forced toward the left. If the output disk 22 is rotating in a clockwise direction as viewed in FIG. 3, the first roller $23_1$ receives downward force from the output disk 22 and upward force from the input disk 21 rotating in a counterclockwise direction during moving toward the right, and conversely the second roller $23_2$ receives upward force from the output disk 22 and downward force from the input disk 21 during moving toward the left. As a result, both rollers $23_1$ and $23_2$ incline so as to shift their contact points with toroidal surfaces of the input disk 21 radially outward and their contact points with toroidal surfaces of the output disk 22 radially inward, thereby changing the continuously variable transmission mechanism 20 to a lower transmission gear ratio. On the other hand, when the hydraulic pressure PL in the first and second reduction hydraulic pressure chambers $116_1$ and $116_2$ becomes higher than a neutral level and relatively to the hydraulic pressure PH in the first and second speed increase pressure chambers $115_1$ and $115_2$, the first trunnion $25_1$ is forced to move horizontally toward the left as viewed in FIG. 3 and the second trunnion $25_2$ is forced toward the right. At this time, the first roller $23_1$ receives upward force from the output disk 22 and downward force from the input disk 21 during moving toward the left, and the second roller $23_2$ receives downward force from the output disk 22 and upward force from the input disk 21 during moving toward the left. As a result, both rollers $23_1$ and $23_2$ incline so as to shift their contact points with toroidal surfaces of the input disk 21 radially inward and their contact points with toroidal surfaces of the output disk 22 radially outward, thereby changing the continuously variable transmission mechanism 20 to a higher transmission gear ratio. Controlling of the hydraulic pressure PH or PL will be described in detail later with reference to a hydraulic control circuit 200 shown in FIG. 10.

Operation of the continuously variable transmission mechanism 30 occurs in the same way as described above regarding the continuously variable transmission mechanism 20.

Because the splined input disks 21 and 22 are placed on opposite splined ends of the primary shaft 12, respectively, and the output disks 22 and 32 are integrated, the first and second continuously variable transmission mechanisms 20 and 30 always have same input speed and output speed, and provide always the same transmission gear ratio.

Figure 4:
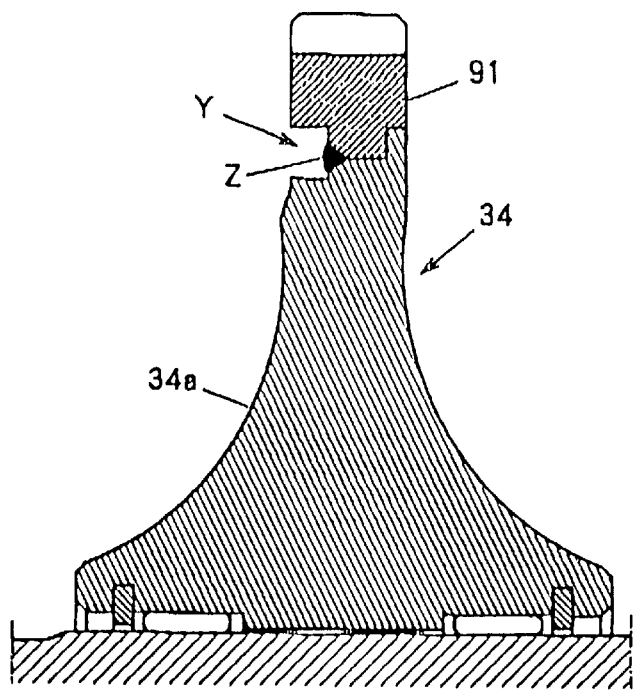
FIG. 4 is an explanatory view showing installation of a gear forming a high mode gear train.

As shown in FIG. 4, the integrated output disk 34 is provided with the high mode first ring gear 91 welded to the outer wall of the integrated output disk 34. The integrated output disk 34 and the first high mode gear 91 are formed with annular mating shoulders to provide an annular recess Y for welding. This annular recess Y prevents the roller 23 from interfering with weld metal padding Z. Welding the high mode first ring gear 91 to the outer wall of the integrated output disk 34 prevents the high mode first ring gear 91 from axially rattling.

Figure 5:
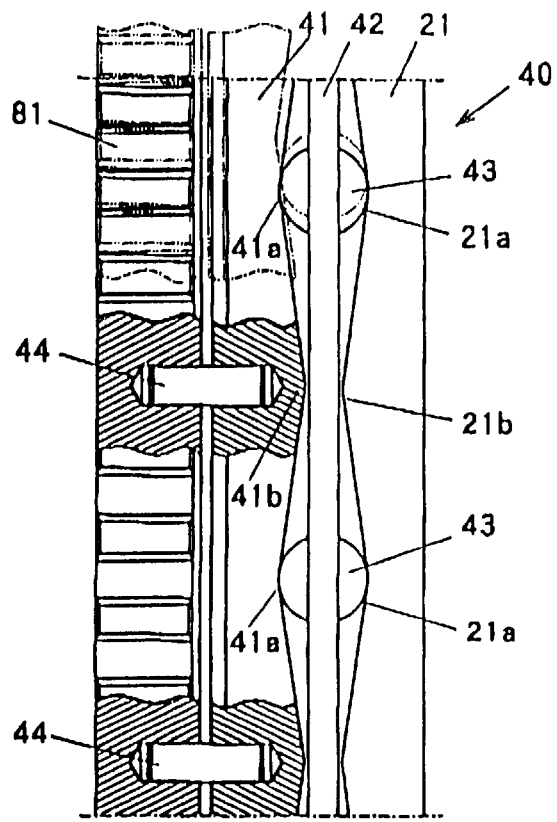
FIG. 5 is an explanatory view showing the correlation between a gear and an input disk for forming a loading cam and a low mode gear train.
Figure 6:
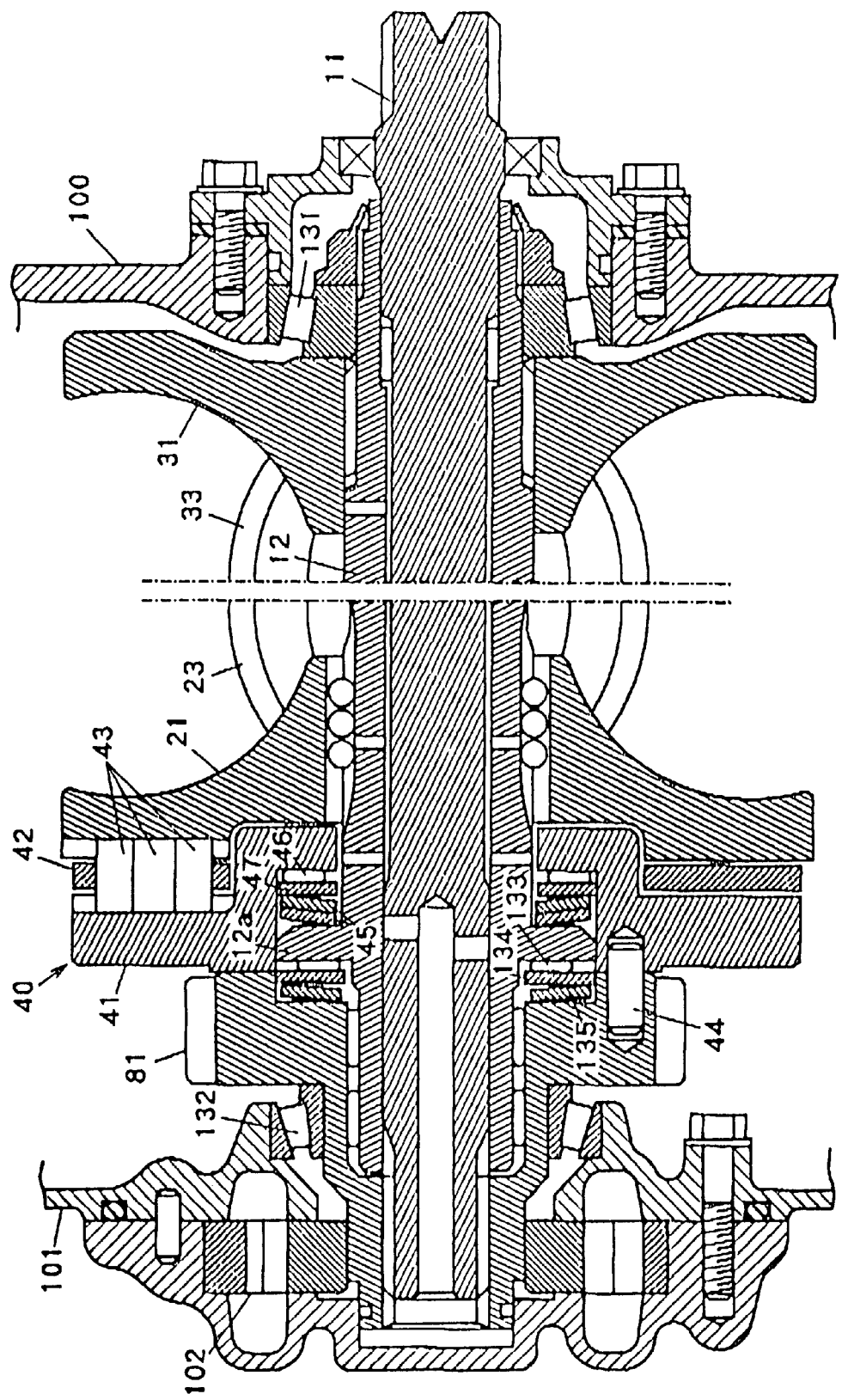
FIG. 6 is an enlarged cross-sectional view of an input shaft and its related parts.

FIGS. 5 and 6 show the loading cam 40 in detail. The loading cam 40 has a cam disk 41 disposed between low mode first gear 81 and the input disk 21 of the first continuously variable transmission mechanism 20. The cam disk 41 has a surface cam with alternate arrangement of crests and roots 21a formed thereon. The input disk 21 at its back has a surface cam formed thereon correspondingly to the surface cam of the cam disk 41. A plurality of rollers 43 held by a retainer disk 42 are interposed between the surface cams. The cam disk 41 is mechanically coupled to the low mode first gear 81 by means of a plurality of coupling pins 44. As shown in FIG. 6, there are arranged coned disk springs 45, a needle bearing 46 and a bearing race 47 between the cam disk 41 and primary shaft flange 12a. The cam disk 41 is forced against the input disk 21 by the conned disk springs 45. By means of the structure, the rollers 43 are interposed between the roots 21a and 41a of the surface cams to transmit drive torque input to the cam disk 41 through the input shaft 11 via the low mode first gear 81 to the input disk 21 of the first continuously variable transmission mechanism 20 and further to the input disk 31 of the second continuously variable transmission mechanism 30 through the primary shaft 12. In particular, as shown by a dotted chain line in FIG. 5, the rollers 43 roll toward the crests 21b and 41b from the roots 21a and 41a according to the magnitude of input torque, so as to be bitten between the crests 21b and 41b, as a result of which the input disk 21, rollers 23, integrated output disk 34 and the rollers 33 are axially forced toward the input disk 31 in order. In this way, axial compressive force applied to the rollers 23 and 33 of the first and second continuously variable transmission mechanisms 20 and 30 are automatically regulated according to input torque. The coupling pins 44 are fitted into bores arranged at circumferential positions where the cam disk 41 is formed with the crests 41b, which is desirable for preventing the cam disk 41 from being unnecessarily thickened in axial direction or pin bores from extending too close to the cam surface to lower the structural strength of the cam disk 41.

As seen in FIG. 6, the primary shaft 12 is supported at one of its opposite ends by the transmission housing through a bearing 131 and at another end where the low mode first gear 81 is mounted through spline engagement by a transmission rear end cover 101 through a bearing 132. Between the low mode first gear 81 and the primary shaft flange 12a supporting the conned disk springs 45, there is disposed a conned disk spring 135 for forcing the low mode first gear 81 and the primary shaft 12 through a needle thrust bearing 133 and a bearing race 134 to separate from each other. With this structure, if the primary shaft 12 encounters thermal expansion, while the primary shaft 12 at one of its ends remote from the engine acts to shift axially, the movement of the primary shaft 12 due to the thermal expansion is absorbed by deformation of the conned disk spring 135 and presses the low mode first gear 81 against the bearing 132 with thrust force according to the reaction force of the conned disk spring 135, as a result of which the low mode first gear 81 is prevented from being strongly pressed against the bearing 132 due to expansion of the primary shaft 12 or otherwise from rattling axially due to contraction of the primary shaft 12. The conned disk spring 135 always applies thrust force to the bearings 131 and 132 at the opposite ends of the primary shaft 12. If, in particular, these bearings 131 and 132 are of taper roller thrust bearing, an axial preload is retained properly to prevent the primary shaft 12 from rattling if the axial preload is too small or from encountering an increase in rotational friction force if it is too large. The transmission rear end cover 101 is provided with an oil pump 102 which is driven by means of the low mode first gear 81.

Figure 7:
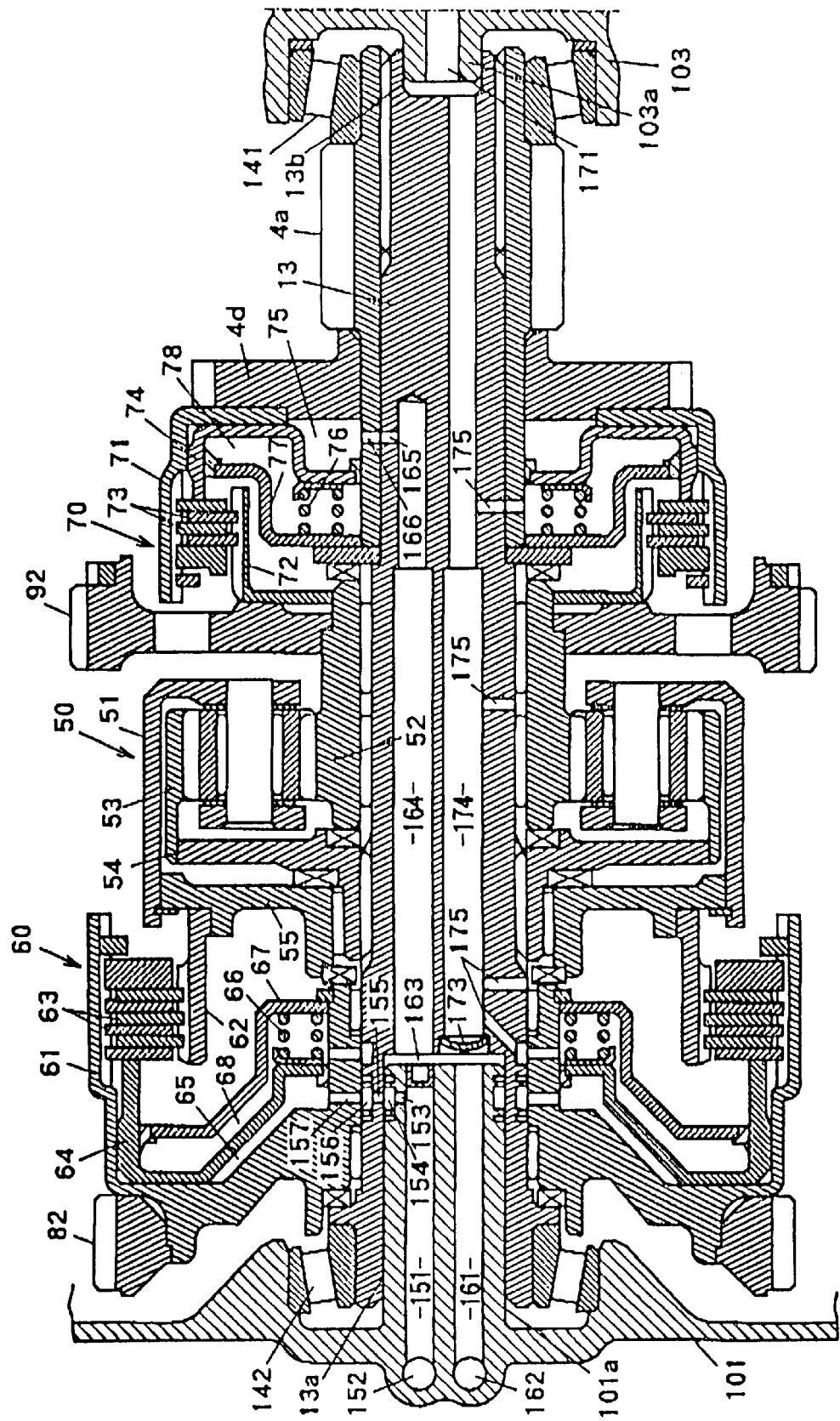
FIG. 7 is an enlarged cross-sectional view of a secondary input shaft and its related parts.

Referring to FIG. 7 showing the planetary gear set 50 and low and high mode clutches 60 and 70, the secondary shaft 13 at its opposite ends is supported for rotation by transmission end covers 101 and 103 through bearings 141 and 142, respectively. The secondary shaft 13 at its middle portion mounts thereon the high mode second gear 92 and the planetary gear set 50 adjacent to the high mode second gear 92 on one side remote from the engine 1. The sun gear 52 of the planetary gear 50 is meshed with the high mode second gear 92. A splined sleeve flange 54 with an external gear is placed on the splined end of the secondary shaft 13 behind the planetary gear set 50 and is meshed with the internal gear 53 of the planetary gear set 50. Further, the low mode clutch 60 is mounted for rotation on the secondary shaft 13 behind the sleeve flange 54. This low mode clutch 60 comprises an internally splined clutch drum 61 to which the low mode second gear 82 is secured, an externally splined clutch hub 62 disposed radially inside the clutch drum 61 and connected to a flange 55 by means of an externally splined pinion carrier 51, a plurality of splined clutch plates 63 alternately coupled to both clutch drum 61 and clutch hub 62, and a spring loaded piston 64 installed within the clutch drum 61. The clutch drum 61 defines a hydraulic chamber 65 therein behind the piston 64. The piston 64 is forced axially toward the planetary gear set 50 against a spring 66 by coupling hydraulic pressure supplied into the hydraulic pressure chamber 65 by a clutch control unit 120 (see FIG. 3), so as to couple the clutch plates 63 all together, thereby bringing the low mode second gear 82 and the pinion carrier 51 into engagement with each other. The piston 61 is provided with a balancing piston 67 secured to its front wall to provide a balancing hydraulic chamber 68 therebetween. Lubrication oil in the balancing hydraulic pressure chamber 68 cancels thrust force acting on the piston 64 by means of centrifugal force acting on the oil in the hydraulic pressure chamber 65. Adjacent to the high mode second gear 92 there is a high mode clutch 70. The high mode clutch 70 comprises an internally splined clutch drum 71 which is coupled to a first gear 4a of the output gear train 4 placed on the splined secondary shaft 13 through a parking gear 4d, an externally splined clutch hub 72 disposed radially inside the clutch drum 71 and connected to the high mode second gear 92, a plurality of splined clutch plates 73 alternately coupled to both clutch drum 71 and clutch hub 72, and a spring loaded piston 72 installed within the clutch drum 71. The clutch drum 71 defines a hydraulic pressure chamber 75 therein behind the piston 74. The piston 74 is forced axially toward the planetary gear set 50 against a spring 76 by coupling hydraulic pressure applied into the hydraulic pressure chamber 75 by the clutch control unit 120, so as to couple the clutch plates 73 all together, thereby bringing the high mode second gear 92 and the first gear 4a of the output gear train 4 placed on the splined secondary shaft 13. The piston 71 is provided with a balancing piston 77 secured to its back wall to provide a balancing hydraulic pressure chamber 78 therebetween. Lubrication oil in the balancing hydraulic pressure chamber 78 cancels thrust force acting on the piston 74 by means of centrifugal force acting on the oil in the hydraulic pressure chamber 75.

The secondary shaft 13 at both ends is formed with diametrically opposing axial grooves 13a and 13b extending axially from the extreme ends, respectively, in which bosses of the transmission end covers 101 and 103 are received for relative rotation, respectively. The boss 101 of the transmission rear end cover 101 is formed with axial oil paths 151 and 161 leading to the low and high mode clutches 60 and 70, respectively. Oil paths 152 and 162 extend passing through the transmission rear end cover 101 from the clutch control unit 120 and lead to the oil paths 151 and 161, respectively. Specifically, the oil path 151 leads to the hydraulic pressure chamber 65 of the low mode clutch 60 via a radial oil path 153 formed in the boss 101a of the transmission rear end cover 101, a peripheral oil groove 154 formed in outer wall of the transmission rear end cover 101, a radial oil path 155 formed in a peripheral wall of the axial groove 13a of the secondary shaft 13, a peripheral oil groove 156 of the secondary shaft 13 and a oil path 157 formed in the boss of the low mode clutch drum 61. Similarly, the oil path 161 opens into front end of the boss 101a of the transmission rear end cover 101 and is in communication with a space 163 provided between the front end of the boss 101a of the transmission rear end cover 101 and the axial groove 13a of the secondary shaft 13 and leads to the high mode clutch hydraulic pressure chamber 75 through radial paths 165 and 166 formed in the secondary shaft 13 and the first gear 4a of the output gear train 4, respectively. The respective oil paths 151 and 161 extend from the transmission rear end cover 101 and lead to the low and high mode clutch hydraulic pressure chambers 65 and 75, respectively, through the secondary shaft 13. By virtue of this oil path arrangement, application of hydraulic oil to the low and high mode clutch hydraulic pressure chambers 65 and 75 is more quick as compared, for example, with an oil path arrangement in which one of these oil paths extends from the transmission front end cover 103, which is always desirable for improvement of responsiveness of the low and high mode clutches 60 and 70.

Figure 2:
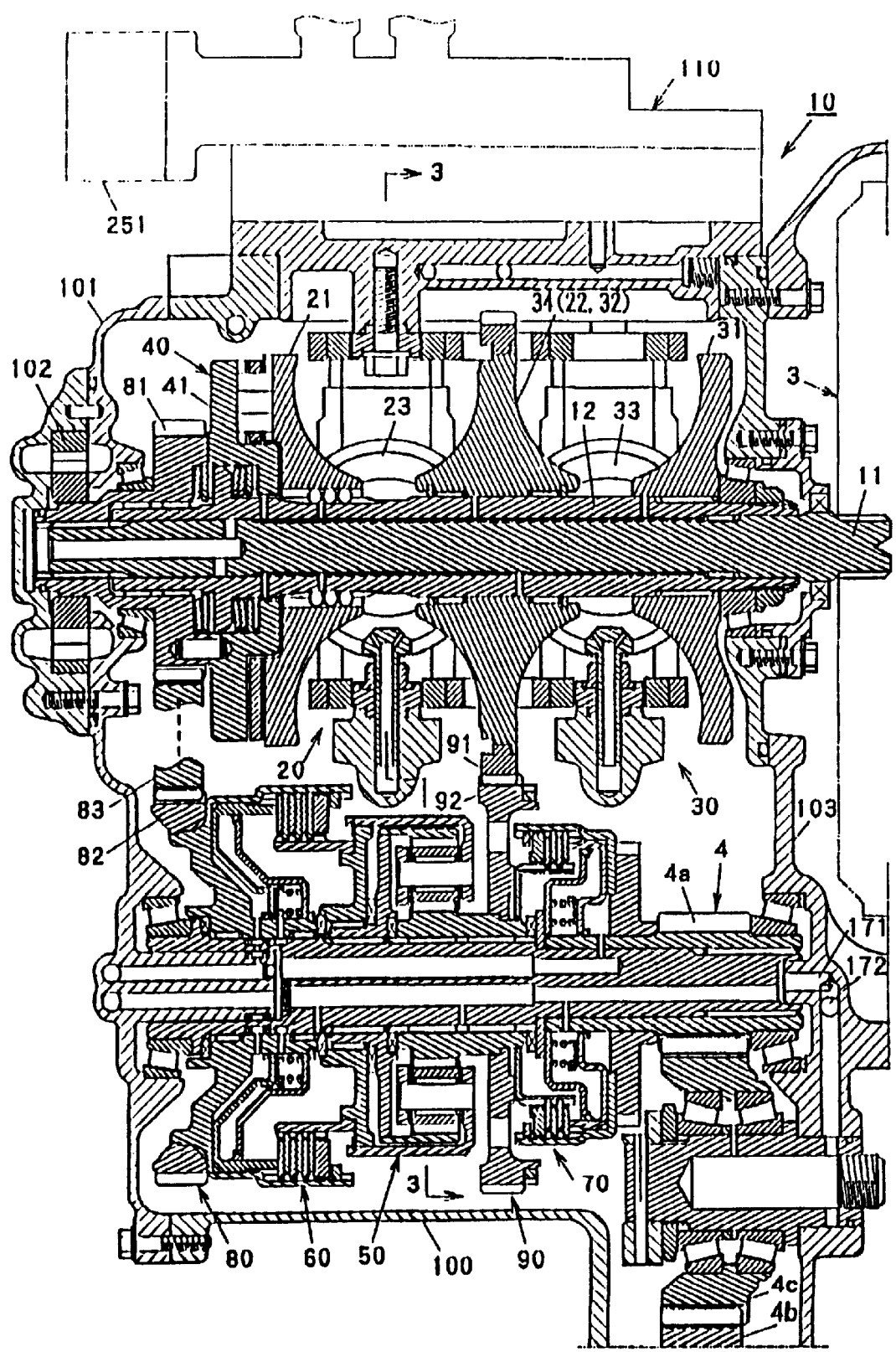
FIG. 2 is an expanded cross-sectional view of an essential part of the toroidal type continuously variable transmission.

The transmission front cover 103 is formed with an oil path 171 in the boss 103a to lead to an oil path 172 (see FIG. 2) extending within the transmission front cover 103. The secondary shaft 13 is formed with a lubrication oil path 174 extending from the axial groove 13b and closed at one end by an end plug 173 and further formed with a plurality of radial oil paths 175 in communication with the lubrication oil path 174. Lubrication oil supplied from the clutch control unit 120 is introduced into the balancing hydraulic pressure chambers 68 and 78 of the low and high mode clutches 60 and 70 and other parts necessary to be lubricated.

As shown in FIG. 3, the transmission housing 100 holds the speed change control unit 110 at one of its sides and the clutch control unit 120 at its bottom. The separate arrangement of these control units 110 and 120 yields a downward projection significantly decreased as compared with a transmission housing with both control units arranged at the bottom and consequently yields a high road clearance. In cooperation with the arrangement of the speed change control unit 110 at the side of the transmission housing 100, the trunnion control mechanism in which each of the trunnions 25 is attached to the trunnion rod 27 horizontally extending from the trunnion drive section 112 toward the interior of the transmission housing 100 and is axially moved along the horizontal axis X saves a transverse space of the transmission housing 100 significantly as compared with a trunnion drive section disposed on the top of a transmission housing. This makes it possible to place the secondary shaft 13 with the low and high mode clutches 60 and 70 mounted thereon closely to the input and primary shafts 11 and 12, making contribution to improving overall compactness of the continuously variable transmission 10.

In the mechanical operation of the continuously variable transmission 10, while the vehicle is stopping, in the low mode where the low mode clutch 60 is locked and the high mode clutch 70 is released, rotation of the engine 1 is transmitted to the secondary shaft 12 from the input shaft 11 through the low mode gear train 80 comprising the first gear 81, the idle gear 83 and the second gear 82 and simultaneously transmitted to the planetary gear set 50 through the pinion carrier 51 via the low mode clutch 60. The rotation imparted to the input shaft 11 is transmitted to the input disk 21 of the first continuously variable transmission mechanism 20 from the low mode first gear 81 through the loading cam 40 and further transmitted to the integrated output disk 34 through the rollers 23. Simultaneously, the rotation is imparted to the input disk 31 of the second continuously variable transmission mechanism 30 from the input disk 21 of the first continuously variable transmission mechanism 20 through the primary shaft 12 and further transmitted to the integrated output disk 34 through the rollers 23. At this time, the speed change control unit 110 controls the hydraulic pressure PH for speed increase or the hydraulic pressure PL for speed reduction to hold the rollers 23 of the first and second continuously variable transmission mechanisms 20 and 30 at an inclination angle for a same specified gear ratio. The rotation imparted to the integrated output disk 34 is further transmitted to the sun gear 52 of the planetary gear set 50 through the high mode gear train 90 comprising the first and second high mode gears 91 and 92. At this time, the speed change control unit 110 controls the hydraulic pressure PH for speed increase or the hydraulic pressure PL for speed reduction to hold the rollers 23 of the first and second continuously variable transmission mechanisms 20 and 30 at an inclination angle for a given gear ratio. In this way the planetary gear set 50 receives the rotation through both pinion carrier 51 and sun gear 52. The carrier 51 and the sun gear 52 rotate at a same speed due to the control of gear ratio of the first and second continuously variable transmission mechanisms 20 and 30, not causing rotation of the internal gear 53 of the planetary gear set 50, i.e. rotation transmitted to the differential 5 from the secondary shaft 12 through the output gear ratio 4, at all. As a result, the continuously variable transmission 10 remains placed in a geared neutral state.

When varying the gear ratios of the first and second continuously variable transmission mechanisms 20 and 30 to cause a change in speed ratio between rotation imparted to the pinion carrier 51 and the sun gear 52, respectively, the internal gear 13 rotates in either direction to move the vehicle forward or back in the low mode in which the continuously variable transmission 10 is at a high overall or final gear ratio. If releasing the low mode clutch 60 and locking the high mode clutch 70 simultaneously at a specified timing after the vehicle starts to move forward, rotation imparted to the input shaft 11 from the engine 1 is imparted to the input disks 21 and 31 of the first and second continuously variable transmission mechanisms 20 and 30 through the loading cam 40 and further to the integrated output disk 34 through the rollers 23 and 33, and then imparted to the secondary shaft 13 through the high mode clutch 70 via the high mode gear train 90. At this time, the planetary gear set 50 races, the continuously variable transmission 10 provides an overall gear ratio depending only upon the gear ratios of the first and second continuously variable transmission mechanisms 20 and 30 and is permitted to continuously vary the gear ratio in the high mode in which the overall gear ratio is small. Since, in the continuously variable transmission 10, the low mode gear train 80 for imparting rotation to the planetary gear set 50 on the secondary shaft 13 from the input shaft is disposed at the side of the input and secondary shafts 11 and 13 remote from the engine 1, no mechanical interference is caused between the low mode gear train 80 and the differential 5 and/or the output gear 4 by which rotation is imparted to the differential and any necessity to provide a dead space between these gear trains 4 and 80 is eliminated, which is always desirable for axial overall compactness of the continuously variable transmission 10.

In the continuously variable transmission 10 constructed as above, a problem is encountered in arranging the loading cam 40 between the input shaft 11 and the input members of the first and second continuously variable transmission mechanisms 20 and 30.

Figure 8:
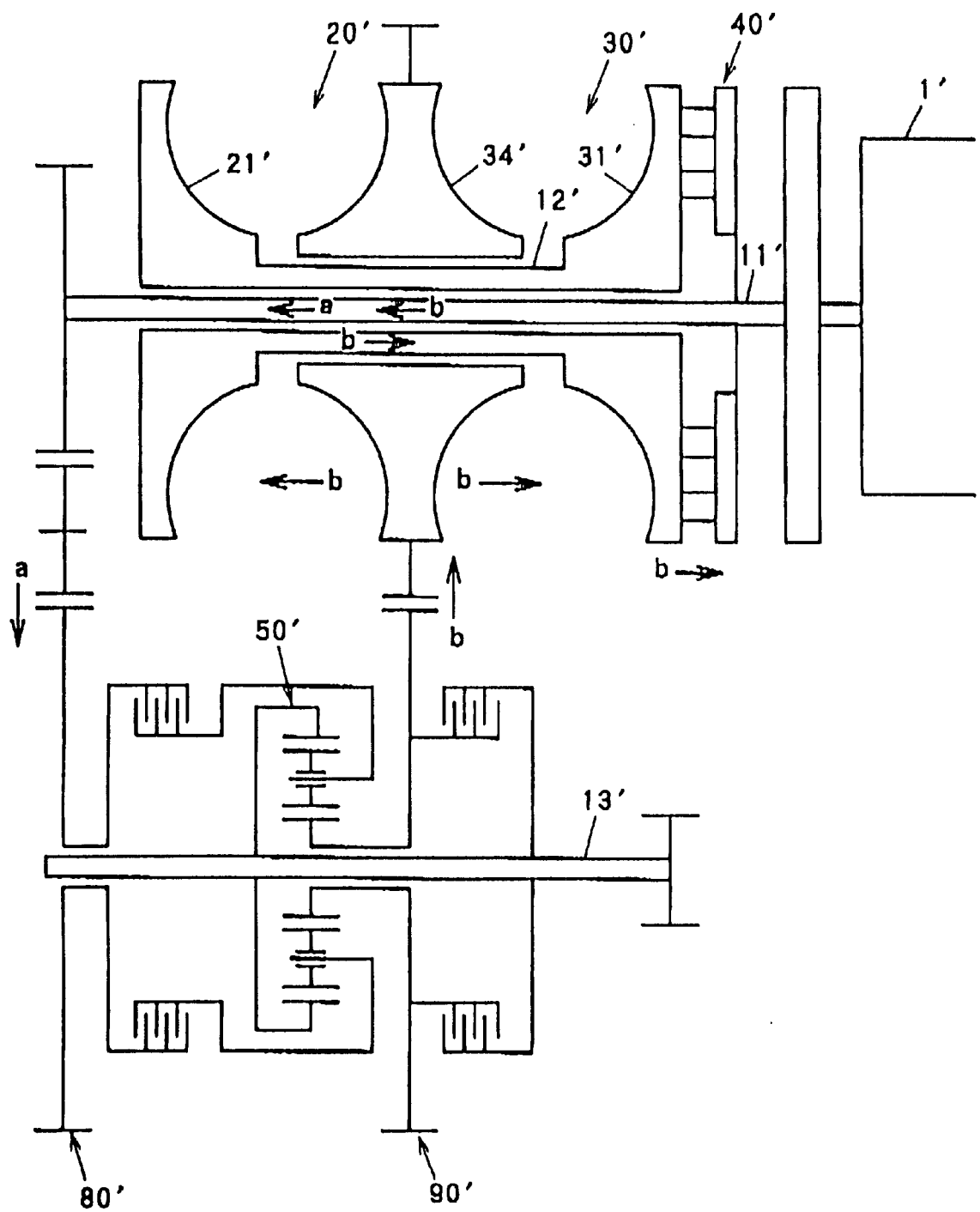
FIG. 8 is a schematic diagrammatic view showing a reflux or circulating torque flow.

As shown in FIG. 8 by way of example, if arranging a loading cam 40' between an input shaft 11' and an input disk 31' of the second or front continuously variable transmission mechanism 30', while engine torque is imparted to a secondary shaft 13' from an end of the input shaft 11 remote from the engine 1' through the low mode gear train 80 as shown by an arrow a in the low mode, reactive torque occurring in a planetary gear set 50 returns as a reflux or circulating torque flow to an integrated output torque 34' through a high mode gear train 90' as shown by an arrow b. The circulating torque is imparted to the input disks 21' and 31' and thereafter to the input shaft 11', and hence to the low mode gear train 80, again through the loading cam 40' via the input disk 31' of the front or second continuously variable transmission mechanism 30. That is, the input shaft 11' is subject simultaneously to torque in opposite directions. This results in the necessity of increasing the strength of the shaft against torsion by, for example, increasing its diameter, which makes the shaft be apt to transmit vibrations of the engine due to a high rigidity and causes noises and vibrations in addition to causing an increase in weight of the continuously variable transmission 10.

Figure 9:
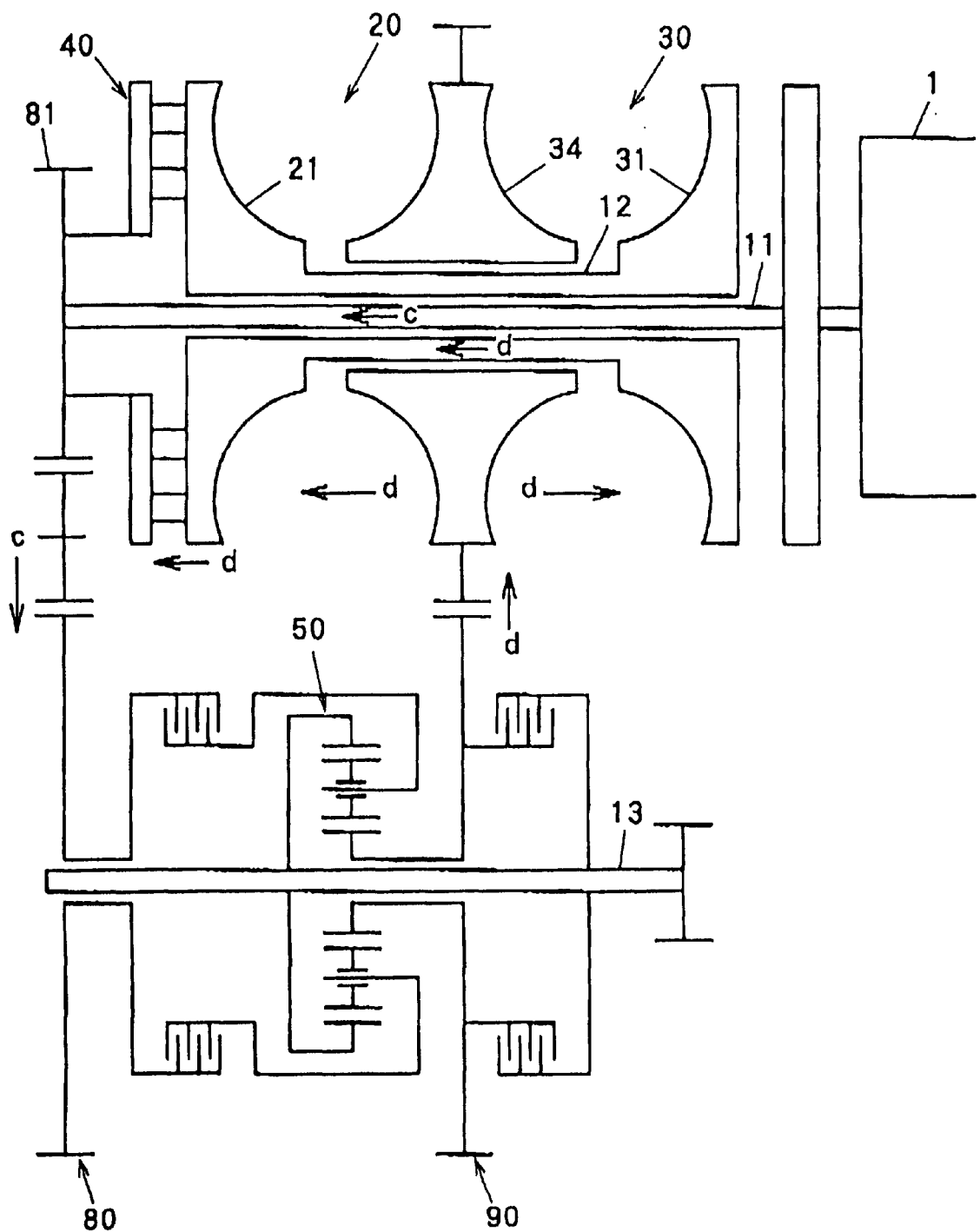
FIG. 9 a schematic diagrammatic view of a reflux or circulating torque flow in the toroidal type continuously variable transmission in accordance with an embodiment of the invention.

Whereas, because the continuously variable transmission 10 has an arrangement of the loading cam 40 and the low mode gear train 80 both placed at the end of the input shaft 11 remote from the engine 1, there is no problem of strength and rigidity of the input shaft 11. Specifically, as schematically shown in FIG. 9, while the engine torque is transmitted to secondary shaft 13 through the low mode gear train 80 via the end of the input shaft 11 remote from the engine 1 as indicated by an arrow c, the circulating torque is transmitted to the integrated output disk 34 of the first and second continuously variable transmission mechanisms 20 and 30 through the planetary gear set 50 on the secondary shaft 13 via the high mode gear train 90, then transmitted to the first gear 81 of the loading cam 40 through, on one hand, the loading cam 40 secured to the input disk 21 of the first continuously variable transmission mechanism 20 directly and through, on the other hand, the loading cam 40 via the primary shaft 12 secured to the input disk 31 of the second continuously variable transmission mechanism 30 as indicated by an arrow d. By means of this arrangement, the input shaft 11 does not take part in transmitting circulating torque to the first continuously variable transmission mechanism 20 nor to the second continuously variable transmission mechanism 30 and deserves its major part so long as transmitting the engine torque. As a result, a small diameter of the input shaft 11 having low rigidity may be installed with an effect of effectively reducing transmission of vibrations from the engine 1 such as causing noises and making contribution to a lightweight continuously variable transmission.

Figure 10:
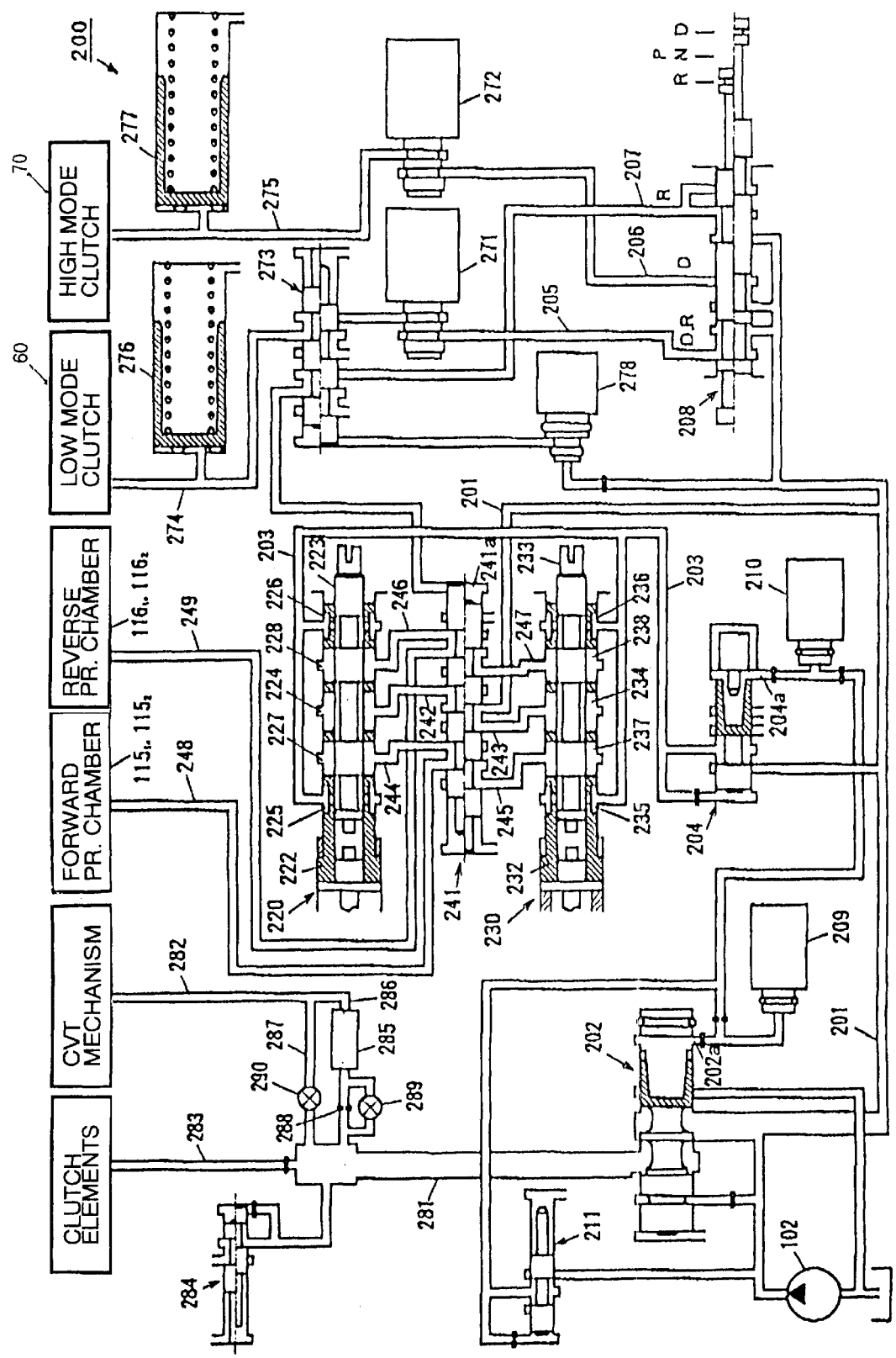
FIG. 10 is a hydraulic circuit diagram of the toroidal type continuously variable transmission.

FIG. 10 shows the hydraulic control circuit 200 comprised of the speed change control unit 110 and the clutch control unit 120 by which the continuously variable transmission 10 is controlled in operation. The hydraulic control circuit 200 includes various spool valves, namely a regulator valve 202 for regulating the pressure of a working oil discharged from the oil pump 102 to a specified level of pressure and delivering it into a main pressure line 201, a relief valve 204 for regulating the primary pressure in the main pressure line 201 to a specified level of relief pressure and delivering it into a relief pressure line 203, and a manual shift valve 208 operated by a manual range shift stick (not shown) to bring the main pressure line 201 into communication with first and second primary pressure lines 205 and 206 in a drive (D) range or with first and third primary pressure line 205 and 207 in a reverse (R) range or to disconnect communication of the main pressure line with all of the first to third primary pressure lines 205—207 in a neutral (N) range or a park (P) range. The regulator valve 202 and the relief valve 204 are accompanied with linear solenoid valves 209 and 210, respectively. Each linear solenoid valve 209, 210 generates a control pressure based on a pressure regulated to a specified level by a reducing valve 211. The regulator valve 202 receives the control pressure at its control pressure port 202a to regulate the specified level of line pressure. Similarly, the relief valve 204 receives the control pressure at its control pressure port 204a to regulate the specified level of relief pressure.

The hydraulic control circuit 200 further includes three spool valves, namely a forward shift double-slider valve (which will be referred to as a forward shift valve for simplicity) 220 for developing a speed increase hydraulic pressure PH according a line pressure and a relief pressure in the drive (D) range, a reverse double-slider shift valve (which will be refereed to as a reverse shift valve for simplicity) 230 for developing a speed reduction hydraulic pressure PL in the reverse (R) range, and a shift valve 241 for actuating selectively the shift valves 220 and 230. The shift valve 241 shifts its spool between two positions according to whether a pressure is present at the control pressure port 241a. Specifically, the shift valve 241 shifts the spool to the right end position as seen in FIG. 10 to bring the main pressure line 201 into communication with a line pressure line 242 leading to the forward shift valve 220 when receiving no line pressure at the control pressure port 241a, or to the left end position to bring the main pressure line 201 into communication with a pressure line 243 leading to the reverse shift valve 230 when receiving the line pressure at the control pressure port 241a. The shift valves 220 and 230 are of the same structure. The forward shift valve 220 has an outer sleeve 222 fitted for axial slide movement into an axial bore 221 (see FIG. 11) formed in a valve body 111a of the hydraulic control section 111 of the shift control unit 110 and an inner sleeve 223 fitted for axial slide movement into the outer sleeve 222, and the reverse shift valve 230 has a sleeve 232 fitted for axial slide movement into an axial bore 231 (see FIG. 11) formed in a valve body 111a of the hydraulic control section 111 of the shift control unit 110 and an inner sleeve 233 fitted for axial slide movement into the outer sleeve 232. The forward shift valve 220 has five ports, namely a line pressure port 224 disposed at the middle in an axial direction and connected to the line pressure line 242, first and second relief pressure ports 225 and 226 disposed at opposite ends and connected to the relief pressure line 203, a speed increase pressure port 227 disposed between the line pressure port 224 and the first relief pressure port 225 and a speed reduction pressure port 228 disposed between the line pressure port 224 and the second relief pressure port 226. Similarly, the reverse shift valve 230 has five ports, namely a line pressure port 234 disposed at the middle in an axial direction and connected to the line pressure line 242, first and second relief pressure ports 235 and 236 disposed at opposite ends and connected to the relief pressure line 203, a speed increase pressure port 237 disposed between the line pressure port 234 and the first relief pressure port 235 and a speed reduction pressure port 238 disposed between the line pressure port 234 and the second relief pressure port 236.

When the forward shift valve 220 changes the spool position relative to the valve sleeve 222 toward the right from a neutral position, the valve spool 223 increases an inter-communication opening between the line pressure port 224 and the speed increase pressure port 227, and an inter-communication opening between the second relief pressure port 226 and the speed reduction pressure port 228. Conversely, when the forward shift valve 220 changes the spool position relative to the valve sleeve 222 toward the right from the neutral position, the valve spool 223 increases an inter-communication opening between the line pressure port 224 and the speed reduction pressure port 228, and an inter-communication opening between the first relief pressure port 225 and the speed increase pressure port 227. Similarly, when the reverse shift valve 230 changes the spool position relative to the valve sleeve 232 toward the right from a neutral position, the valve spool 233 increases an inter-communication opening between the line pressure port 234 and the speed increase pressure port 237, and an inter-communication opening between the second relief pressure port 236 and the speed reduction pressure port 238, and, conversely, when the reverse shift valve 230 changes the spool position relative to the valve sleeve 232 toward the right from the neutral position, the valve spool 233 increases an inter-communication opening between the line pressure port 234 and the speed reduction pressure port 238, and an inter-communication opening between the first relief pressure port 235 and the speed increase pressure port 237. The pressure lines 244 and 245 respectively extending from the speed increase pressure ports 227 and 237 of the forward and reverse shift valve 220 and 230 and the pressure lines 246 and 247 respectively extending from the speed reduction pressure ports 228 and 238 of the forward and reverse shift valve 220 and 230 are connected to the shift valve 241.

Shift valve 241 places its valve spool to the right end position to bring the pressure lines 244 and 246 extending from the speed increase and reduction pressure ports 227 and 228 of the forward shift valve 220, respectively, into communication with a pressure line 248 leading to the speed increase pressure chambers $115_1$ and $115_2$ of the trunnion driving section 112 and a pressure line 249 leading to the speed reduction pressure chambers $116_1$ and $116_2$ of the trunnion driving section 112, respectively. On the other hand, the shift valve 241 places its valve spool to the left end position to bring the pressure lines 245 and 247 extending from the speed increase and reduction pressure ports 237 and 238 of the reverse shift valve 230, respectively, into communication with the pressure lines 248 and 249, respectively.

Figure 11:
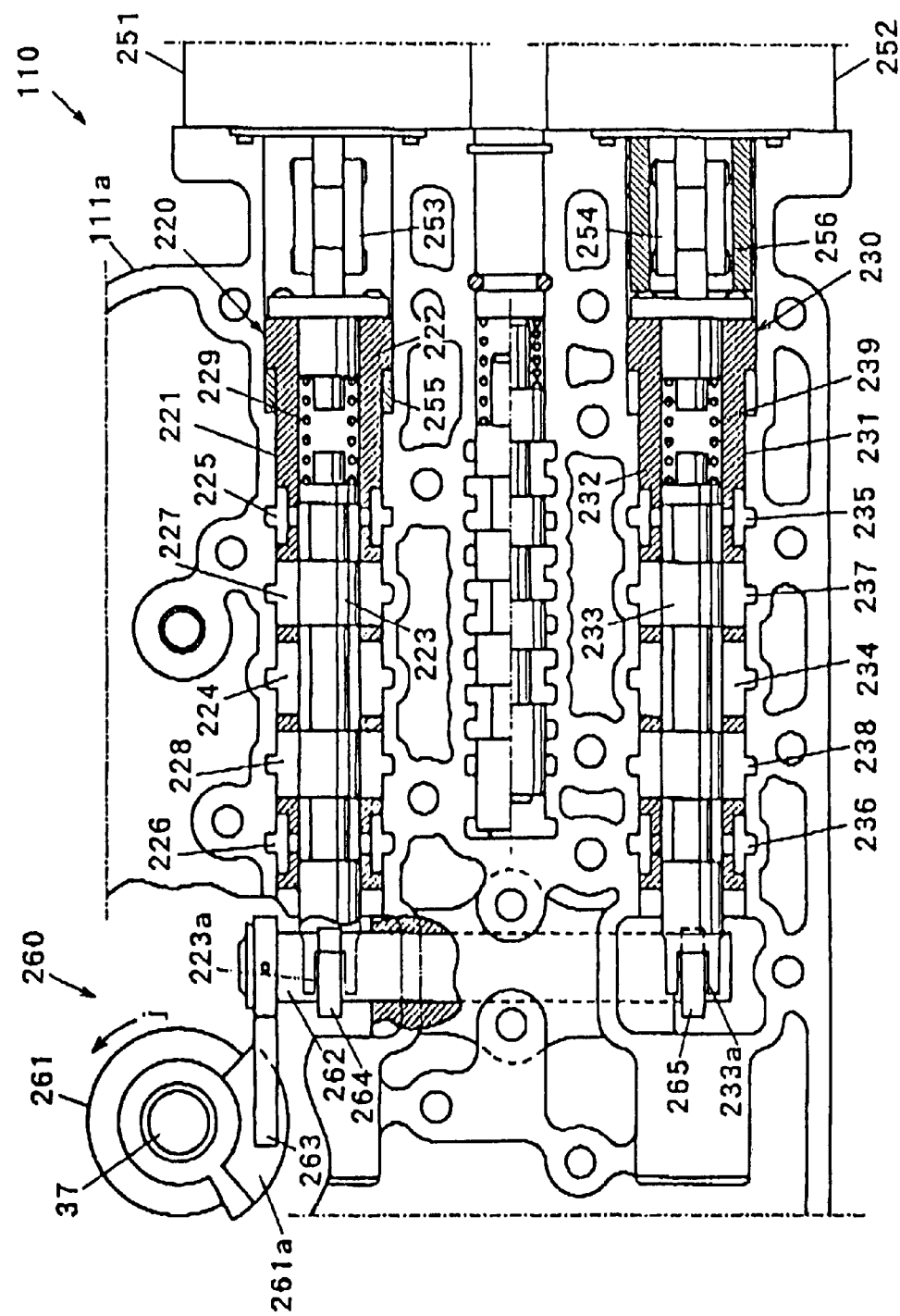
FIG. 11 is a partial cross-sectional view of a three-way valve for generating transmission control hydraulic pressure as viewed in a direction 11 in FIG. 3.
Figure 12:
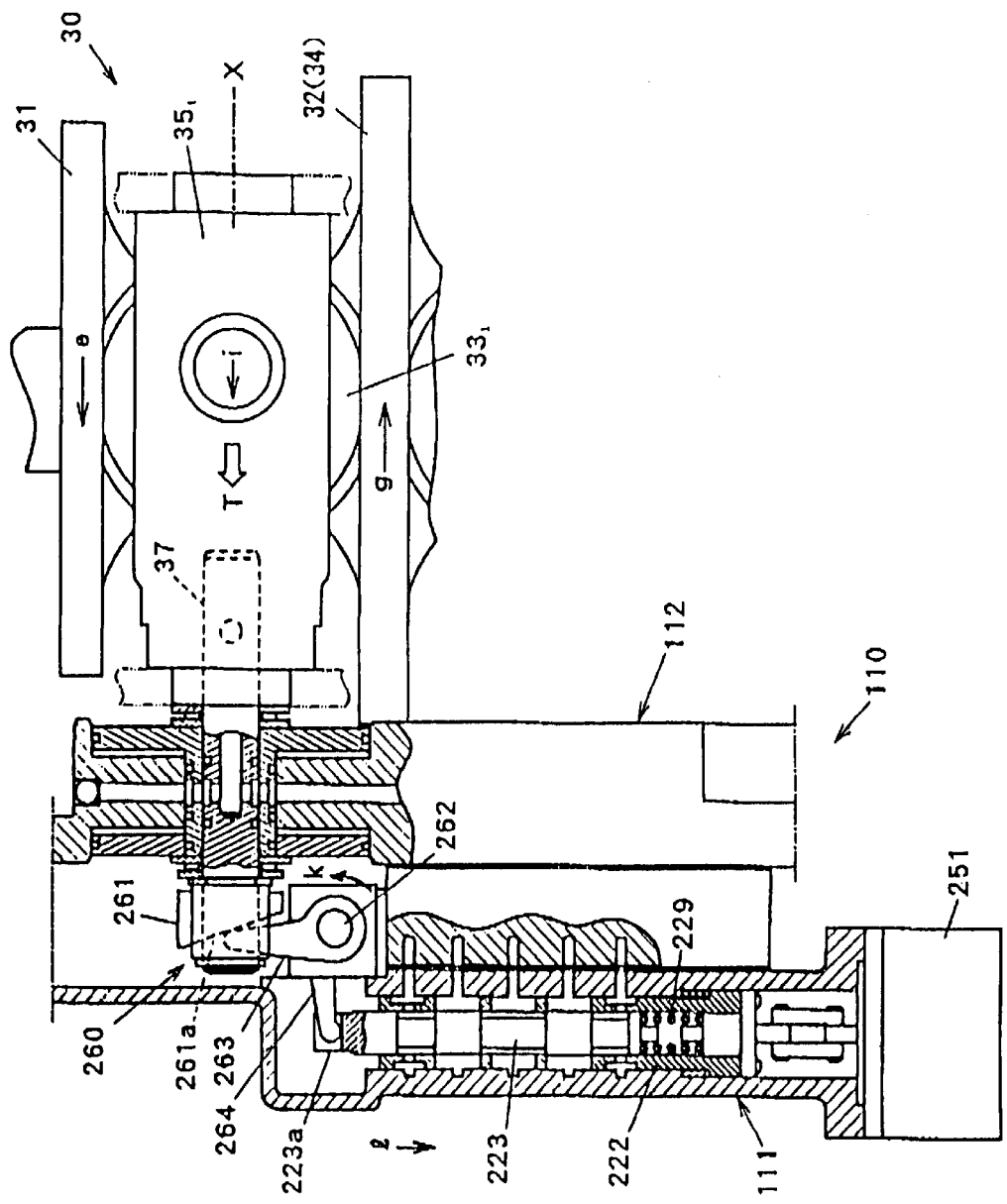
FIG. 12 is a partial cross-sectional view of a cam mechanism as viewed in a direction 12 in FIG. 3.

FIGS. 11 and 12 show a cam mechanism 260 which moves axially each spool 223, 233 of the forward and reverse shift valves 220 and 230 against a return spring 229, 239 according to axial movement of the valve sleeve 222, 232 caused by a stepping motor 251, 252. The stepping motors 251 and 252 are connected to the valve sleeves 222 and 232 through connecting members 253 and 254, respectively. The cam mechanism 260 includes a precess face cam 261, a shaft 262, a cam follower lever or slider 263 and drive levers 264 and 265. The face cam 261 having a cam face 261a is mounted to a trunnion rod 27 of the trunnion 25 of the second continuously variable transmission mechanism 30. The shaft 262 is disposed adjacent and perpendicularly to the valve spools 223 and 233 and supported for rotation by the valve body 111a of the hydraulic control section 111. The cam follower lever 263 is attached at one of its ends to the shaft and is forced at another end to contact with the cam face 261a of the face cam 261. The drive lever 264 for forward shift is attached at one of its ends to the shaft 262 and is engaged at another end with an end key slot 223a of the valve spool 223 of the forward shift valve 220. Similarly, the drive lever 265 for reverse shift is attached at one of its ends to the shaft 262 and is engaged at another end with an end key slot 233a of the valve spool 233 of the reverse shift valve 230.

When the first roller $33_1$ of the second continuously variable transmission mechanism 30 inclines to turn the trunnion $25_1$ and trunnion rod 27 together about the axis X1, the face cam 261 turns to force the cam follower lever 263, as a result of which the drive levers 264 and 265 are turned through a same angle by means of the shaft 262. In this way, the valve spools 223 and 233 of the forward and reverse shift valve 220 and 230 are axially shifted according to the angle of inclination of the roller first roller $33_1$. Accordingly, the axial spool position depends upon the angle of inclination of the rollers 33 of the second continuously variable transmission mechanism 30, and also of the rollers 23 of the first continuously variable transmission mechanism 20, i.e. upon the gear ratio of the continuously variable transmission mechanisms 20 and 30. The cam mechanism 260 is simplified in mechanism due to an arrangement of the face cam 261 and cam follower lever 263 common to the valve spools 223 and 233 of the forward and reverse shift valve 220 and 230. Further, as seen in FIG. 11, the stepping motors 251 and 252 are attached directly to the side wall of the valve body 111a of the shift control unit 110 in which the forward and reverse shift valve 220 and 230 are installed and are connected coaxially with and directly to the valve sleeves 222 and 232, respectively. This structure makes contribution to a simplified drive mechanism for the valve sleeves 222 and 232 and to accurate positioning of the valve sleeves 223 and 232. The arrangement of the shift valve 241 between the forward and reverse shift valves 220 and 230 in the shift control unit 110 needs only short oil paths 242–247 (FIG. 10) between the forward and reverse shift valves 220 and 230, yielding improvement of responsibility of the shift valves 220 and 230.

Figure 13:
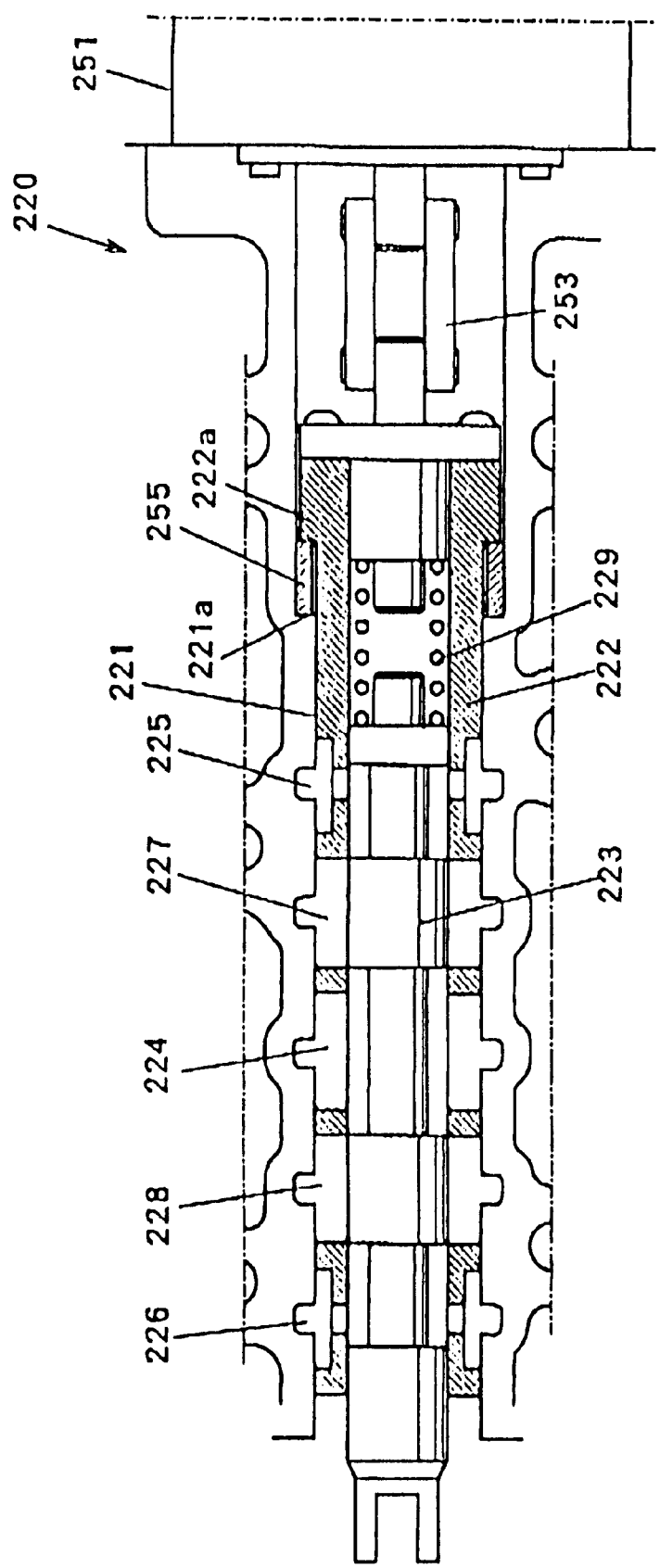
FIG. 13 is an enlarged view of a three-way valve for forward speed gears.
Figure 14:
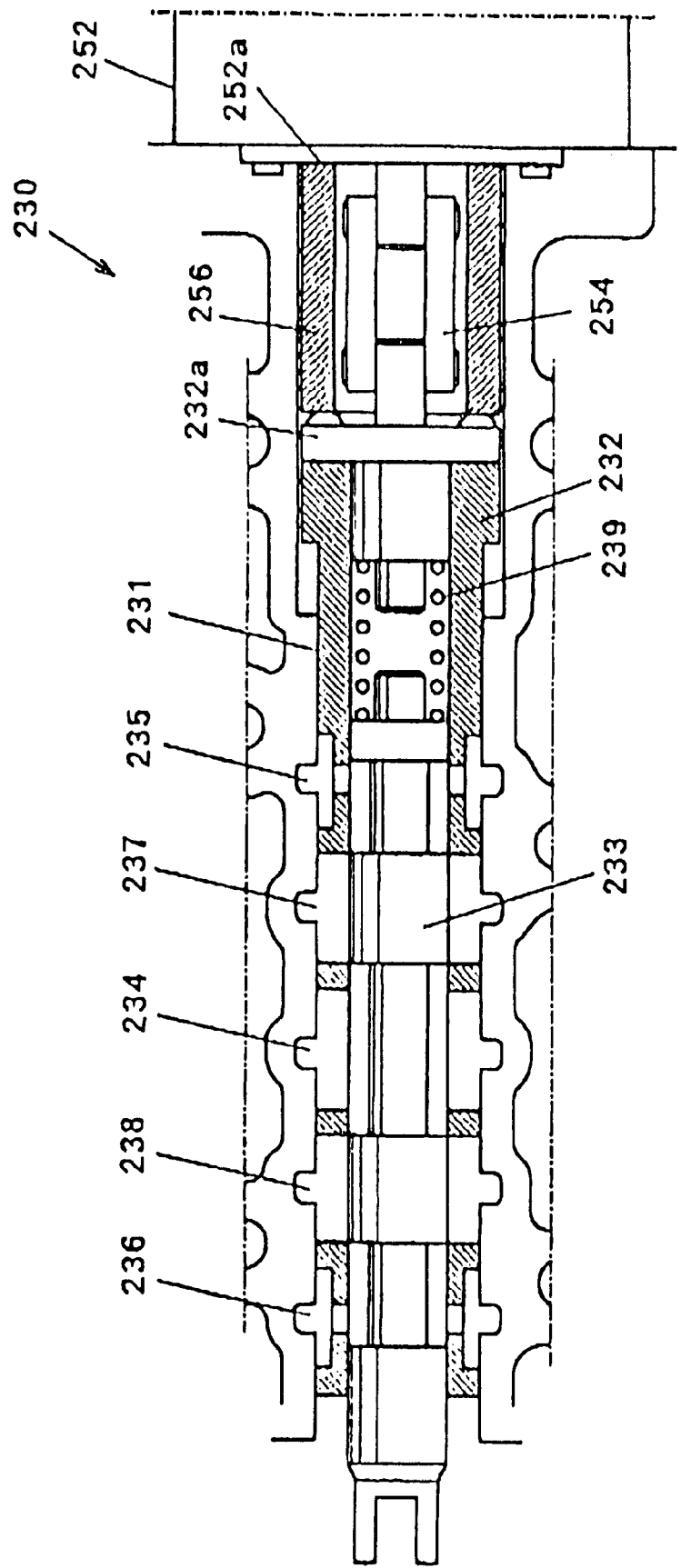
FIG. 14 is an enlarged view of a three-way valve for a reverse gear.

Referring to FIG. 13 showing the forward shift valve 220 in detail, the valve sleeve 222 is provided with a stopper ring 255 between a large spool end section 222a to which the stepping motor 251 and a shoulder 221a formed in a valve bore 221. The valve sleeve 222 is stopped at a specified position shown in FIG. 13 by the stopper ring 255, preventing an inter-communication opening between the line pressure port 224 and the speed increase pressure port 228 and an inter-communication opening between the second relief pressure port 226 and the speed reduction pressure port 228 from increasing in excess. Referring to FIG. 14 showing the reverse shift valve 230 in detail, the valve sleeve 232 is provided with a flange 232a secured to the end thereof and a stopper sleeve 256 disposed between the stopper sleeve 256 and a front wall 252a of the stepping motor 252. The stopper sleeve 256 receives the connecting member 253 therein. The valve sleeve 232 is stopped in axial movement toward the right at a specified position shown in FIG. 13 by the stopper sleeve 256, preventing an inter-communication opening between the line pressure port 234 and the speed reduction pressure port 238 and an inter-communication opening between the first relief pressure port 235 and the speed increase pressure port 237 from increasing in excess.

Referring back to FIG. 10, the hydraulic pressure control circuit 200 is provided with first and second solenoid valves 271 and 272 for clutch control. The first solenoid valve 271 is communicated with the manual shift valve 208 through the first primary pressure line 205. Similarly, the second solenoid valve 272 is communicated with the manual shift valve 208 through the second primary pressure line 206.

When the first solenoid valve 271 opens, a clutch locking pressure produced by regulating the line pressure from the first primary pressure line 205 is supplied into the hydraulic pressure chamber 65 of the low mode clutch 60 through a clutch pressure line 274 via a fail-safe valve 273 to lock up the low mode clutch 60. Similarly, when the second solenoid valve 272 opens, a clutch locking pressure produced by regulating the line pressure from the second primary pressure line 206 is supplied into the hydraulic pressure chamber 75 of the high mode clutch 70 through a clutch pressure line 275 to lock up the high mode clutch 70. The clutch pressure lines 274 and 275 are accompanied with accumulators 276 and 277, respectively, to provide gradual development of the clutch locking pressure in the hydraulic pressure chambers 65 and 75 so as thereby to prevent an occurrence of shift shocks. The third primary pressure line 207 extending from the manual shift valve 208 is connected to the control port 241a of the shift valve 241 via the fail-safe valve 273. The shift valve 241 receives a line pressure at its control port 241a to place the valve spool to the left end position (reverse position) when the manual shift valve 208 is in the reverse (R) range position. The fail-safe valve 273 is accompanied with a solenoid valve 278. The solenoid valve 278 provides a control pressure to force the valve spool of the fail-safe valve 273 to the right end position so as thereby to bring the first primary pressure line 205 in communication with the low mode clutch pressure line 274. The solenoid valves 271, 272 and 278 are of a three-way type valve which drains a downstream side when both upstream and downstream sides are shut off.

Figure 15:
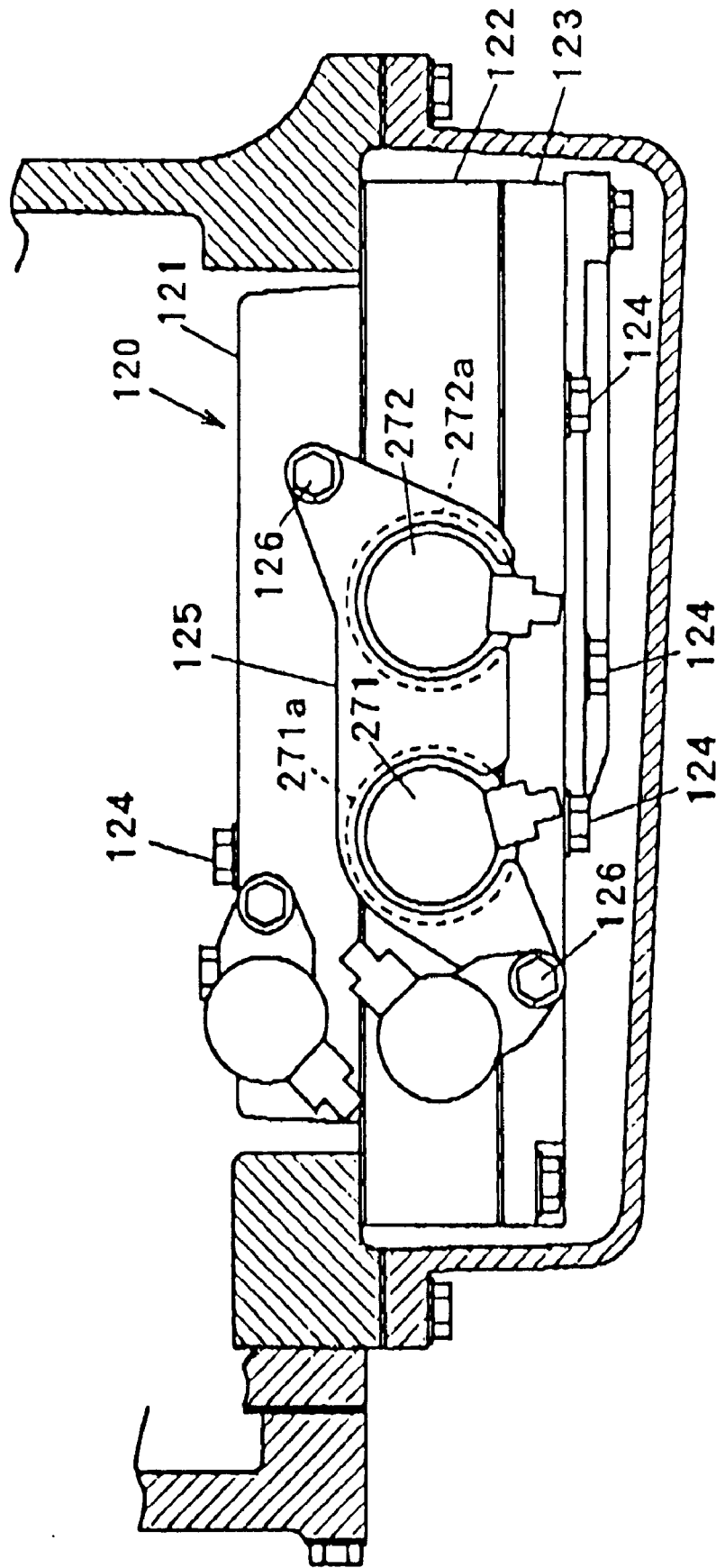
FIG. 15 is a cross-sectional view of a lower structure of a transmission case.

Referring to FIG. 15 showing the clutch control unit 120 with the solenoid valves 271 and 272 installed therein in detail, the unit is comprised of upper, intermediate and under components fastened together by a plurality of fastening bolts 124. The solenoid valves 271 and 272 are secured to the unit by interposing their flanges 271a and 272a between the intermediate component 122 and a fitting bracket 125 fastened at opposite ends to the upper and under components 121 and 122 by fastening bolts 126. The triplet structure makes contribution to the overall rigidity of the control unit 120.

As shown in FIG. 10, the hydraulic control circuit 200 is further provided with a lubrication oil line 281 extends from a drain port of the regulator valve 202 and branches off to a lubrication oil line 282 leading to the first and second continuously variable transmission mechanisms 20 and 30 and a lubrication oil line 283 leading to continuously variable transmission parts other than the continuously variable transmission mechanisms 20 and 30. The lubrication oil line 281 is provided with a relief valve 284 to adjust the lubrication oil at a specified level of pressure. An upstream part of the lubrication oil line 282 branches off into an oil line 286 provided with a cooler 285 for cooling the lubrication oil and an oil line 287 bypassing the cooler 285. The oil line 286 upstream from the cooler 285 is provided with an orifice 288 and a first switch valve 289 disposed in parallel. The bypass oil line 287 is provided with a second switch valve 290. Delivery of the lubrication oil to the first and second continuously variable transmission mechanisms 20 and 30 is controlled by means of the first and second switch valves 289 and 290. According to incoming signals from a control unit 300 (which will be described in detail later with reference to FIG. 16) comprised mainly of a microcomputer, the second switch valve 290 opens to permit the working oil or lubrication oil to flow to the continuously variable transmission mechanisms 20 and 30 bypassing the cooler 285 when the lubrication oil is at a temperature lower than a specified temperature and at a pressure higher than a specified pressure for the purpose of preventing aggravation of flowability of the lubrication oil due to mechanical resistance of the cooler 285 and preventing the cooler 285 from encountering damages and a decrease in durability due to the high pressure lubrication oil. In all other cases, the second switch valve 290 closes to make the lubrication oil pass through the cooler before reaching the continuously variable transmission mechanisms 20 and 30. By this way, oil films on the toroidal surfaces of the input and output disks 21, 22, 31 and 32 are maintained in good conditions, so as to protect contact surfaces of the toroidal disks with the rollers 23 and 33. The first switch valve 289 opens and closes according to incoming signals from the control unit 300. Specifically, the first switch valve 289 closes when, while the second switch valve 290 remains closed, the engine 1 operates at a speed of rotation lower than a specified speed of rotation and the vehicle travels at a velocity lower than a specified velocity. This is because, in the case of lower engine speeds of rotation and/or lower vehicle velocities, while the continuously variable transmission mechanisms 20 and 30 has a demand for a small amount of lubrication oil, the low and high mode clutches 60 and 70 needs a specified amount of lubrication oil. The lubrication oil supplied to the continuously variable transmission mechanisms 20 and 30 through the lubrication oil line 282 is also supplied to bearings supporting the rollers 23 and 33 through an oil line 282a (see FIG. 3) and sprayed on the toroidal surfaces through a nozzle 282b (see FIG. 3).

Basic Control

Figure 16:
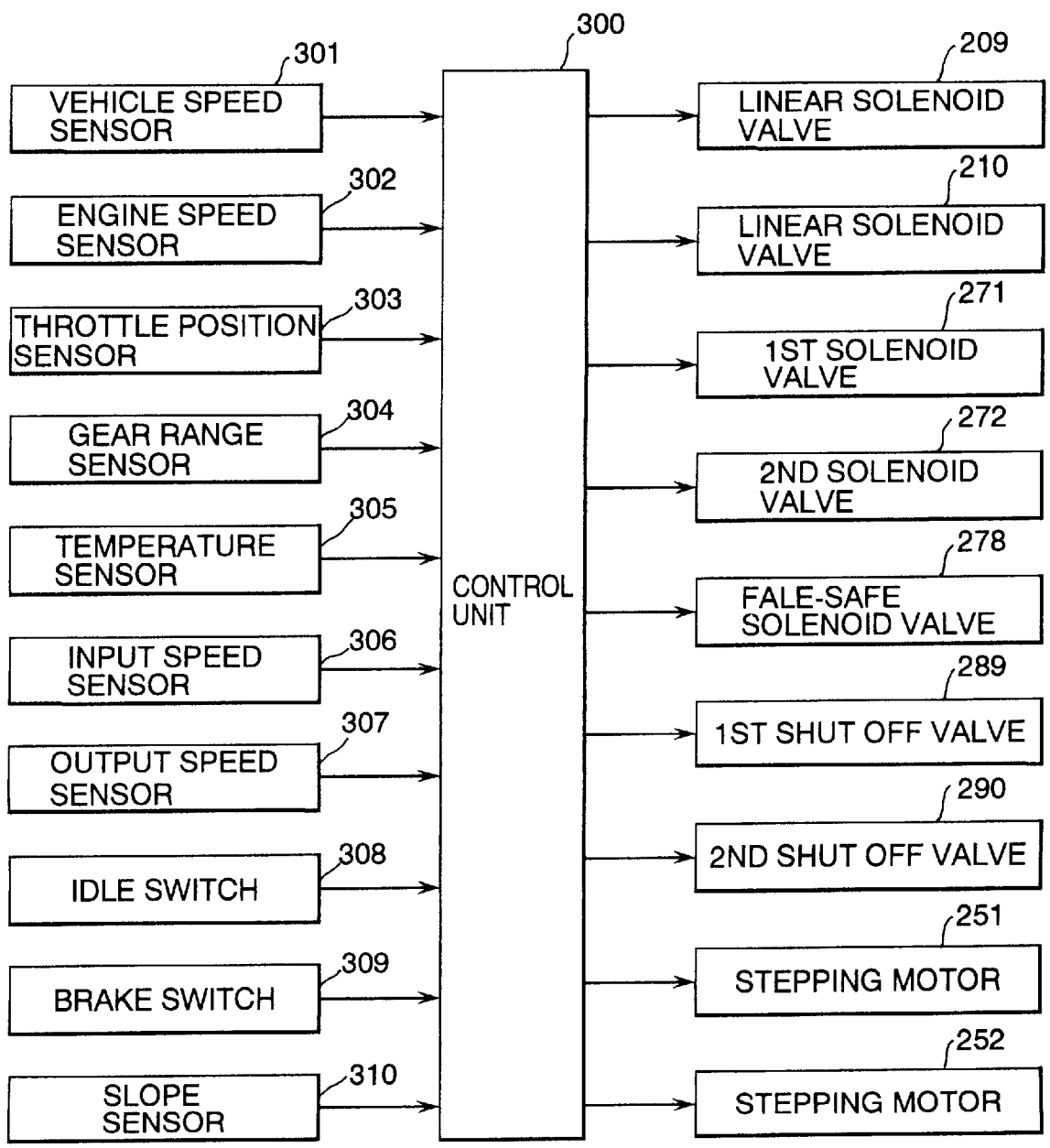
FIG. 16 is a block diagram showing a control system of the toroidal type continuously variable transmission of the invention.

Shift control of the continuously variable transmission 10 depicted in FIG. 1 is executed through the control unit 300 shown in block diagram in FIG. 16.

Referring to FIG. 16, the control unit 300 receives various signals from sensors and switches including at least an engine speed sensor 302, a throttle position or opening sensor 303, a transmission position sensor 304, an oil temperature sensor 305, speed sensors 306 and 307, an idle switch 308, a brake switch 309 and a slope sensor 310. The speed sensor 306 attached to the low mode clutch drum 61 detects a speed of input disk 21 of the first continuously variable transmission mechanism 20, and the speed sensor 307 attached to the second gear 92 of the high mode gear train 90 detects a speed of input disk 31 of the first continuously variable transmission mechanism 30. The idle switch 308 detects release of the accelerator pedal. The brake switch 309 detects stepping on of the brake pedal. The slope sensor 310 detects a slope of a road on which the vehicle is traveling. These sensors and switches are well known in various types in the art and may take any known type. The control unit 300 provides control signals according to driving conditions represented by signals from the switches and sensors 301–310 for various solenoid valves 209, 210, 271, 272, 278–290, stepping motors 251 and 252, and other electrically controlled elements in the hydraulic control circuit 200.

The following description will be directed to basic speed change operation of the continuously variable transmission 10. As was previously described above, the hydraulic control circuit 200 shown in FIG. 10 is in the drive (D) range in which the manual shift valve 208 takes the drive (D) position to force the shift valve 241 to maintain the valve spool in the right end position (the forward position). Because the continuously variable transmission mechanisms 20 and 30 shown in FIG. 3 operate in the same way, the explanation will be given relating to the roller $23_1$ and trunnion $25_1$ of the first continuously variable transmission mechanism 20 by way of example, and the same is true for other rollers and trunnions.

Figure 17:
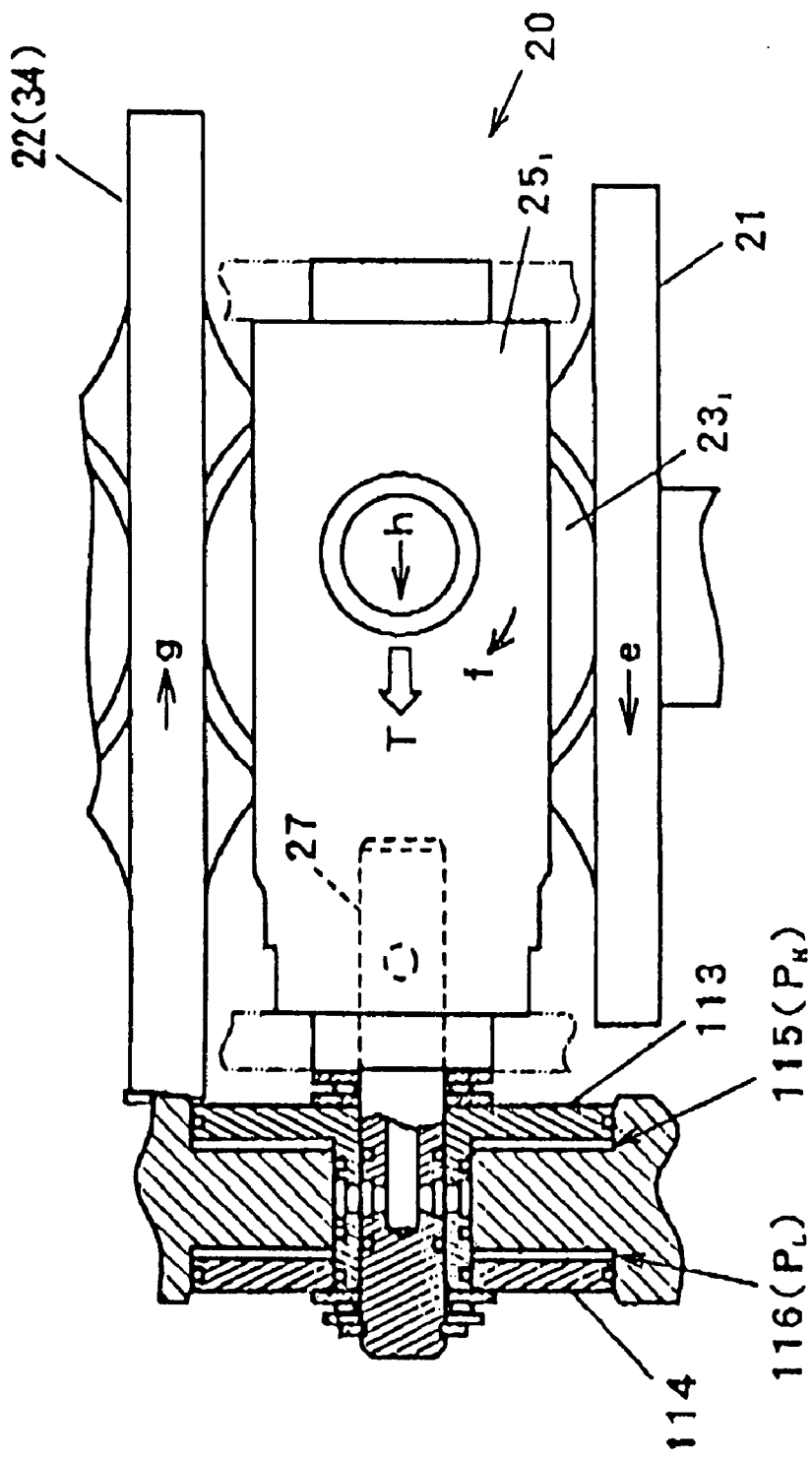
FIG. 17 is an explanatory diagram of traction force.

When the hydraulic control circuit 200 is actuated in response to a signal from the control unit 300, the oil pump 102 and the solenoid valves 209 and 210 are actuated to generate a specified level of pressure as a line pressure at the control port 202a of the regulator valve 202 and a specified level of pressure as a relief pressure at the control port 204a of the relief valve 204. The line pressure is supplied to the inlet pressure port 224 of the forward shift valve 220 through the main pressure line 201 and pressure line 242 via the shift valve 241, and the relief pressure is supplied to the first and second relief pressure ports 225 and 226 of the forward shift valve 220 through the pressure line 203. Based on these line pressure and relief pressure, the forward shift valve 220 controls the hydraulic pressure difference ($\Delta P=PH-PL$) between a hydraulic pressure PH for speed increase and a hydraulic pressure PL for speed reduction. This hydraulic pressure difference control is performed to hold the trunnion 25 and roller 23 in the neutral positions against tractive force (T) exerted on the trunnion 25 or to force them in the axial direction X from the neutral position so as to vary the inclination of the roller for varying the gear ratio of the continuously variable transmission mechanism 20. As shown in FIG. 17, when the roller 23 is driven by the input disk 21 rotating in a direction indicated by an arrow e, these trunnion 25 and roller 23 are applied with force by which they are drawn in the same direction e. On the other hand, when the output disk 22 is rotated in a direction indicated by an arrow g (which is the direction x shown in FIG. 3) by the roller 23 rotating in a direction indicated by an arrow f, reaction force is exerted tractive force T in a direction opposite to the rotational direction g of the output disk 22 on the roller 23 and trunnion 25. In order to hold the roller 23 in the neutral position against the tractive force T, the speed increase and decrease pressure chambers 115 and 116 are supplied with speed increase and speed decrease hydraulic pressures PH and PL, respectively which are controlled to provide a hydraulic pressure difference ($\Delta P=PH-PL$) balanced with the tractive force T. When increasing the gear ratio of the continuously variable transmission mechanism 20 for forward drive of the vehicle, the forward shift valve 220 forces the valve sleeve 222 to shift toward the right as viewed in FIGS. 11 and 13 or to the left in FIG. 10 to decrease the inter-communication openings between the inlet pressure port 224 and the speed decrease pressure port 228 and between the first relief pressure port 225 and the speed increase pressure port 227. As a result, the hydraulic pressure PH introduced into the speed increase pressure chamber 115 drops due to the relief pressure which is relatively low and the hydraulic pressure PL introduced into the speed decrease pressure chamber 116 rises due to the line pressure which is relatively high, as a result of which the tractive force T becomes higher than the hydraulic pressure difference ($\Delta P=PH-PL$) to force the trunnion 25 and roller 23 in a direction indicated by an arrow h which is coincident with the direction in which the tractive force T acts. Following the movement, the roller 23 inclines in a direction in which it shifts its contact point with the input disk 21 radially inward and its contact point with the output disk 22 radially outward to reduce the gear ratio. The inclination of roller is caused in the second continuously variable transmission mechanism 30 in the same way. When the tractive force exceeds the hydraulic pressure difference ($\Delta P=PH-PL$), the roller 33 inclines in a direction in which it shifts its contact point with the input disk 31 radially inward and its contact point with the output disk 32 radially outward following movement of the trunnion 35 in a direction indicated by an arrow i. At this time, however, the face cam 261 of the cam mechanism 260 turns through the same angle as the roller 33 inclines in the same direction as indicated by an arrow j in FIG. 11, as a result of which the cam follower lever 263, and hence the shaft 262 and the drive lever 264, turns in a direction indicated by an arrow k in FIG. 12. The forward shift valve 220 shifts the valve spool 223 in a direction indicated by an arrow l in FIG. 12, or to the right as viewed in FIG. 11, against the return spring 229. Because this direction l is coincident with the direction in which the valve sleeve 222 is shifted by the stepping motor 251, the inter-communication openings between the inlet pressure port 224 and the speed decrease pressure port 228 and between the first relief pressure port 225 and the speed increase pressure port 227 are restored neutral to their initial widths, so as to balance the hydraulic pressure difference ($\Delta P=PH-PL$) with the tractive force T, thereby terminating finalizing the gear ratio change of the continuously variable transmission mechanism 20. The gear ratio change of the continuously variable transmission mechanism 30 is achieved in the same way. The speed change is completed at a point of time that the valve spool 223 reaches the neutral position relative to the valve sleeve 222. Since the neutral position is the position to which the valve sleeve 222 has been shifted by the stepping motor 251 and corresponds to the inclined angle of the roller 23 caused by the cam mechanism 260, the position of the valve sleeve 222 corresponds to the inclined angle of the roller 23, and hence the trunnion 25. This means that the control variable by the stepping motor 251 determines the gear ratio of the continuously variable transmission mechanism 20. Accordingly, the gear ratio of the continuously variable transmission mechanism 20 is varied according to the number of pulses applied to the stepping motor 251. The gear ratio control of the continuously variable transmission mechanism 30 is achieved in the same way. When the vehicle starts to move, for example, back, the reverse shift valve 230 forces the valve sleeve 232 to the left as viewed in FIG. 11 and 14 or to the right in FIG. 10. Opposite directional movement of the rollers are caused to reduce the gear ratios of the continuously variable transmission mechanisms 20 and 30.

Figure 18:
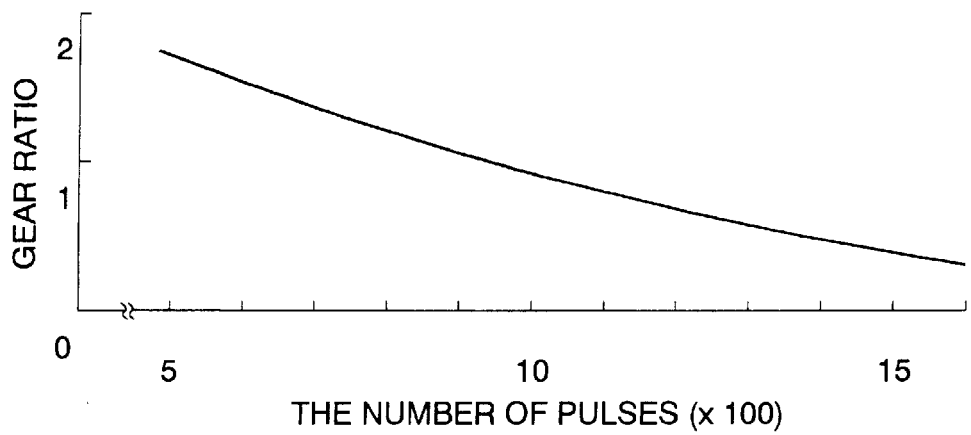
FIG. 18 is a characteristic diagram showing the relationship between the number of pulses applied to a stepping motor and gear ratio of the toroidal type continuously variable transmission.

FIG. 18 shows the relationship between pulse number and gear ratio. As apparent from FIG. 18, the gear ratio of the continuously variable transmission mechanism 20, 30 decreases with an increase in the number of pulses.

Figure 19:
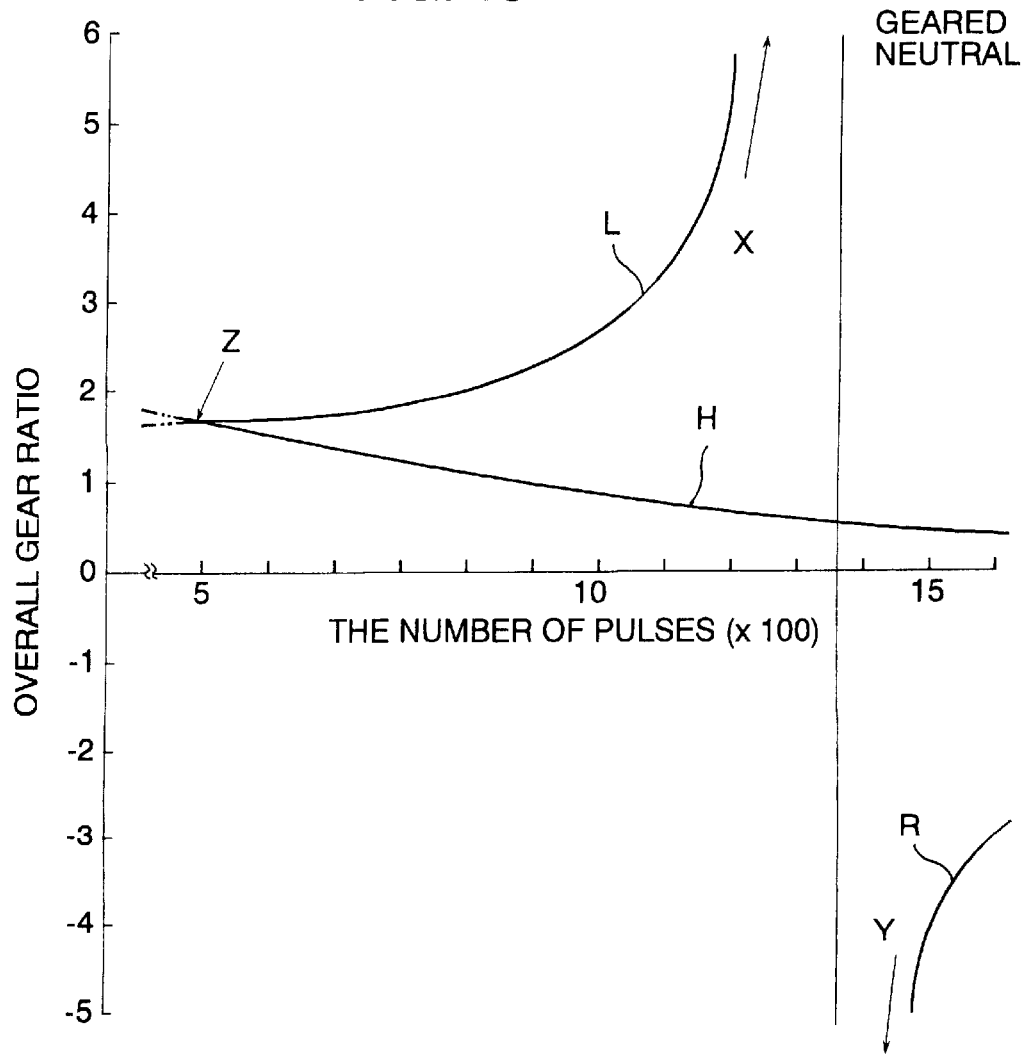
FIG. 19 is a characteristic diagram showing the relationship between the number of pulses applied to a stepping motor and final gear ratio of the toroidal type continuously variable transmission.

FIG. 19 shows the relationship between overall gear ratio and pulse number. While the continuously variable transmission mechanisms 20 and 30 changes their gear ratios according to the numbers of pulses applied to the stepping motors 251 and 261, the continuously variable transmission 10 provides the overall gear ratio differently according to modes, i.e. according to which mode clutch 60 or 70 has been locked. When the continuously variable transmission 10 is placed in the high mode, rotation of the integrated output disk 34 is imparted directly to the secondary shaft 13 through the high mode gear ratio 80 and the high mode clutch 70 locked up. The characteristic curve of overall gear ratio H of the continuously variable transmission 10 relative to the number of pulses agrees with the characteristic curve of gear ratio of the continuously variable transmission mechanism 20, 30 shown in FIG. 18 and, however, these gear ratios of the continuously variable transmission 10 and continuously variable transmission mechanisms 20 and 30 may be different from each other according to the different in diameter or the number of teeth between the first and second gears 91 and 92 of the high mode gear train 90. On the other hand, when the continuously variable transmission 10 is placed in the low mode, while rotation of the engine 1 is imparted to the pinion carrier 51 of the planetary gear set 50 from the input shaft 11 through the low mode gear train 80 and the low mode clutch 60 locked up, rotation of the integrated output disk 34 is imparted to the sun gear 90 of the planetary gear set 50 through the high mode gear train 80. The planetary gear set 50 holds the internal gear 53, which is a transmission output gear, at a rotational speed of zero by controlling the continuously variable transmission mechanisms 20 and 30 to provide a specified ratio of rotation speeds between the pinion carrier 51 and sun gear 52, placing the continuously variable transmission 10 in the geared neutral state. At this time, while the overall gear ratio increases infinitely as indicated by arrows P and Q in FIG. 19, when the number of pulses to the stepping motor 251 is decreased with an intention to start the vehicle to move forward, the continuously variable transmission mechanisms 20 and 30 are forced to increase their gear ratios so as to drop the speed of rotation imparted to the sun gear 52 of the planetary gear set 50, as a result of which the planetary gear 50 permits the internal gear 53 to start to rotate in the forward direction. In this way, the continuously variable transmission 10 reduces its overall gear ratio, providing the low mode in the drive (D) range where the overall gear ratio varies along the characteristic curve L with a change in the number of pulses. These high and low characteristic curves H and L in the drive (D) range intersect at a toroidal gear ratio of, for example, approximately 1.8 indicated by an arrow R which is provided correspondingly to 500 pulses. Accordingly, the mode is changed over during varying continuously the overall gear ratio of the continuously variable transmission 10 by switching over engagement from one to another between the low and high mode clutches 60 and 70 at the turning gear ratio. On the other hand, when the number of pulses to the stepping motor 252 is increased with an intention to start the vehicle to move back, the continuously variable transmission mechanisms 20 and 30 are forced to reduces their gear ratios so as to rise the speed of rotation imparted to the sun gear 52 of the planetary gear set 50, as a result of which the planetary gear 50 permits the internal gear 53 to start to rotate in the reverse direction. In this way, the continuously variable transmission 10 provides the reverse mode in the drive (D) range where the overall gear ratio increases along the characteristic curve R as the number of pulses increases.

Figure 20:
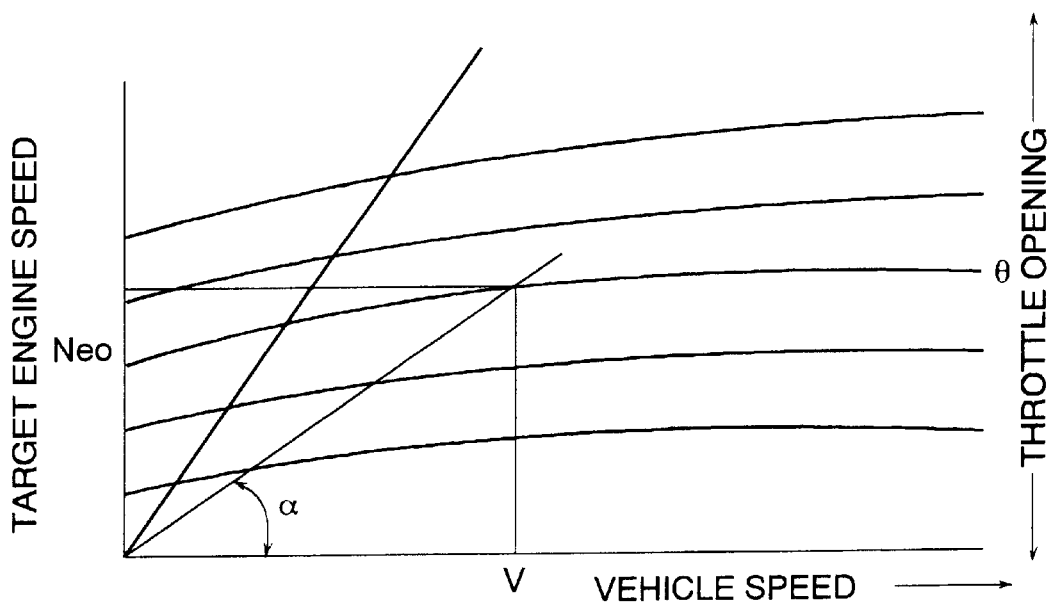
FIG. 20 is a diagrammatic view of an engine speed control map.

The control unit 300 controls the overall gear ratio of the continuously variable transmission 10 based on the characteristic curves according to driving conditions. Specifically, the control unit 300 detects current vehicle speed V and throttle opening θ based on incoming signals from the speed sensor 301 and throttle position sensor 303 to find a target engine speed of rotation Neo from a target engine speed map shown in FIG. 20. Pulsing control of the first or second stepping motor 251 or 252 and locking and unlocking control of the mode clutches 60 and 70 so that the continuously variable transmission provides an overall gear ratio (which is represented by an angle α in FIG. 20) corresponding to the target engine speed of rotation Neo on the basis of the overall gear ratio control curve L, H or R. The valve sleeve 222 of the forward shift valve 220 is prevented by the stopper ring 255 from shifting toward the left end position (the higher speed side) beyond the specified position as shown in FIG. 11 and 13. The specified position is set at a neutral position which the valve sleeve 222 occupies in the geared neutral position or a position off toward the right end position (the lower speed side) from the neutral position. Accordingly, it is surly prevented that the forward shift valve 220 occupies a position closer to the speed increasing position than the geared neutral position, as a result of which, the vehicle moves back against the driver's intention to start forward. Similarly, the valve sleeve 232 of the reverse shift valve 220 is prevented by the stopper ring 256 from shifting toward the right end position (the lower speed side) beyond the specified position as shown in FIG. 11 and 14. The specified position is set at a neutral position which the valve sleeve 232 occupies in the geared neutral position or a position off toward the left end position (the higher speed side) from the neutral position. Accordingly, it is surly prevented that the reverse shift valve 220 occupies a position closer to the speed reduction position than the geared neutral position, as a result of which, the vehicle moves forward against the driver's intention to move the vehicle back. As to the forward shift gear 220, if the mode is changed from the low mode to the high mode after the sleeve 222 has shifted to the lower speed side when starting the vehicle forward, a speed change in the high mode is completed before the sleeve 222 reaches the stopper ring 225. While the valve sleeves 220 and 230 may be restricted by deformed shapes thereof, the use of stopper rings 255 and 256 makes contribution to common use of the same shape of sleeves to both forward and reverse shift valves 220 and 230.

For the continuous gear ratio control of the continuously variable transmission mechanisms 20 and 30, the control unit 300 performs the continuous gear ratio control by creating directly the hydraulic pressure difference (ΔP=PH−PL) between the hydraulic pressures PH and PL through control of the relief pressure by the linear solenoid valve 210 (which is hereafter referred to as direct gear ratio control) in addition to controlling the number of pulses applied to the stepping motors 251 and 252 (which is hereafter referred to as double-slider valve gear ratio control).

Figure 21:
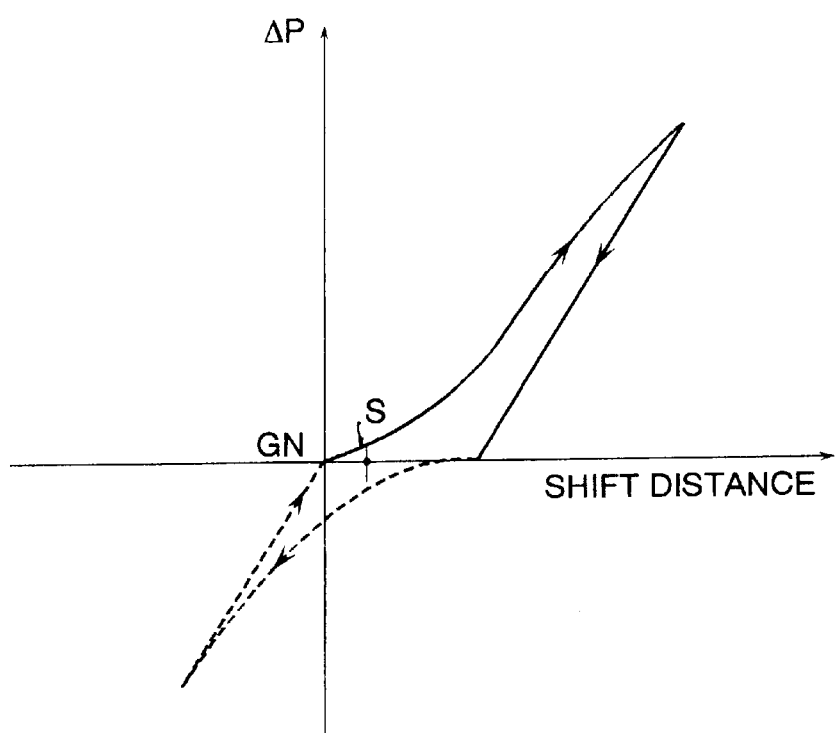
FIG. 21 is an explanatory view showing problems caused by gear shift control by use of the tree-way valve.

The double-slider valve gear ratio control is made on a prerequisite that there is a definite relationship the number of pulses applied to the stepping motor 251, 252, i.e. the shift movement of the sleeve 222, 232, and the hydraulic pressure difference (ΔP=PH−PL) created correspondingly to the shift movement of the sleeve 222, 232. In this case, it is considered that there is caused a hysteresis due to frictional drag between when the sleeve is shifted in a direction in which the hydraulic pressure difference (ΔP=PH−PL) becomes greater and when it is shifted in the opposite direction in which the hydraulic pressure difference (ΔP=PH−PL) becomes smaller as shown in FIG. 21. The hydraulic pressure difference (ΔP=PH−PL) is reversed between the opposite sides of a point S of movement of the sleeve near the geared neutral position due to the hysteresis. Accordingly, rotation is reversed between the forward range and the reverse range. In order to cope with such inexpediency, it is appropriate to create directly the hydraulic pressure difference (ΔP=PH−PL) and supply it to the speed increase and reduction pressure chambers 115 and 116. For this purpose, while the line pressure may be controlled, however, controlling the line pressure is not always favorable because the line pressure is generally controlled in a range between 4 and 16 kg which is too wide to execute precise control of the hydraulic pressure difference (ΔP=PH−PL). Further, the line pressure must be boosted too high to develop a specified hydraulic pressure difference (ΔP=PH−PL) without increasing an oil pump loss. Accordingly, it is more favorable to create the hydraulic pressure difference (ΔP=PH−PL) by dropping the relief pressure which is lower than the line pressure than by dropping the line pressure. Further, the relief pressure is more favorably employed because the range of control of the relief pressure is between 0 and 4 kg which is sufficiently narrow to execute precise control of the hydraulic pressure difference ($\Delta P=PH-PL$).

In the direct gear ratio control, line pressure and relief pressure are directly supplied as the hydraulic pressures PH and PL to the speed increase and reduction pressure chambers 115 and 116, respectively, without being regulated by the forward shift valve 220. When increasing the gear ratio of the continuously variable transmission mechanism 20 under the condition where the sleeve 222 and spool 223 of the forward shift valve 220 remains placed in the neutral position as shown in FIG. 10, the forward shift valve 220 is controlled to shift the sleeve 222 to the left as viewed in FIG. 10 (to the right as viewed in FIGS. 11 and 13) by a specified distance so as to increase the inter-communication openings between the inlet pressure port 224 and the speed decrease pressure port 228 and between the first relief pressure port 225 and the speed increase pressure port 227 and, as a result of which, to supply the line pressure into the speed increase pressure chamber 115 through the pressure line 249 and the relief pressure into the speed reduction pressure chamber 116 through the pressure line 248. In this way, the hydraulic pressure difference ($\Delta P=PH-PL$) between the line pressure and the relief pressure as hydraulic pressures PH and PL, respectively, becomes lower than the tractive force T to incline the roller 23 in the direction in which the speed is reduced. In such a case, the forward shift valve 220 shifts the valve spool 223 to the same direction as the shift direction of the valve sleeve 222 according to the angle of inclination of the roller 23. However, because the shift distance of the roller 23 or the valve spool 223 is determined depending not on the initial shift distance of the valve sleeve 222 but on the hydraulic pressure difference ($\Delta P=PH-PL$), as long as the shift distance of the valve sleeve 222 is previously specified such that the inter-communication between the ports described above remains unchanged even when the valve spool 223 shifts due to inclination of the roller 23 or such that the inter-communication between the ports described above remains unchanged by further shifting the valve sleeve 222 in the specified direction, the gear ratio is directly controlled correspondingly to the hydraulic pressure difference ($\Delta P=PH-PL$) even after the valve spool 223 shifts due to inclination of the roller 23. The direct gear ratio control is effectively executed near the geared neutral position, i.e. during driving at low vehicle speeds, where the double-slider valve gear ratio control is easily affected by hysteresis. Because, in the case of the automatic type which is equipped with a torque converter, creep will occur under driving condition in which the vehicle is traveling at vehicle speeds as low as executing the direct gear ratio control while the idle switch 308 remains turned on, the control unit 300 further performs control that prevents the continuously variable transmission from attaining the geared neutral state which is referred to as creep control. In more detail, the geared neutral state is established resulting from leaving the internal gear 53 of the planetary gear set 50 standing still by holding a specified speed ratio of rotation imparted to the sun gear 52 through the high mode gear train 90 relative to rotation imparted to the pinion carrier 51 through the low mode gear train 80. For creating this condition, either the double-slider gear ratio valve control or the direct gear ratio control is performed to control the toroidal gear ratio in the low mode. However, there is only one speed ratio of rotation between these sun gear 52 and pinion carrier 51, and hence only one toroidal gear ratio, that can provide the geared neutral state in the continuously variable transmission 10, as a result of which the toroidal gear ratio is strictly demanded to be precisely controlled and sometimes deviates to the forward side or the reverse side. Considering that the vehicle restarts after a stand, the vehicle is not started by releasing the brake pedal only and is stand of need of stepping on the accelerator pedal. Accordingly, likely a vehicle having an automatic transmission equipped with a torque converter, it is necessary for smooth start of the vehicle to provide a certain extent of driving force to the vehicle. For example, the toroidal gear ratio is slightly deviated from a gear ratio for providing the geared neutral state so as to produce either forward driving force in the drive (D) range or reverse drive force in the reverse (R) range. The creep control is favorable from operational viewpoint due to a demand for less precision.

As was previously described, the creep control is executed under a condition that the vehicle speed is as low as executing the direct gear ratio control while the idle switch 308 remains turned on. Accordingly, when the vehicle is decelerating resulting from leaving the accelerator pedal released, simultaneously with a changeover from the double-slider valve gear ratio to the direct gear ratio control, the creep control is effected. On the other hand, the vehicle is decelerating in spite of stepping on the accelerator pedal while traveling on an uphill slope, after completion of an ordinary speed change on the basis of a speed change control map in the direct gear ratio control, the creep control starts at a point of time that the accelerator pedal is released and the brake pedal is stepped on. Control is managed such as to hold creep as small as possible during a stand to decrease fuel consumption, to commence the creep control as soon as restarting and to enter the direct gear ratio control as usual in response to stepping on the accelerator pedal. At a point of time that the vehicle gains a specified vehicle speed, the double-slider valve gear ratio control is executed.

Figure 22:
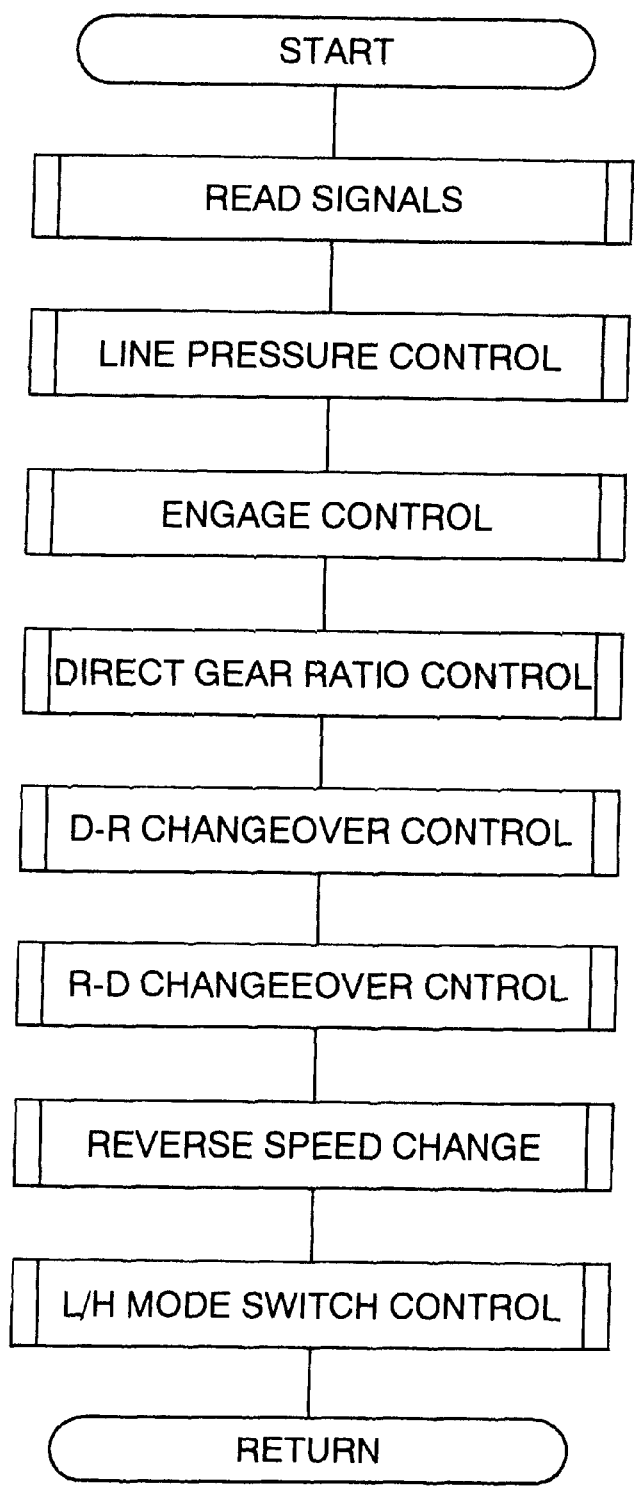
FIG. 22 is a flow chart illustrating a main routine for a microcomputer of the control unit.

FIG. 22 is a flow chart illustrating a main sequence routine of speed change control for a microcomputer of the control units 300. The gear ratio control sequence routine includes various interruption control which are executed independently or in cooperation with other control.

Line Pressure Control

Figure 23:
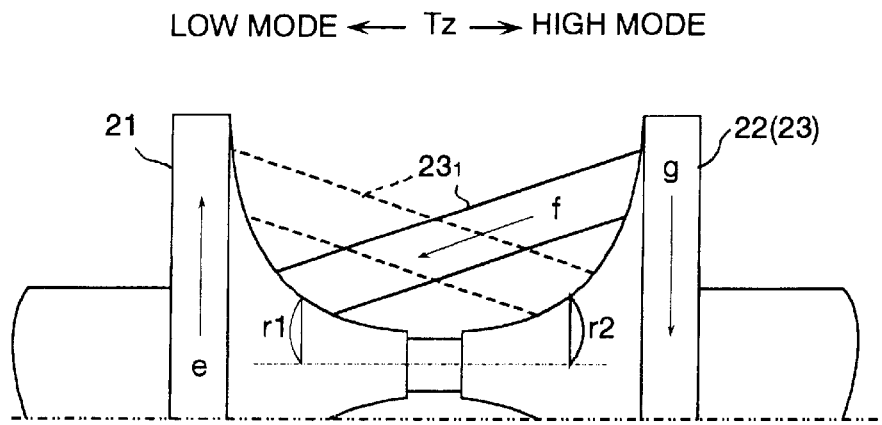
FIG. 23 is an explanatory diagram showing line pressure control by the control unit.

The hydraulic pressure discharged from the oil pump 102 is regulated by the regulator valve 202 accompanied with the linear solenoid valve 209 to a specific level of primary or line pressure. In order to execute the speed change or gear ratio control, the line pressure is, on one hand, supplied directly to the shift valves 220 and 230 and is, on the other hand, further regulated to a specified level of relief pressure which is lower than the line pressure and supplied to the shift valves 220 and 230. These line pressure and relief pressure are used to produce a hydraulic pressure difference ($\Delta P=PH-PL$) which holds the rollers 22 and 33 of the continuously variable transmission mechanisms 20 and 30 placed in the neutral positions against a tractive force T imparted to the rollers 23 and 33 and causes an inclination of the rollers 23 and 33. Accordingly these line pressure and relief pressure must be controlled to vary the hydraulic pressure difference ($\Delta P=PH-PL$) according to a change in the tractive force T. For example, if fixing the relief pressure at a constant level, the line pressure is increased in pressure level to boost the hydraulic pressure difference ($\Delta P=PH-PL$) so as to make the rollers 23 and 33 withstand against an increased tractive force T. Conversely, if fixing the line pressure at a constant level, the relief pressure is increased in pressure level to boost the hydraulic pressure difference ($\Delta P=PH-PL$) so as to make the rollers 23 and 33 withstand against an increased tractive force T. The tractive force T varies depending not only on the magnitude of engine output torque but also on the inclination angle of the rollers 23 and 33. As shown by way of example in FIG. 23, the contact point of the roller $23_1$ with the surface of the input torque 21 is lower when the roller $23_1$ inclines on the lower speed side as a result of execution of the speed change control as shown by a solid line as compared with when the roller $23_1$ inclines on the higher speed side as a result of execution of the speed change control as shown by a broken line (r1<r2). If torque Tz is transmitted to the roller $23_1$ from the input disk 21, both dragging force and reaction force imparted to the roller $23_1$ at the contact point becomes higher even for the same torque Tz. Accordingly, the larger the angle of inclination of the roller $23_1$ toward the lower speed side, the greater the traction force T becomes. The torque transmission to the roller $23_1$ from the input disk 21 occurs in the high (H) mode in which the low mode clutch 60 is released and the high mode clutch 70 is locked. Accordingly, either the line pressure is increased if fixing the relief pressure or the relief pressure is increased if fixing the line pressure so as to increase the hydraulic pressure difference (ΔP=PH−PL) which copes with the traction force T as the gear ratio of the continuously variable transmission mechanisms 20 and 30 (which is otherwise referred to as a toroidal gear ratio) increase.

As shown in FIG. 9, the direction of torque transmission is reversed due to the circulating torque transmitted as reaction force to the continuously variable transmission mechanisms 20 and 30 from the planetary gear set 50 in the low mode as compared with in the high mode. Accordingly, in the low mode, if the roller $23_1$ inclines on the higher speed side as shown by a broken line in FIG. 23, the height r2 of the contact point of the roller $23_1$ with the surface of the output disk 22 becomes lower, reducing the traction force T. Accordingly, either the line pressure is increased if fixing the relief pressure or the relief pressure is increased if fixing the line pressure so as to increase the hydraulic pressure difference (ΔP=PH−PL) which copes with the traction force T as the toroidal gear ratio of the continuously variable transmission mechanisms 20 and 30 decreases.

Figure 24:
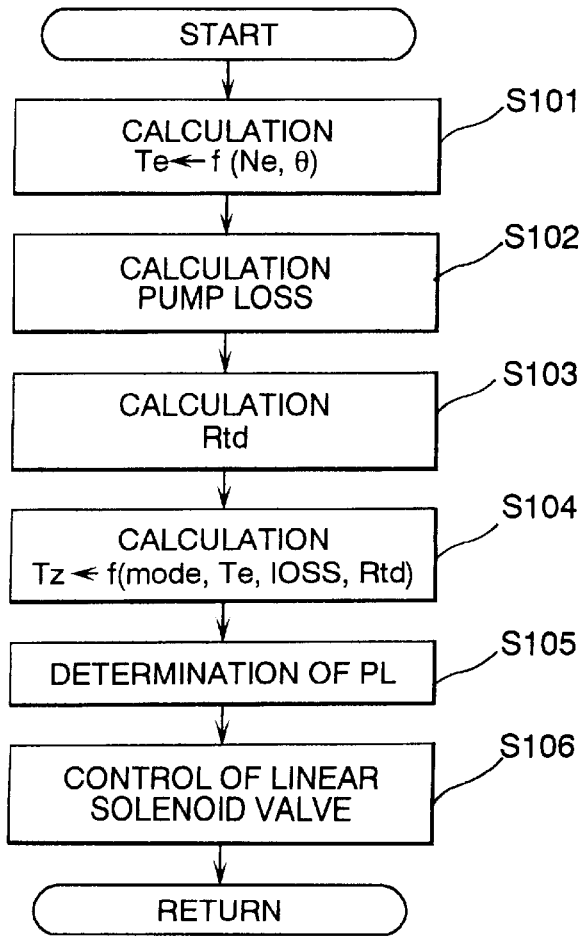
FIG. 24 is a flow chart illustrating a line pressure control sequence routine.
Figure 25:
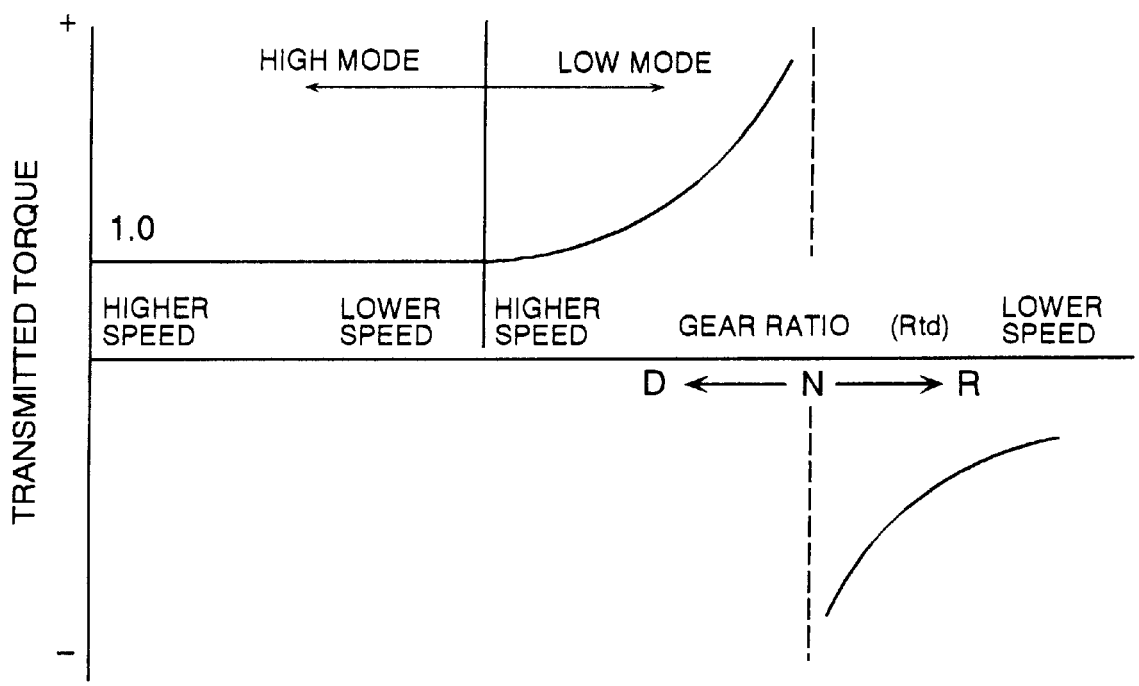
FIG. 25 is a characteristic diagram of transmission torque by the line pressure control.
Figure 26:
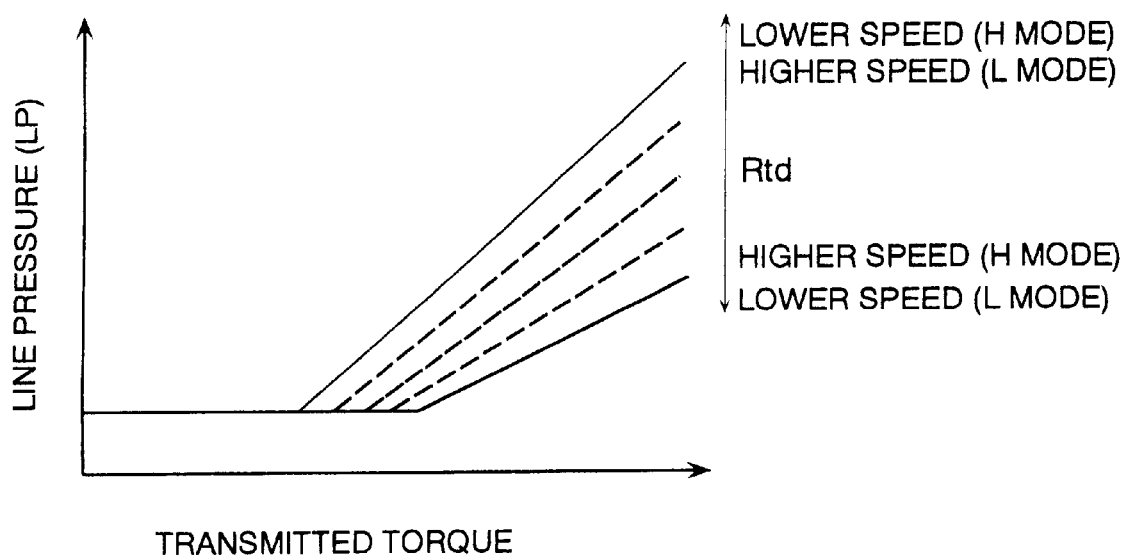
FIG. 26 is a characteristic diagram of line pressure by the line pressure control.

The line pressure is controlled following the flow chart shown in FIG. 24. When the flow chart logic commences, calculations are subsequently made to obtain an engine torque Te calculated based on the incoming signals representing an engine speed Ne and a throttle opening θ at step S101, an oil pump loss at step S102 and a toroidal gear ratio Rtd based on an input speed of rotation to the continuously variable transmission mechanisms 20 and 30 and an output speed of rotation of the continuously variable transmission mechanisms 20 and 30 at step S103. According to these values and selected modes, transmission torque Tz is obtained from a torque map as shown in FIG. 25 at step S104. As shown in FIG. 25, the transmission torque Tz becomes large as the toroidal gear ratio Rtd increases toward the higher speed side in the low mode and, however, is fixed at 1.0 in the high mode. A line pressure PL is obtained based on the transmission torque Tz from a line pressure control map as shown in FIG. 26 at step S105. Finally, at step S106, the linear solenoid valve 209 is driven to develop the line pressure. In the line pressure control map, the line pressure PL is increased for transmission torque Tz greater than a specified critical level so as to oppose tractive force T. Specifically, the line pressure PL is increased in level as the toroidal gear ratio changes on the higher speed side in the low mode and conversely reduced in level as the toroidal gear ratio Rtd changes on the lower speed side in the high mode. In a range of transmission torque Tz lower than the specified critical level is fixed at a specified level, the hydraulic pressure difference (ΔP=PH−PL) is controlled by reducing the relief pressure as the toroidal gear ratio Rtd changes toward the higher speed side in the low mode or reducing it as the toroidal gear ratio Rtd changes toward the lower speed side in the low mode.

Engage Control

Figure 27:
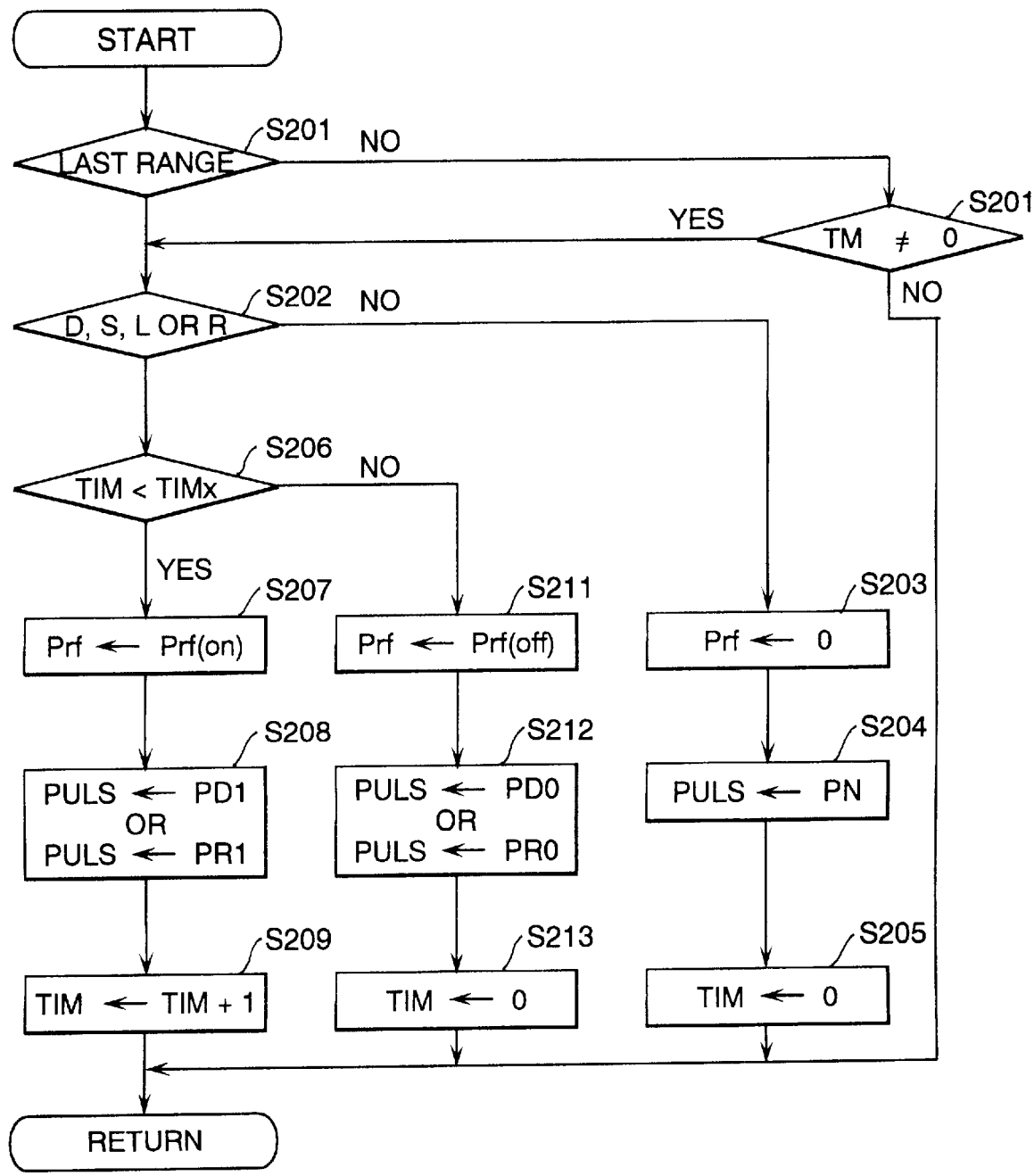
FIG. 27 is a flow chart illustrating an engage control sequence routine for the microcomputer of the control unit.
Figure 28:
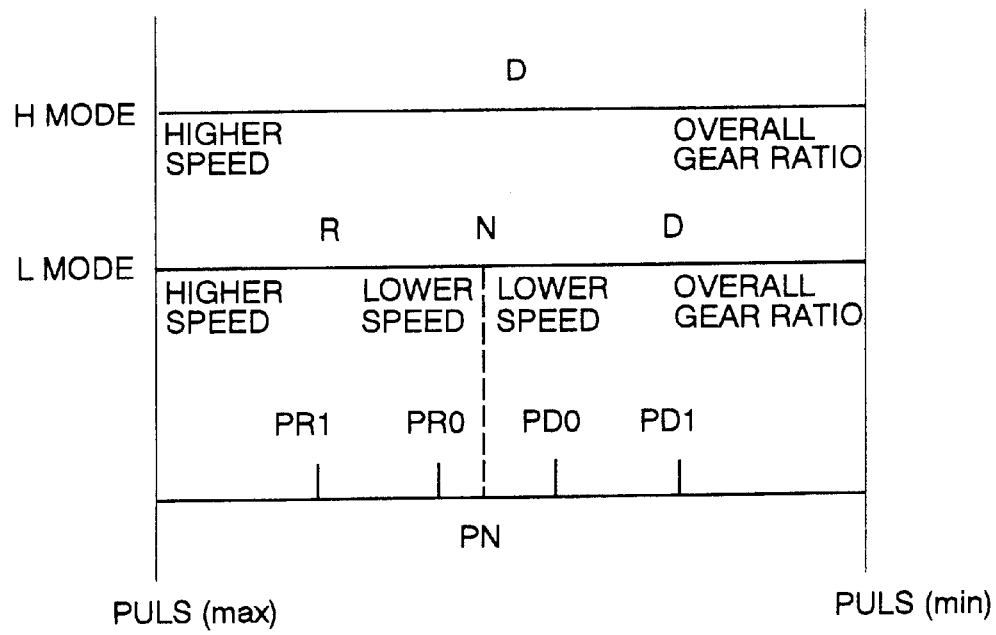
FIG. 28 is a characteristic diagram of gear ratio in the engage control.

As was previously described, the manual shift valve 208 shuts off inter-communication of the main line pressure 201 with the first to third primary output pressure lines 205–207, leaving both low mode clutch 60 and high mode clutch 70 released. When the manual shift valve 208 is operated to select any one of the forward and reverse ranges, the low mode clutch 60 is locked. At this time, when the continuously variable transmission 10 is placed to provide a toroidal gear ratio for creating the geared neutral state, there is no shift shock due to the locking the low mode clutch 60 because there is synchronized rotation between the second gear of the low mode gear train 80 and the pinion carrier 51 of the planetary gear set 50. If the manual shift valve 208 is operated to select the neutral (N) range during running idle or driving at low speeds, engaging between the neutral (N) range and the drive (D) range or between the neutral (N) range and the reverse (R) range is made during execution of the creep control. Because there has not been established the geared neutral state during execution of the creep control, locking the low mode clutch 60 caused a shift shock due to creep. In order to control the shift shock due to locking the low mode clutch 60, the engaging is controlled following the flow chart shown in FIG. 27. When the flow chart logic commences and control proceeds directly to a function block at step S201 where a judgement is made as to whether the neutral (N) range has been selected in the last control sequence. When the answer to the judgement is affirmative, a judgement is made at step S202 as to whether any one of the forward and reverse ranges, namely the drive (D), second (S), low(L) and reverse (R) ranges, is presently selected. If the answer to the judgement is negative, this indicates that the neutral (N) range remains effective, then, after setting the relief pressure Prf to zero at step S203 and the number of pulses PULS for the stepping motor 251 to PN for creating the geared neutral state at step S204, a timer count TIM is reset to zero at step S205. The relief pressure Prf at zero allows the linear solenoid valve 210 to remain inoperative, which is always desirable to reduce power consumption. The number of pulse is changed to PN to return the valve sleeve 222 to the standard position so as to be ready to generate creep in the direct control when another engaging takes place.

When the answer to the judgement made at step S202 is affirmative, a judgement is made at step S206 as to whether the timer count TIM is less than a specified time TIMx necessary to lock the low mode clutch 60. When the answer is affirmative, after setting the relief pressure Prf to a specified relatively high pressure Prf(on) at step S207, the number of pulse PLUS is changed in order to maintain inter-communication between ports of the forward shift valve 220 for execution of the direct gear ratio control at step S208. That is, the number of pulse PULS is changed to PD1 necessary to provide an overall gear ratio on the higher speed side when one of the forward ranges has been selected or to PR1 necessary to provide an overall gear ratio on the higher speed side when the reverse range has been selected. Subsequently, at step S209, the timer count TIM is changed by an increment of one. Before a lapse of the specified time TIMx, the relief pressure Prf is changed to be high so as to decrease the hydraulic pressure difference (ΔP=PH−PL), as a result of which the geared neutral stat is nearly completed to set small creep (output torque). Consequently, a shock during locking the low mode clutch 60 is prevented or significantly reduced in the engage control. After a lapse of the specified time TIMx, the relief pressure Prf is set to a specified relatively low pressure Prf(off) at step S211, the number of pulse PLUS is changed in order to maintain inter-communication between ports of the forward shift valve 220 for execution of the direct gear ratio control at step S212. That is, the number of pulse PULS is changed to PD0 necessary to provide an overall gear ratio on the lower speed side when one of the forward ranges has been selected or to PRO necessary to provide an overall gear ratio on the lower speed side when the reverse range has been selected. Subsequently, at step S213, the timer count TIM is reset to zero. That is, after locking the low mode clutch 60, the relief pressure Prf is reduced with an effect of increasing the hydraulic pressure difference (ΔP=PH−PL) from the line pressure PL. As a result, a large deviation from the geared neutral state is provided to produce high creep (a high output torque).

Direct Gear Ratio Control

While the direct gear ratio control has been described, the control unit 300 performs unique vehicle speed control in particular when the brake pedal is stepped on or during an occurrence of creep.

Figure 29:
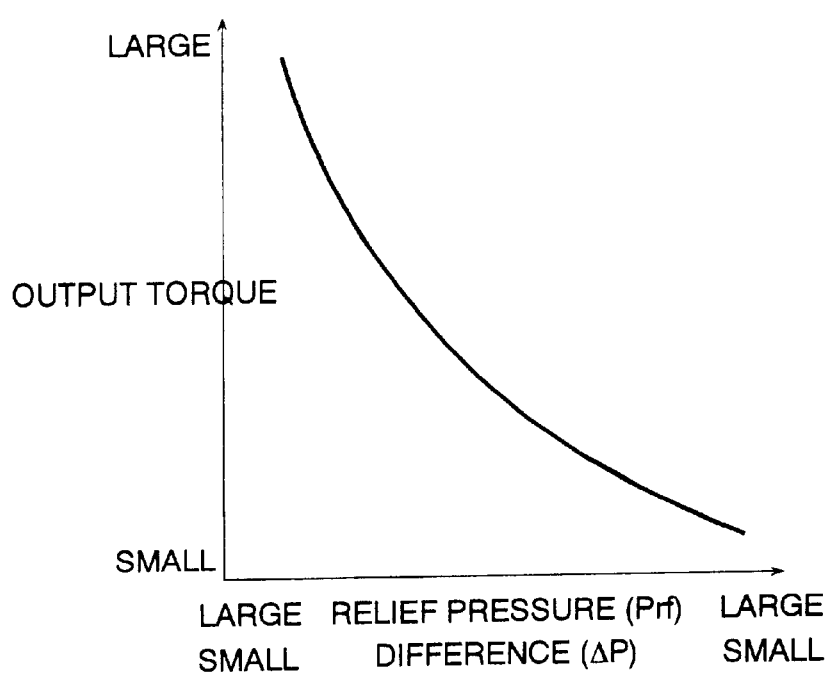
FIG. 29 is a characteristic diagram of the relationship between output torque and relief pressure in the engage control.
Figure 30:
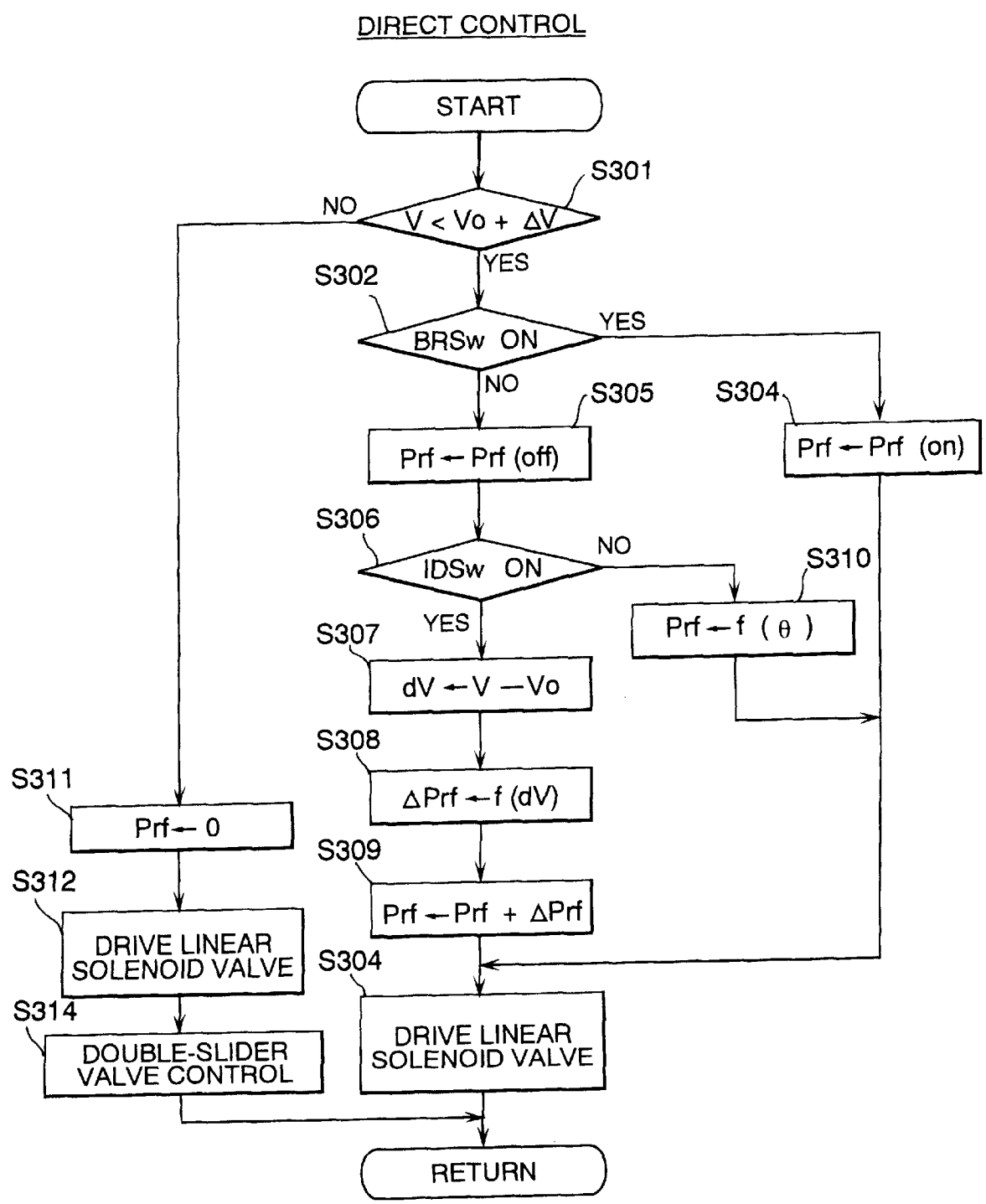
FIG. 30 is a flow chart illustrating a direct control sequence routine for the microcomputer of the control unit.
Figure 31:
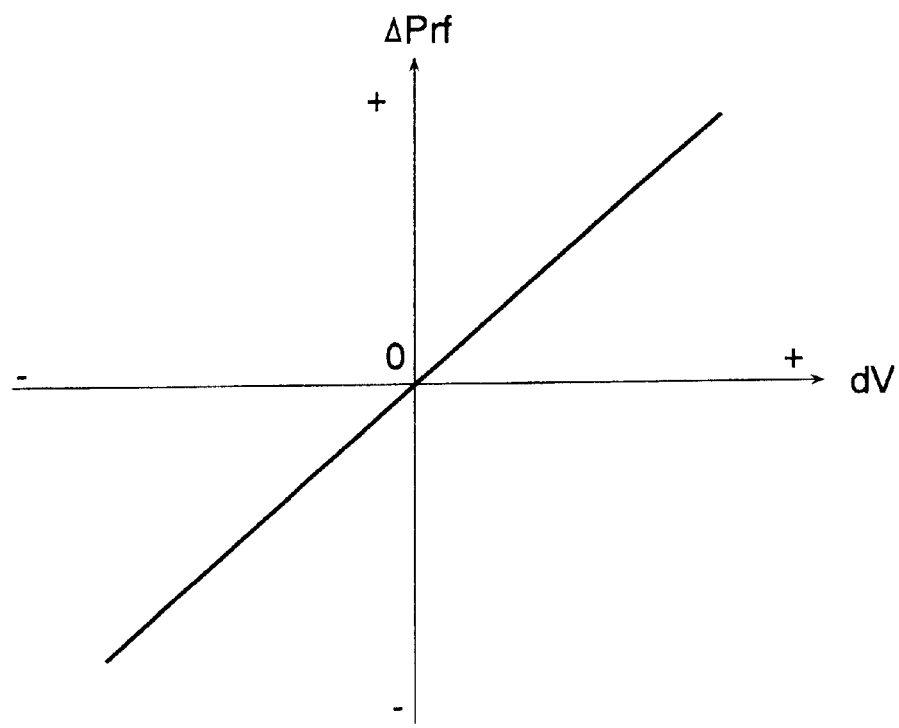
FIG. 31 is a characteristic diagram of relief pressure in the direct control.
Figure 33:
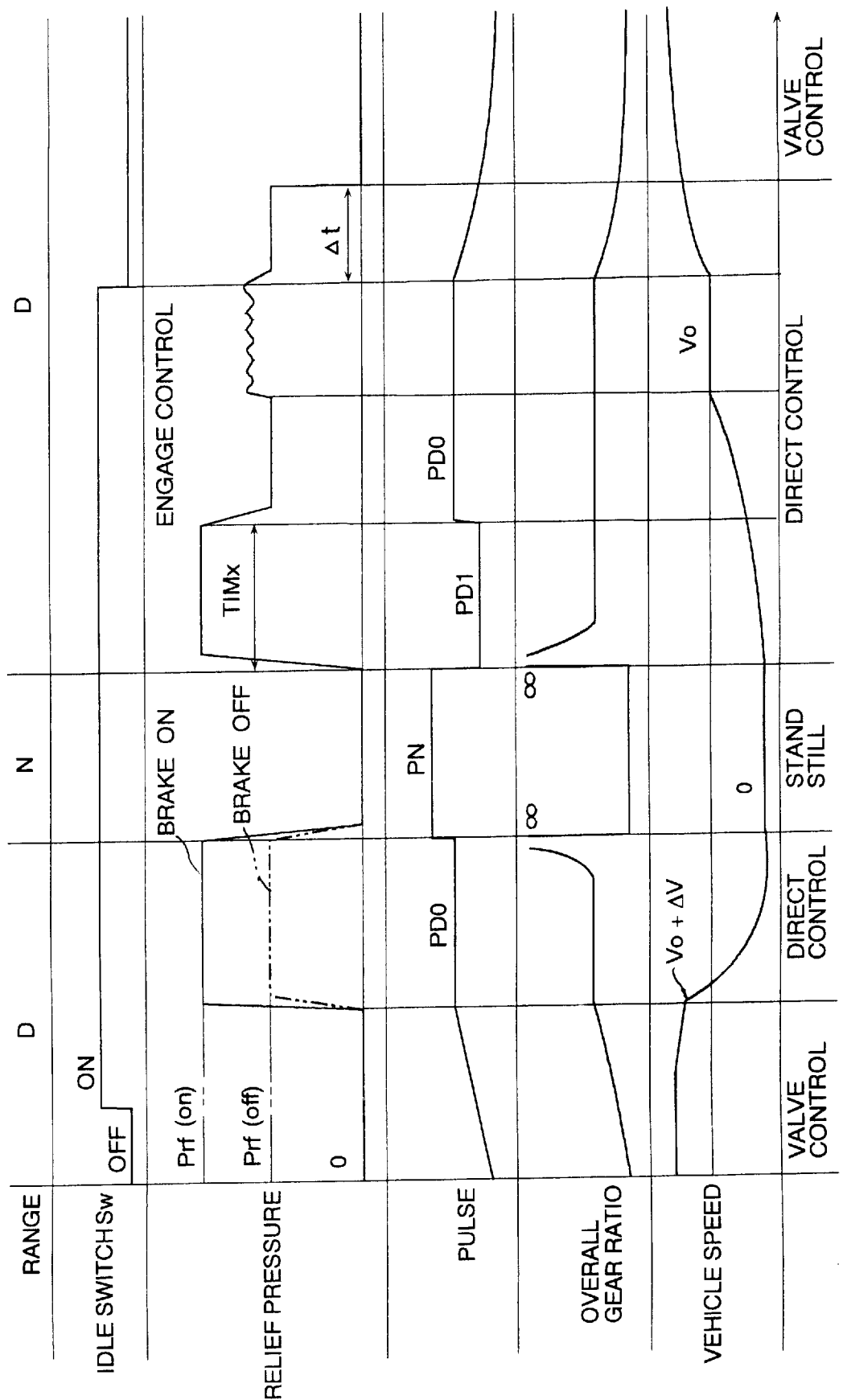
FIG. 33 is a time chart for the engage control and the direct control.

FIG. 30 is a flow chart illustrating the direct gear ratio control sequence routine which is described hereafter with reference to a time chart shown in FIG. 33. When the flow chart logic commences and control proceeds directly to a function block at step S301 where a judgement is made as to whether the current vehicle speed V is lower greater than a target vehicle speed Vo in the creep control by a speed ΔV. When the answer to the judgement is affirmative, then control is switched to the direct gear ratio control from the double-slider valve gear ratio control. Specifically, when it is found at step S302 that the brake switch BRSw 309 is on, at which the idle switch IDSw remains turned on and the creep control has started, the relief pressure Prf is set to the specified relatively high pressure Prf(on) at step S303. Subsequently, the linear solenoid valve 210 is controlled to develop the specified pressure Prf(on) at step S304. This is because deceleration is desired to take place as soon as possible when the brake pedal is stepped on and the relief pressure Prf is therefore increased to drop the creep. On the other hand, the brake switch BRSw 309 remains off, after setting the relief pressure Prf to the specified relatively low pressure Prf(off) at step S305, a judgement is made at step S306 as to whether the idle switch IDSw is on. When the idle switch IDSw is found to be on, after calculating the speed deviation dV of the current vehicle speed V from the target vehicle speed Vo at step S307, a feedback pressure ΔPrf is found according to the speed deviation dV in a feedback pressure map shown in FIG. 29 at step S308. Subsequently, after adding the relief pressure Prf with the feedback pressure ΔPrf at step S309, the linear solenoid valve 210 is controlled to develop the resultant relief pressure Prf at step S304. By this way, the vehicle speed is feedback controlled toward the target vehicle speed Vo without reducing creep while the brake pedal is released. The time chart shown in FIG. 33 explains the feedback control of vehicle speed to the target vehicle speed during a period from a stand to a restart performed in the direct gear ratio control. The reason why the critical vehicle speed greater by the speed dV than the target vehicle speed Vo is provided as the condition for commencing the direct gear ratio control is to prevent a changeover to the double-slider valve gear ratio control due to over-shooting of the vehicle speed during the feedback control.

Figure 32:
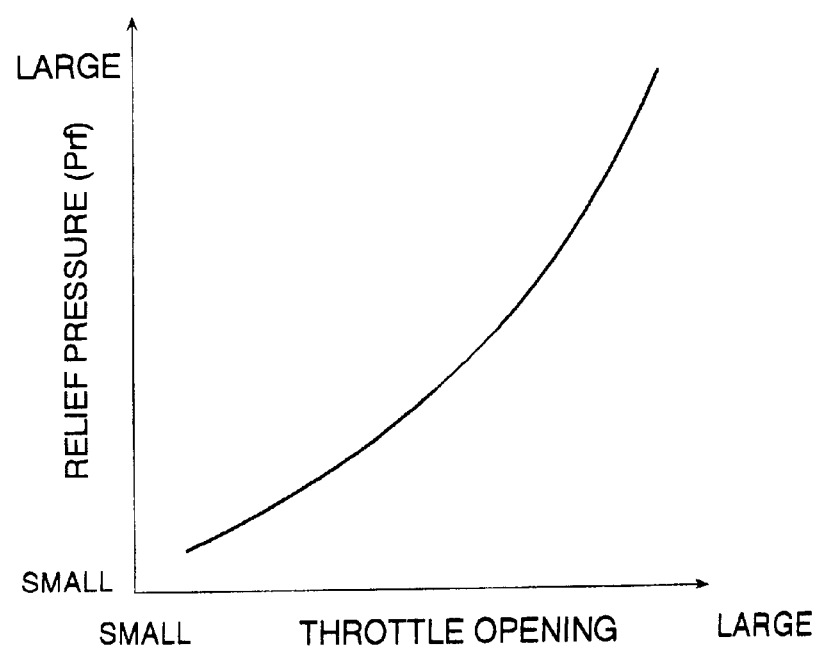
FIG. 32 is a characteristic diagram of the relationship between relief pressure and throttle position in the engage control.

When the idle switch IDSw 308 remains turned off at step S306, this indicates that the accelerator pedal is stepped on, then, after determining the relief pressure Prf according to the throttle opening θ at step S410, the linear solenoid valve 210 is controlled to develop the resultant relief pressure Prf at step S304. The relationship between relief pressure Prf and throttle opening θ is shown in FIG. 32. As shown, the relief pressure Prf becomes higher as the throttle opening θ increases. By this way, the creep is reversely proportional to the stepped stroke of the accelerator pedal. In other words, as reaching the geared neutral state with the result of an increase in gear ratio, the engine speed of rotation increases, which is always desirable for good acceleration and a changeover to the double-slider valve gear ratio control.

On the other hand, when the answer to the judgement made at step S301 is negative, this indicates that the vehicle speed V exceeds the critical vehicle speed as the condition for commencing the direct gear ratio control, then, after setting the relief pressure Prf to zero at step S311 and subsequently controlling the linear solenoid valve 210 to develop the relief pressure Prf at step S312, a changeover is made to the double-slider gear ratio control at step S313. The number of pulses supplied to the stepping motor 251 at a changeover between the double-slider gear ratio control and the direct gear ratio control is not always constant. The valve sleeve 222 is shifted to a position to be occupied at the commencement of the direct gear ratio control from a position occupied at the end of the double-slider gear ratio control by increasing the number of pulses to PD0. Similarly, the valve sleeve 222 is shifted to a position to be occupied at the commencement of the double-slider gear ratio control from a position occupied at the end of the direct gear ratio control by reducing the number of pulses PD0.

In the direct gear ratio control, when the brake switch BRSw 309 is found to be on at step S302, the relief pressure Prf is increased to reduce creep. However, in the event where the vehicle stops on a slope such as an uphill slop, if the creep is reduced in immediate response to turning on of the brake switch BRSw 306, the vehicle is possibly pulled back due to a drop in forward driving force. For this reason, the control unit 300 performs a secondary direct gear ratio control as shown in FIG. 34.

Figure 34:
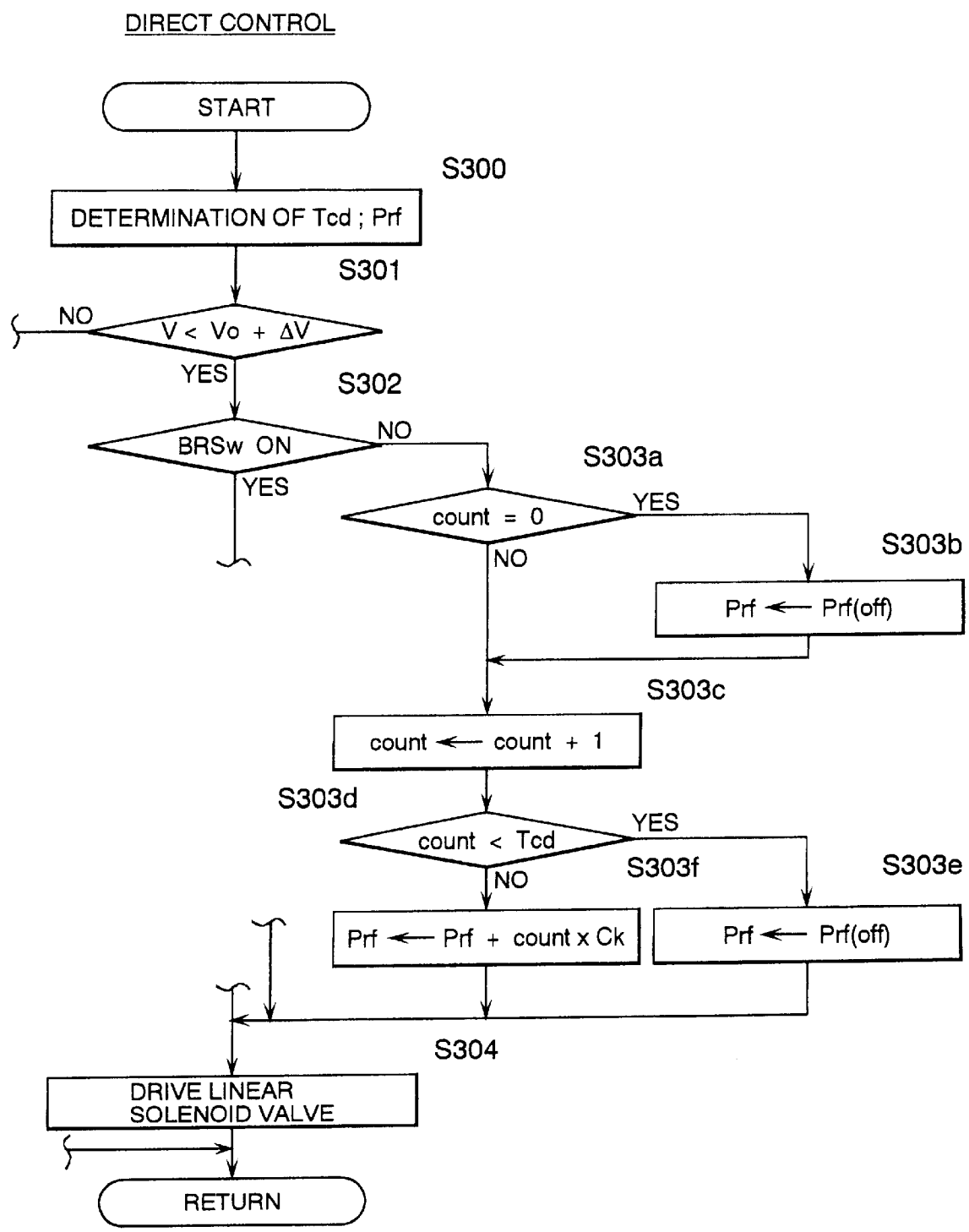
FIG. 34 a flow chart illustrating another direct control sequence routine for the microcomputer of the control unit.
Figures 35, 36:
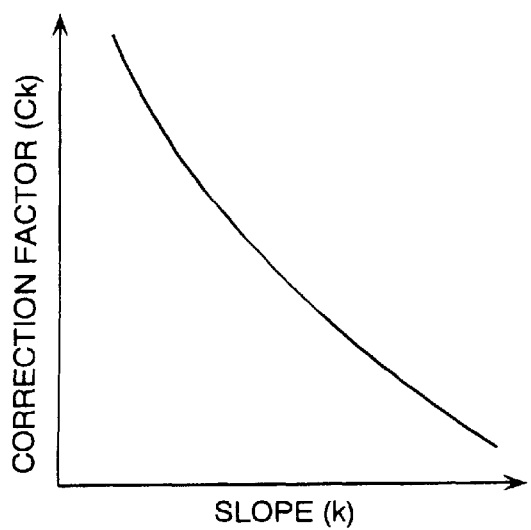
FIG. 35 is a characteristic diagram of gradient in the other direct control.
FIG. 36 is a characteristic diagram of the relationship between gradient and correction factor in the other direct control.
Figure 37:
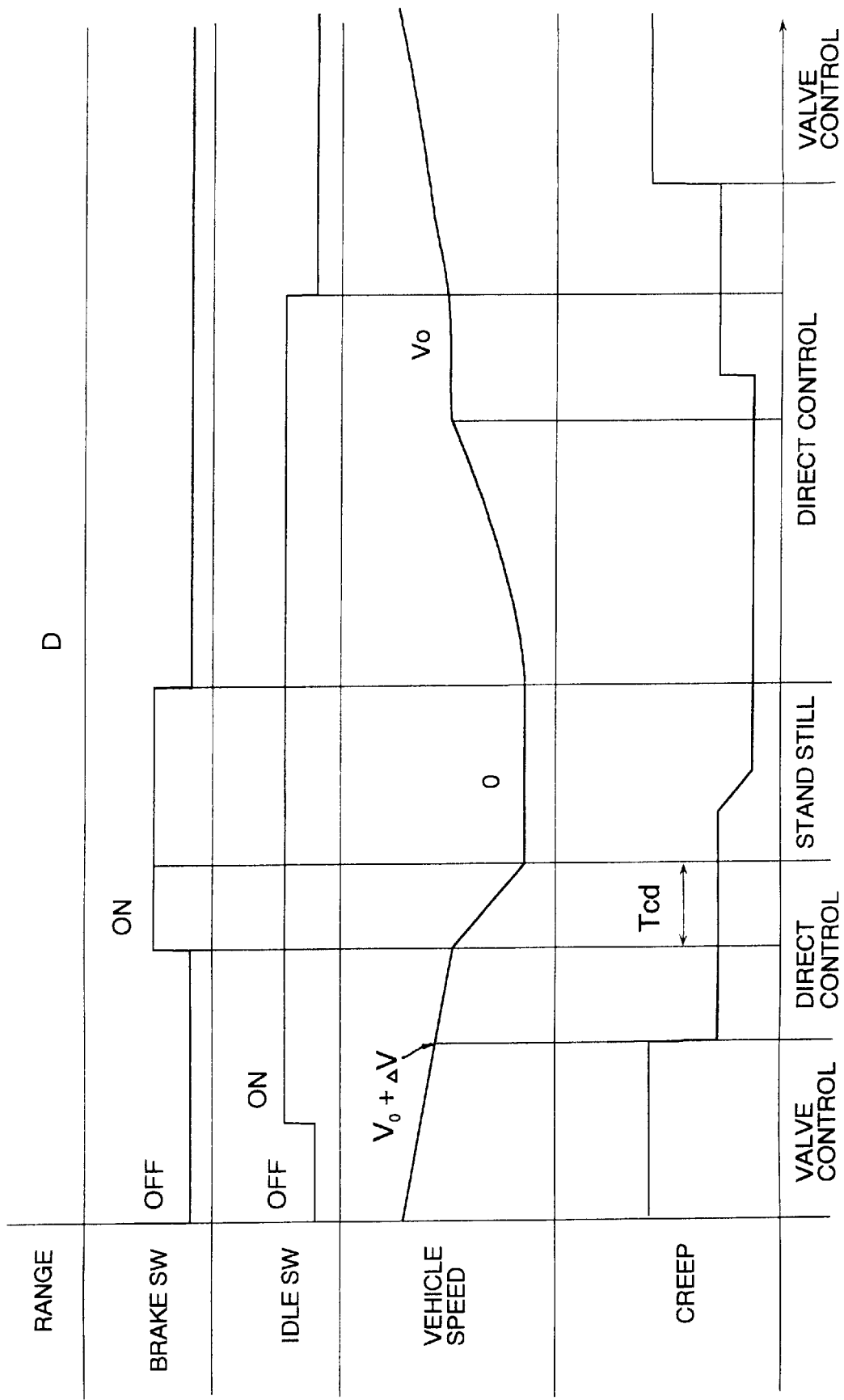
FIG. 37 is a time chart for the other direct control.

FIGS. 34 and 37 show a flow chart illustrating the secondary direct gear ratio control sequence routine and a time chart of the secondary direct gear ratio control. In the flow chart, steps S300 and S303a through 303f are added to the steps of the direct gear ratio control illustrated by the flow chart shown in FIG. 30. When the flow chart logic commences and control proceeds directly to a function block at step S300, before making the judgement concerning satisfaction of the condition for commencement or termination of the direct gear ratio control at step S301, where a delay time Tcd and a relief pressure are determined on the basis of an incoming signal representative a slope K detected by the slope sensor 310. As shown in FIG. 35, the delay time Tcd is set to be longer and the relief pressure Prf is set to be lower as the upgrade becomes steeper. Usual creep is provided at the relief pressure Prf0 for flat roads. When the answer to the judgement is affirmative, this indicates that the vehicle speed V does not gain the critical vehicle speed (Vo+ΔV), then control is switched to the secondary direct gear ratio control. Subsequently, another judgement is made at step S302 as to whether the brake switch BRSw 309 is on. When the answer is affirmative, a judgement is made at step S303a as to whether the counter value count is zero. When the answer to the judgement concerning the timer value count is negative or after setting the relief pressure Prf to the specified relatively low pressure Prf(off) according to the up-slope at step S303b when the answer is affirmative, the counter value count is changed by an increment of 1 (one) at step S303c. Subsequently, a comparison is made between the counter value count and the delay time Tcd determined according to the up-slope at step S303d. When it is within the delay time Tcd, i.e. the counter value count is less than the delay time Tcd, the specified low pressure Prf(off) is maintained at step S303e. On the other hand, when the delay time Tcd is exceeded by the counter value count, the specified low pressure Prf(off) is gradually increased according to the count value count at step S303e. The correction factor Ck is determined based on a correction map shown in FIG. 36. As seen in FIG. 36, the greater the up-slope k becomes, the smaller the correction factor Ck is. That is, the relief pressure Prf is more gently increased, i.e. the creep is gently reduced, as the up-slope k becomes more greater. Finally, the linear solenoid valve 210 is controlled to develop the relief pressure Prf at step S304.

By this control, when the vehicle travels on a steep upgrade, the creep caused after stepping on the brake pedal is great and the delay time which is namely the duration of creep is long. Even when reducing the creep after a lapse of the delay time, the steeper the upgrade is, the more gradual the reduction of creep is. Accordingly, the vehicle is effectively prevented from being pulled back on an upgrade.

Drive Range to Reverse Range Cutback Control

When pulling the vehicle into a garage, it is sometimes happen to shift the continuously variable transmission 10 to the reverse (R) range while moving the vehicle forward slowly, or to the drive (D) range while moving the vehicle back slowly. In such a case, in the continuously variable transmission 10, the manual shift valve 208 passes the neutral (N) position on the way to the drive (D) range position from the reverse (R) range position or vice versa. Because this movement of the manual shift valve 208 is accomplished in a short time, the low mode clutch 60 remains released. While the continuously variable transmission 10 varies the overall gear ratio passing through the geared neutral state, it forces the internal gear 53 of the planetary gear 50 and the secondary shaft 13 to rotate in reversed direction, varying the speed of rotation of the sun gear 52. Shifting the continuously variable transmission 10 in this way needs force as strong as inclining the rollers 23 and 33 with respect to the input and output disks 21, 31 and 34 of the continuously variable transmission mechanisms 20 and 30, as a result of which the rollers and/or the disks are possibly damaged due to slippage occurring therebetween. In order to eliminate a large external load to the continuously variable transmission mechanisms 20 and 30 during the cutback between the drive (D) and reverse (N) ranges, the control unit 300 performs the cutback control shown in FIG. 38.

Figure 38:
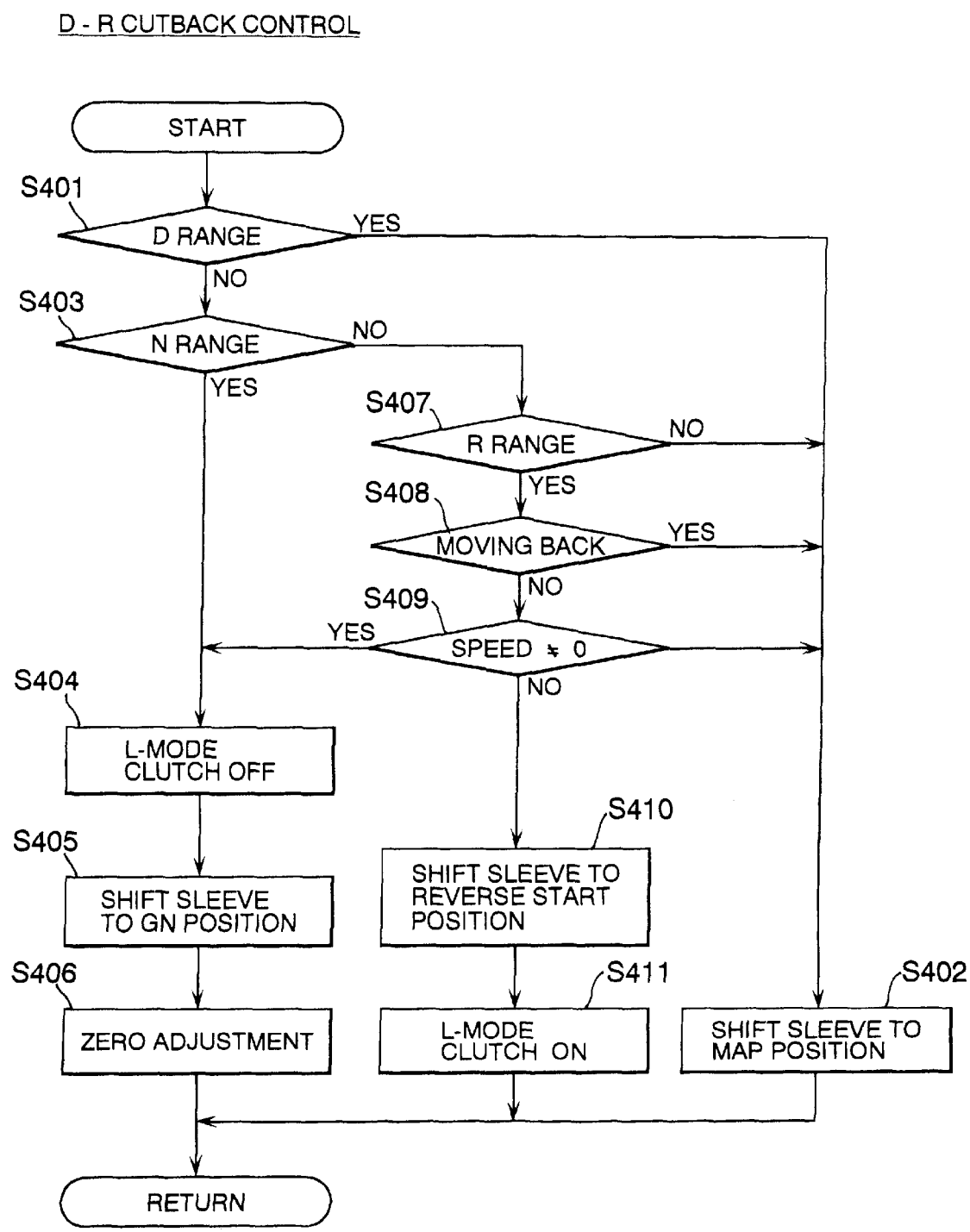
FIG. 38 is a flow chart illustrating a cutback control sequence routine for the microcomputer of the control unit.
Figure 39:
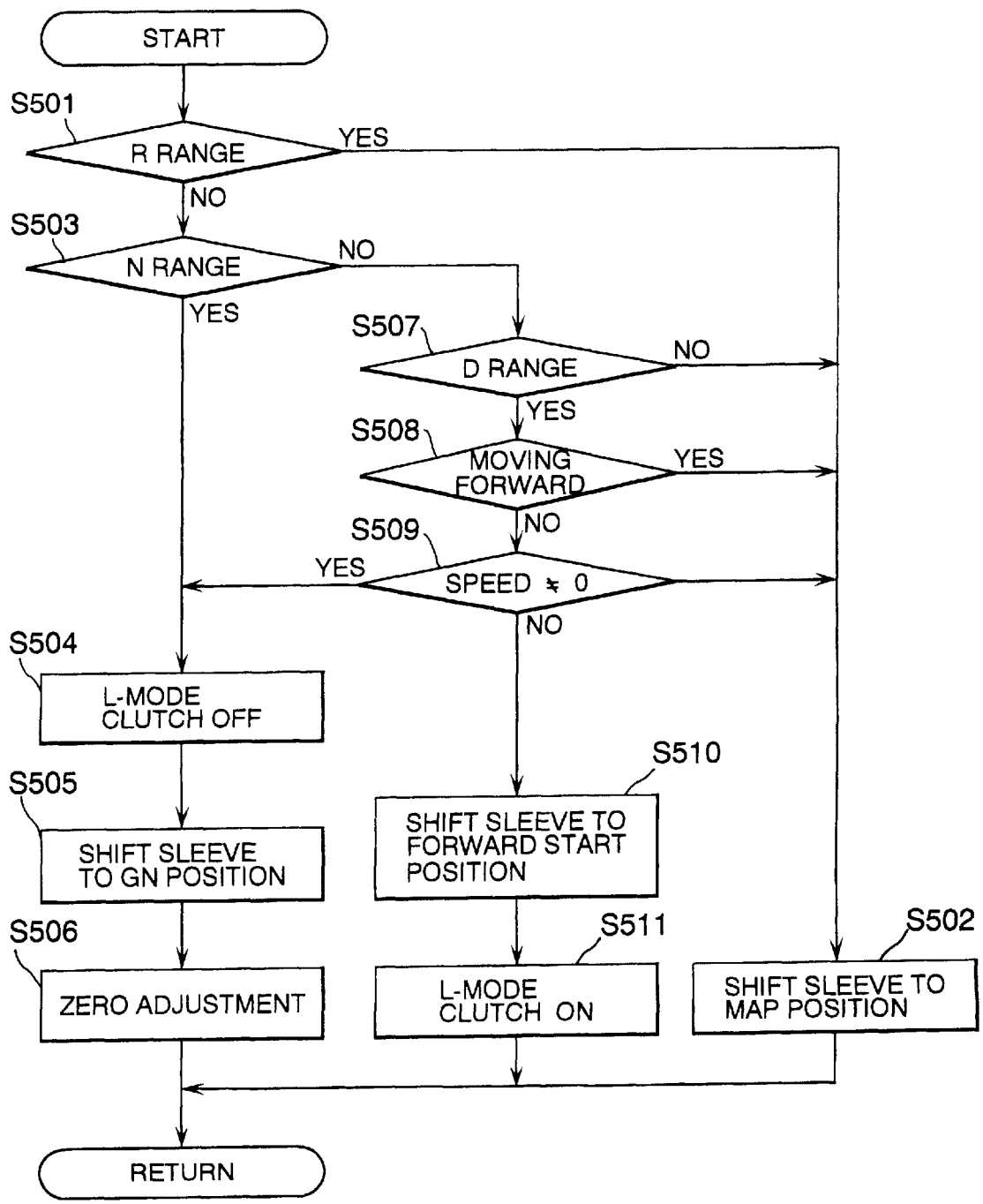
FIG. 39 is a flow chart illustrating another cutback control sequence routine for the microcomputer of the control unit.

Referring to FIG. 38, which shows a flow chart illustrating the drive (D) to reverse (R) range cutback control sequence routine, when the flow chart logic commences and control proceeds directly to a judgement as to a selected gear range of the continuously variable transmission 10 at step S401. When the continuously variable transmission 10 is in the drive (D) range, the double-slider valve gear ratio control is performed based on the scheduled speed change map (shown in FIG. 20) at step S402. When it is judged at step S403 that the continuously variable transmission 10 is not in the drive (D) range but in the neutral (N) range, after releasing the low mode clutch 60 at step S404 and subsequently shifting the valve sleeve 222 of the forward shift valve 220 to a position near the geared neutral position at step S405, an adjustment of zero position of the stepping motor 251 is made at step S406. Because the valve sleeve 222 is hard to be shifted precisely to the geared neutral position, it is shifted to a position as close to the geared neutral position as possible (which is referred to as a home position) at step S405. It is of course to shift the valve sleeve 222 to the geared neutral position if possible. As a result, in the neutral (N) position, while the path of power transmission is disconnected, the valve sleeve 222 of the forward shift valve 220 returns to its home position. For the adjustment of zero position of the stepping motor 251, a calculation is made based on incoming signals from the input and output speed sensors 306 and 307 to find a toroidal gear ratio for the home position of the valve sleeve 222 of the forward shift gear 220. The number of pulses needed to shift the valve sleeve 222 to the home position is taken as a home position pulse number. The calculated toroidal gear ratio and an ideal toroidal gear ratio in the case where the valve sleeve 222 is in the home position are compared with each other. The valve sleeve 222 is shifted to cancel the difference between these two toroidal gear ratios. Shifting the valve sleeve 222 is performed by feed-forward control. The home position pulse number is substituted by the number of pulses at the completion of shifting the valve sleeve 222.

When it is found that the continuously variable transmission 10 is neither in the drive (D) range nor in the neutral (N) range through the judgements made at steps S401 and S403, another judgement is made at step S407 as to whether the continuously variable transmission 10 is in the reverse (R) range. When the answer is negative, this indicates that the continuously variable transmission 10 is either in the second (S) range or in the low (L) range, then, the double-slider valve gear ratio control is performed based on the scheduled speed change map at step S402. On the other hand, the answer to the judgement is affirmative, a judgement is further made at step S408 as to whether the vehicle is moving back. When the vehicle is moving back, the double-slider valve gear ratio control is performed based on the scheduled speed change map at step S402. However, when the answer is negative, another judgement is made at step S409 as to whether the vehicle speed V is not zero. When the answer to the judgement is affirmative, this indicates that the vehicle is moving forward but at a significantly low speed, then the same procedures as taken when the continuously variable transmission 10 is in the neutral (N) range are carried out through steps S404–S406. On the other hand, when the answer to the judgement concerning vehicle speed made at step S409 is negative, this indicates that the vehicle stands still with the continuously variable transmission 10 remaining in the reverse (R) range, then, the forward shift valve 220 is controlled to shift the valve sleeve 220 to a reverse position in which the internal gear 53 of the planetary gear set 50 and the secondary shaft 13 are allowed to rotate in the reverse direction at step S410. Thereafter, the low mode clutch 60 is locked at step S411. In the cutback control, when a cutback to the reverse (R) range is made while the vehicle is moving forward, the forward shift valve 220 is controlled to shift the valve sleeve 222 for reverse movement only after releasing the low mode clutch 60 and confirmation of a standstill, and the low mode clutch 60 is thereafter locked again. Accordingly, the sun gear 52 of the planetary gear set 50 rotates with a small load for a period of time in which the low road clutch 60 remains released. In that period of time, the speed of rotation of the sun gear 52 is varied by inclining the roller 23 of the continuously variable transmission mechanism 20. Because inclining the roller 23 is achieved under a light load, there occurs no slippage between the rollers and disks of the continuously variable transmission mechanisms 20 and 30 as large as causing damages them.

Reverse Range to Drive Range Cutback Control

Referring to FIG. 38, which shows a flow chart illustrating the reverse (R) to drive (D) range cutback control sequence routine, when the flow chart logic commences and control proceeds directly to a judgement as to a selected gear range of the continuously variable transmission 10 at step S501. When the continuously variable transmission 10 is in the reverse (R) range, the double-slider valve gear ratio control is performed based on the scheduled speed change map at step S502. When it is judged at step S503 that the continuously variable transmission 10 is not in the reverse (R) range but in the neutral (N) range, after releasing the low mode clutch 60 at step S504 and subsequently shifting the valve sleeve 222 of the forward shift valve 220 to a position near the geared neutral position at step S505, an adjustment of zero position of the stepping motor 251 is made at step S506. When it is found that the continuously variable transmission 10 is neither in the reverse (R) range nor in the neutral (N) range through the judgements made at steps S501 and S503, another judgement is made at step S507 as to whether the continuously variable transmission 10 is in the drive (D) range. When the answer is negative, this indicates that the continuously variable transmission 10 is either in the second (S) range or in the low (L) range, then, the double-slider valve gear ratio control is performed based on the scheduled speed change map at step S502. On the other hand, the answer to the judgement is affirmative, a judgement is further made at step S508 as to whether the vehicle is moving forward. When the vehicle is moving forward, the double-slider valve gear ratio control is performed based on the scheduled speed change map at step S502. However, when the answer is negative, another judgement is made at step S509 as to whether the vehicle speed V is not zero. When the answer to the judgement is affirmative, this indicates that the vehicle is moving back but at a significantly low speed, then the same procedures as taken when the continuously variable transmission 10 is in the neutral (N) range are carried out through steps S504–S506. On the other hand, when the answer to the judgement concerning vehicle speed made at step S509 is negative, this indicates that the vehicle stands still with the continuously variable transmission 10 remaining in the drive (D) range, then, the forward shift valve 220 is controlled to shift the valve sleeve 220 to a forward position at step S511 and the low mode clutch 60 is thereafter locked again at step S511.

Reverse Speed Change Control

The continuously variable transmission 10 is continuously variable in toroidal gear ratio in reverse and forward drive ranges by varying the speed of rotation of the sun gear 52 of the planetary gear set 50. Varying speed in particular at a start in backing the vehicle up must be carried out with exceptional care.

Figure 40:
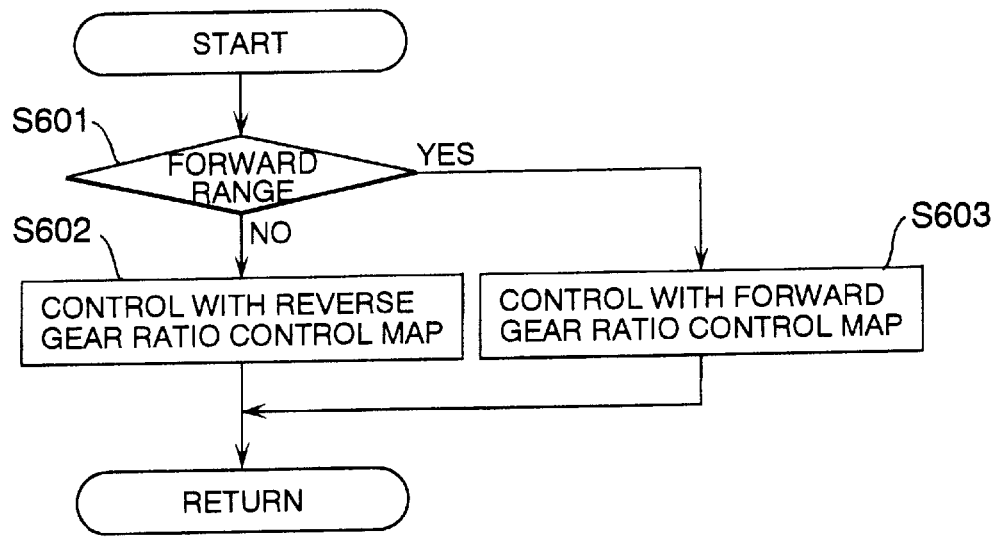
FIG. 40 is a flow chart illustrating a reverse speed change shift control sequence routine for the microcomputer of the control unit.
Figure 41:
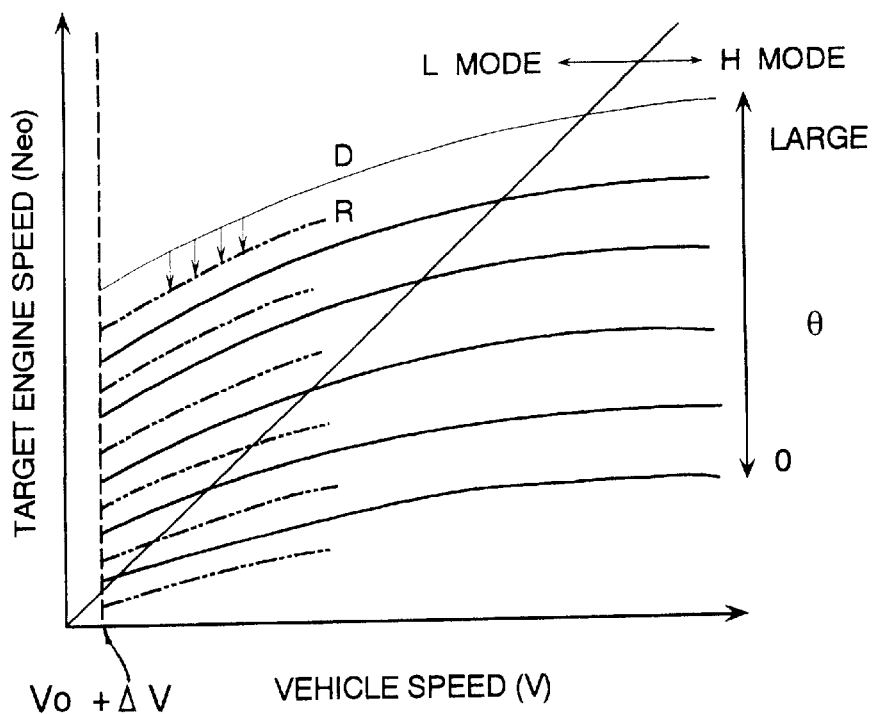
FIG. 41 is a speed change diagram of reverse speed change control.

FIG. 40 shows a flow chart illustrating the reverse speed change control sequence routine. When the flow chart logic commences and control proceeds directly to a judgement at step S601 as to whether the continuously variable transmission 10 is in a forward drive range. When the continuously variable transmission 10 is not in any forward drive range but in the reverse (R) range, the speed change control is performed according to a reverse speed change map shown in FIG. 41 at step S602. On the other hand, when the continuously variable transmission is in the forward drive range, the ordinary forward drive speed change control is performed at step S603. In the reverse speed change control map, the target engine speed Neo is set to be lower for each vehicle speed and throttle opening in the reverse speed change control than that for the same parameters in the forward speed change control map. In other words, the overall gear ratio is shifted toward the higher speed side. With the reverse speed change control, the vehicle is prevented from starting suddenly. This map may be utilized in a range of low vehicle speeds less than a specified speed such as to cause the vehicle to start gently at a strictly limited low speed and to move back at the same overall gear ratios as during forward driving. In FIG. 41, there is no target engine speed Neo for vehicle speeds less than the critical vehicle speed (Vo+ΔV). This is because the creep control is commenced immediately in response to turning on of the idle switch 308 at a changeover to the direct gear ratio control from the three-phrase valve gear ratio control and the ordinary speed change control is not executed for vehicle speeds less than the critical vehicle speed (Vo+ΔV).

Switching Control Between Low Mode and High Mode

Figure 42:
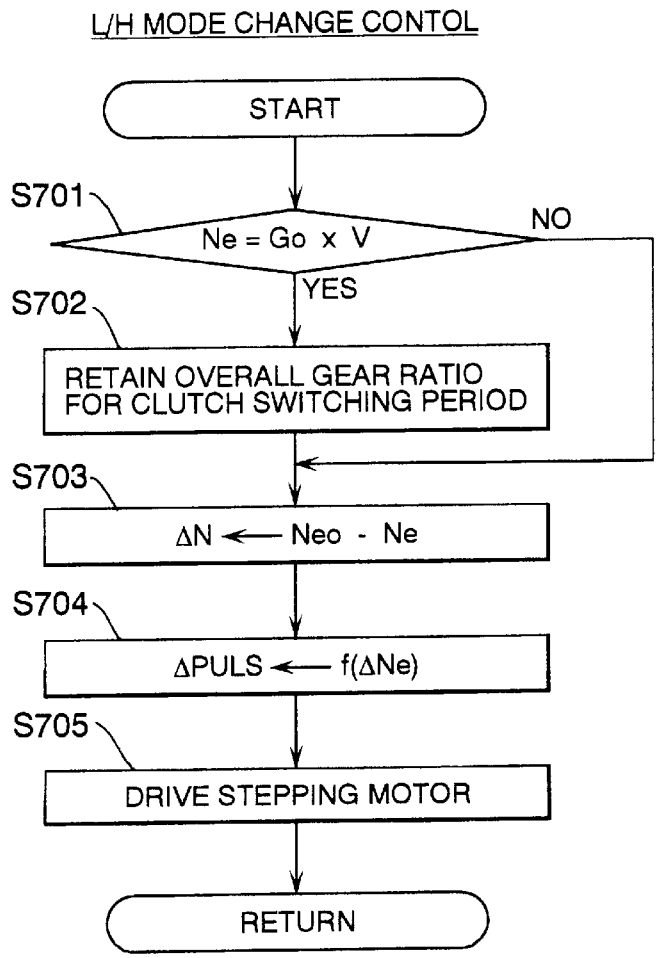
FIG. 42 is a flow chart illustrating a mode switch control sequence routine for the microcomputer of the control unit.

As was previously described with reference to FIG. 19, the high and low characteristic curves H and L in the drive (D) range intersect at a toroidal gear ratio of approximately 1.8 indicated by an arrow R which is provided correspondingly to 500 pulses. This is indicated by a mode changeover line in the control maps shown in FIGS. 20 and 41. As understood from the control maps, the high and low mode clutches 60 and 70 are interchangeably locked at mode changeover toroidal gear ratios identical in both modes, as a result of which an occurrence of a sharp change in gear ratio is prevented and no shift shock is caused. In the event where the interchange of locking the low and high mode clutches 60 and 70 takes a somewhat long time, a sharp change in gear ratio possibly occurs because the driving condition has passed the mode changeover line at the end of a changeover of modes. In order to cope with such a shift shock, the control unit 300 performs the mode changeover control shown in FIG. 42.

Figure 43:
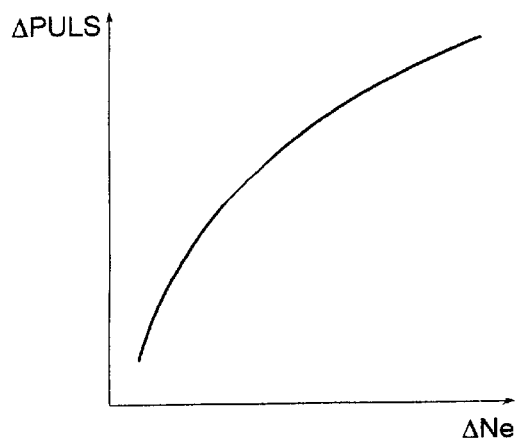
FIG. 43 is a characteristic diagram of the mode switch control.

Referring to FIG. 43, which shows a flow chart illustrating the mode changeover control sequence routine, when the flow chart logic commences and control proceeds directly to a function block at step S701 where a judgement is made as to the current engine speed Ne is nearly equal to a control value obtained by multiplying the mode changeover overall gear ratio Go by the vehicle speed, i.e. whether the current overall gear ratio G is on the mode changeover line. When the answer is affirmative, the toroidal gear ratio is controlled so as to hold keep the current overall gear ratio G unchanged during the interchange of locking between the low and high mode clutches 60 and 70 at step S702. Calculations are subsequently made at steps S703 and 704 to find the speed difference ΔNe of the target engine speed Neo from the current engine speed Ne and to find a feedback variable of pulses ΔPULS from a feedback pulse control map shown in FIG. 43 which defines feedback pulse variable ΔPULS necessary to cancel the speed difference ΔNe, respectively.

Finally, the stepping motor 251 is driven by the feedback pulses ΔPULS. As a result, the forward shift valve 220 is feedback controlled to shift the valve sleeve 222, cancelling the speed difference ΔNe of the engine to fix the overall gear ratio G at a constant value during a mode switch. Accordingly, there occurs no change in gear ratio before and after the mode switch, providing a smooth mode switch without shocks.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for controlling a toroidal type continuously variable transmission for an automotive vehicle which is comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means;

second hydraulic pressure generating means for generating and supplying a second hydraulic pressure lower than said first hydraulic pressure to said first and second hydraulic drive means;

valve means for switching said supply of hydraulic pressure to said first and second hydraulic drive means between said first and second hydraulic pressures;

hydraulic pressure varying means for varying at least one of said first and second hydraulic pressures;

driving condition detecting means for detecting driving conditions of the vehicle including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said transmission ratio when said value indicates that said ratio of rotation is higher than said specified ratio.

2. The toroidal type continuously variable transmission control system as defined in claim 1, wherein said driving condition detecting means detects a vehicle speed of said automotive vehicle as said value, and said control means controls said valve means to vary said transmission ratio when said vehicle speed is higher than a specified speed and controls said hydraulic pressure varying means to vary said transmission ratio when said vehicle speed is lower than said specified ratio.

3. The toroidal type continuously variable transmission control system as defined in claim 1, wherein said valve means is comprised of a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, and slide means received to slide axially in said valve body for bringing selectively said first and second pressure inlet ports into communication with both said first and second pressure outlet ports, said sliding member varying an inter-communication openings between said first and second pressure inlet ports and second pressure outlet ports according to axial position depending on which said ratio of rotation between said drive apparatus and said drive wheels varies.

4. The toroidal type continuously variable transmission control system as defined in claim 3, wherein said slide means is comprised of a first slide member axially movable in said valve body and a second slide member axially movable in said body relative to said first slide member, when said first slide member is moved in one direction to bring selectively said first and second pressure inlet ports into communication with both said first and second pressure outlet ports, said second slide member being moved in the same direction as said one direction following said inclination of said roller to shut off communication between said first and second pressure inlet ports and said first and second pressure outlet ports.

5. The toroidal type continuously variable transmission control system as defined in claim 4, wherein said control means fixes said first movable member at an position where said valve means provides said specified ratio when said value indicates that said ratio of rotation is higher than said specified ratio so as to change operation of said hydraulic pressure varying means, thereby varying said transmission ratio between said input and rotary output disks.

6. The toroidal type continuously variable transmission control system as defined in claim 4, wherein said driving condition detecting means detects a position of said slide means as said value, and said control means controls operation of said valve means to vary said transmission ratio between said input and rotary output disks when said position indicates that said ratio of rotation is lower than said specified ratio and controls operation of said hydraulic pressure varying means to vary said transmission ratio between said input and rotary output disks ratio when said position indicates said position indicates that said ratio of rotation is higher than said specified ratio.

7. The toroidal type continuously variable transmission control system as defined in claim 1, wherein said control means controls said second hydraulic pressure varying means to vary said second hydraulic pressure so as to vary said transmission ratio between said input and rotary output disks ratio when said value indicates said position indicates that said ratio of rotation is higher than said specified ratio.

8. The toroidal type continuously variable transmission control system as defined in claim 7, wherein said driving condition detecting means detects a vehicle speed of said automotive vehicle as said value, and said control means controls said valve means to vary said transmission ratio when said vehicle speed is higher than a specified speed and controls said hydraulic pressure varying means to vary said transmission ratio when said vehicle speed is lower than said specified ratio.

9. The toroidal type continuously variable transmission control system as defined in claim 7, wherein said valve means is comprised of a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, and slide means received to slide axially in said valve body for bringing selectively said first and second pressure inlet ports into communication with both said first and second pressure outlet ports, said sliding member varying an inter-communication openings between said first and second pressure inlet ports and second pressure outlet ports according to axial position depending on which said ratio of rotation between said drive apparatus and said drive wheels varies.

10. The toroidal type continuously variable transmission control system as defined in claim 9, wherein said slide means is comprised of a first slide member axially movable in said valve body and a second slide member axially movable in said body relative to said first slide member, when said first slide member is moved in one direction to bring selectively said first and second pressure inlet ports into communication with both said first and second pressure outlet ports, said second slide member being moved in the same direction as said one direction following said inclination of said roller to shut off communication between said first and second pressure inlet ports and said first and second pressure outlet ports.

11. The toroidal type continuously variable transmission control system as defined in claim 10, wherein said control means fixes said first movable member at an position where said valve means provides said specified ratio when said value indicates that said ratio of rotation is higher than said specified ratio so as to change operation of said hydraulic pressure varying means, thereby varying said transmission ratio between said input and rotary output disks.

12. The toroidal type continuously variable transmission control system as defined in claim 10, wherein said driving condition detecting means detects a position of said slide means as said value, and said control means controls operation of said valve means to vary said transmission ratio between said input and rotary output disks when said position indicates that said ratio of rotation is lower than said specified ratio and controls operation of said hydraulic pressure varying means to vary said transmission ratio between said input and rotary output disks ratio when said position indicates said position indicates that said ratio of rotation is higher than said specified ratio.

13. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means, second hydraulic pressure generating means for generating and supplying a second hydraulic pressure lower than said first hydraulic pressure to said first and second hydraulic drive means, valve means for switching said supply of hydraulic pressure to said first and second hydraulic drive means between said first and second hydraulic pressures, hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said transmission ratio when said value indicates that said ratio of rotation is higher than said specified ratio.

14. The toroidal type continuously variable transmission control system as defined in claim 13, wherein said driving condition detecting means detects a vehicle speed of said automotive vehicle as said value, and said control means controls said valve means to vary said transmission ratio when said vehicle speed is higher than a specified speed and controls said hydraulic pressure varying means to vary said transmission ratio when said vehicle speed is lower than said specified ratio.

15. The toroidal type continuously variable transmission control system as defined in claim 13, wherein said valve means is comprised of a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, and slide means received to slide axially in said valve body for bringing selectively said first and second pressure inlet ports into communication with both said first and second pressure outlet ports, said sliding member varying an inter-communication openings between said first and second pressure inlet ports and second pressure outlet ports according to axial position depending on which said ratio of rotation between said drive apparatus and said drive wheels varies.

16. The toroidal type continuously variable transmission control system as defined in claim 15, wherein said slide means is comprised of a first slide member axially movable in said valve body and a second slide member axially movable in said body relative to said first slide member, when said first slide member is moved in one direction to bring selectively said first and second pressure inlet ports into communication with both said first and second pressure outlet ports, said second slide member being moved in the same direction as said one direction following said inclination of said roller to shut off communication between said first and second pressure inlet ports and said first and second pressure outlet ports.

17. The toroidal type continuously variable transmission control system as defined in claim 16, wherein said control means fixes said first movable member at an position where said valve means provides said specified ratio when said value indicates that said ratio of rotation is higher than said specified ratio so as to change operation of said hydraulic pressure varying means, thereby varying said transmission ratio between said input and rotary output disks.

18. The toroidal type continuously variable transmission control system as defined in claim 16, wherein said driving condition detecting means detects a position of said slide means as said value, and said control means controls operation of said valve means to vary said transmission ratio between said input and rotary output disks when said position indicates that said ratio of rotation is lower than said specified ratio and controls operation of said hydraulic pressure varying means to vary said transmission ratio between said input and rotary output disks ratio when said position indicates said position indicates that said ratio of rotation is higher than said specified ratio.

19. The toroidal type continuously variable transmission control system as defined in claim 13, wherein said control means controls said hydraulic pressure varying means to vary said second hydraulic pressure so as thereby to vary said transmission ratio between said input and rotary output disks ratio when said value indicates said position indicates that said ratio of rotation is higher than said specified ratio.

20. The toroidal type continuously variable transmission control system as defined in claim 19, wherein said driving condition detecting means detects a vehicle speed of said automotive vehicle as said value, and said control means controls said valve means to vary said transmission ratio when said vehicle speed is higher than a specified speed and controls said hydraulic pressure varying means to vary said transmission ratio when said vehicle speed is lower than said specified ratio.

21. The toroidal type continuously variable transmission control system as defined in claim 19, wherein said valve means is comprised of a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, and slide means received to slide axially in said valve body for bringing selectively said first and second pressure inlet ports into communication with both said first and second pressure outlet ports, said sliding member varying an inter-communication openings between said first and second pressure inlet ports and second pressure outlet ports according to axial position depending on which said ratio of rotation between said drive apparatus and said drive wheels varies.

22. The toroidal type continuously variable transmission control system as defined in claim 21, wherein said slide means is comprised of a first slide member axially movable in said valve body and a second slide member axially movable in said body relative to said first slide member, when said first slide member is moved in one direction to bring selectively said first and second pressure inlet ports into communication with both said first and second pressure outlet ports, said second slide member being moved in the same direction as said one direction following said inclination of said roller to shut off communication between said first and second pressure inlet ports and said first and second pressure outlet ports.

23. The toroidal type continuously variable transmission control system as defined in claim 22, wherein said control means fixes said first movable member at an position where said valve means provides said specified ratio when said value indicates that said ratio of rotation is higher than said specified ratio so as to change operation of said hydraulic pressure varying means, thereby varying said transmission ratio between said input and rotary output disks.

24. The toroidal type continuously variable transmission control system as defined in claim 22, wherein said driving condition detecting means detects a position of said slide means as said value, and said control means controls operation of said valve means to vary said transmission ratio between said input and rotary output disks when said position indicates that said ratio of rotation is lower than said specified ratio and controls operation of said hydraulic pressure varying means to vary said transmission ratio between said input and rotary output disks ratio when said position indicates said position indicates that said ratio of rotation is higher than said specified ratio.

25. The toroidal type continuously variable transmission control system as defined in claim 13, wherein said valve means is comprised of a forward valve to operate only while the vehicle moves forward and a reverse valve to operate only while the vehicle moves back.

26. The toroidal type continuously variable transmission control system as defined in claim 13, and further comprising a first switch valve for opening and shutting off a first hydraulic pressure line communicating said forward valve with said first and second hydraulic drive means, a second switch valve for opening and shutting off a hydraulic pressure line communicating said reverse valve with said first and second hydraulic drive means, and changeover means for causing said first switch valve to open said first hydraulic pressure line and said second switch valve to shut off said second hydraulic pressure line when said continuously variable transmission is placed in any one of forward range and causing said first switch valve to shut off said first hydraulic pressure line and said second switch valve to open said second hydraulic pressure line when said continuously variable transmission is placed in a reverse range.

27. The toroidal type continuously variable transmission control system as defined in claim 25, wherein said driving condition detecting means detects a vehicle speed of said automotive vehicle as said value, and said control means controls said valve means to vary said transmission ratio when said vehicle speed is higher than a specified speed and controls said hydraulic pressure varying means to vary said transmission ratio when said vehicle speed is lower than said specified ratio.

28. The toroidal type continuously variable transmission control system as defined in claim 25, wherein said valve means is comprised of a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, and slide means received to slide axially in said valve body for bringing selectively said first and second pressure inlet ports into communication with both said first and second pressure outlet ports, said sliding member varying an inter-communication openings between said first and second pressure inlet ports and second pressure outlet ports according to axial position depending on which said ratio of rotation between said drive apparatus and said drive wheels varies.

29. The toroidal type continuously variable transmission control system as defined in claim 28, wherein said slide means is comprised of a first slide member axially movable in said valve body and a second slide member axially movable in said body relative to said first slide member, when said first slide member is moved in one direction to bring selectively said first and second pressure inlet ports into communication with both said first and second pressure outlet ports, said second slide member being moved in the same direction as said one direction following said inclination of said roller to shut off communication between said first and second pressure inlet ports and said first and second pressure outlet ports.

30. The toroidal type continuously variable transmission control system as defined in claim 29, wherein said control means fixes said first movable member at an position where said valve means provides said specified ratio when said value indicates that said ratio of rotation is higher than said specified ratio so as to change operation of said hydraulic pressure varying means, thereby varying said transmission ratio between said input and rotary output disks.

31. The toroidal type continuously variable transmission control system as defined in claim 29, wherein said driving condition detecting means detects a position of said slide means as said value, and said control means controls operation of said valve means to vary said transmission ratio between said input and rotary output disks when said position indicates that said ratio of rotation is lower than said specified ratio and controls operation of said hydraulic pressure varying means to vary said transmission ratio between said input and rotary output disks ratio when said position indicates said position indicates that said ratio of rotation is higher than said specified ratio.

32. The toroidal type continuously variable transmission control system as defined in claim 29, wherein said valve means is provided with a stopper for restricting movement of said first slide member to a position where the vehicle is allowed to move back.

33. The toroidal type continuously variable transmission control system as defined in claim 25, wherein said control means controls said hydraulic pressure varying means to vary said second hydraulic pressure so as to vary said transmission ratio between said input and rotary output disks ratio when said value indicates said position indicates that said ratio of rotation is higher than said specified ratio.

34. The toroidal type continuously variable transmission control system as defined in claim 33, wherein said driving condition detecting means detects a vehicle speed of said automotive vehicle as said value, and said control means controls said valve means to vary said transmission ratio when said vehicle speed is higher than a specified speed and controls said hydraulic pressure varying means to vary said transmission ratio when said vehicle speed is lower than said specified ratio.

35. The toroidal type continuously variable transmission control system as defined in claim 33, wherein said valve means is comprised of a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, and slide means received to slide axially in said valve body for bringing selectively said first and second pressure inlet ports into communication with both said first and second pressure outlet ports, said sliding member varying an inter-communication openings between said first and second pressure inlet ports and second pressure outlet ports according to axial position depending on which said ratio of rotation between said drive apparatus and said drive wheels varies.

36. The toroidal type continuously variable transmission control system as defined in claim 35, wherein said slide means is comprised of a first slide member axially movable in said valve body and a second slide member axially movable in said body relative to said first slide member, when said first slide member is moved in one direction to bring selectively said first and second pressure inlet ports into communication with both said first and second pressure outlet ports, said second slide member being moved in the same direction as said one direction following said inclination of said roller to shut off communication between said first and second pressure inlet ports and said first and second pressure outlet ports.

37. The toroidal type continuously variable transmission control system as defined in claim 36, wherein said control means fixes said first movable member at an position where said valve means provides said specified ratio when said value indicates that said ratio of rotation is higher than said specified ratio so as to change operation of said hydraulic pressure varying means, thereby varying said transmission ratio between said input and rotary output disks.

38. The toroidal type continuously variable transmission control system as defined in claim 36, wherein said driving condition detecting means detects a position of said slide means as said value, and said control means controls operation of said valve means to vary said transmission ratio between said input and rotary output disks when said position indicates that said ratio of rotation is lower than said specified ratio and controls operation of said hydraulic pressure varying means to vary said transmission ratio between said input and rotary output disks ratio when said position indicates said position indicates that said ratio of rotation is higher than said specified ratio.

39. The toroidal type continuously variable transmission control system as defined in claim 36, wherein said valve means is provided with a stopper for restricting movement of said first slide member to a position where the vehicle is allowed to move back.

40. A control system for controlling a toroidal type continuously variable transmission for an automotive vehicle which is comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means;

second hydraulic pressure generating means for generating and supplying a second hydraulic pressure lower than said first hydraulic pressure to said first and second hydraulic drive means;

valve means for switching said supply of hydraulic pressure to said first and second hydraulic drive means between said first and second hydraulic pressures;

hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said transmission ratio when said value indicates that said ratio of rotation is higher than said specified ratio;

said valve means comprising:

a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means;

a first slide member axially movable in said valve body; and a second slide member axially movable in said body relative to said first slide member, said second slide member being moved in the same direction as one direction, in which said first slide member is moved to bring selectively said first and second pressure inlet ports into communication with both said first and second pressure outlet ports, following said inclination of said roller to shut off communication between said first and second pressure inlet ports and said first and second pressure outlet ports;

said ratio of rotation between said drive apparatus and said drive wheels being varied depending on a relative position between said first and second first and second slide members.

41. A control system for controlling a toroidal type continuously variable transmission for an automotive vehicle which is comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means;

second hydraulic pressure generating means for generating and supplying a second hydraulic pressure lower than said first hydraulic pressure to said first and second hydraulic drive means;

valve means for switching said supply of hydraulic pressure to said first and second hydraulic drive means between said first and second hydraulic pressures;

hydraulic pressure varying means for varying at least one of said first and second hydraulic pressures;

driving condition detecting means for detecting driving conditions of the vehicle including at least a value relating to a ratio of rotation between said drive apparatus and said drive wheels; and a first slide member axially movable in said valve body; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said second hydraulic pressure so as thereby to vary said transmission ratio when said value indicates that said ratio of rotation is higher than said specified ratio.

42. A control system for controlling a toroidal type continuously variable transmission for an automotive vehicle which is comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means;

second hydraulic pressure generating means for generating and supplying a second hydraulic pressure lower than said first hydraulic pressure to said first and second hydraulic drive means;

valve means for switching said supply of hydraulic pressure to said first and second hydraulic drive means between said first and second hydraulic pressures;

hydraulic pressure varying means for varying at least one of said first and second hydraulic pressures;

driving condition detecting means for detecting driving conditions of the vehicle including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said second hydraulic pressure so as thereby to vary said transmission ratio when said value indicates that said ratio of rotation is higher than said specified ratio;

said valve means comprising:

a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means;

a first slide member axially movable in said valve body; and a second slide member axially movable in said body relative to said first slide member, said second slide member being moved in the same direction as one direction, in which said first slide member is moved to bring selectively said first and second pressure inlet ports into communication with both said first and second pressure outlet ports, following said inclination of said roller to shut off communication between said first and second pressure inlet ports and said first and second pressure outlet ports;

said ratio of rotation between said drive apparatus and said drive wheels being varied depending on a relative position between said first and second first and second slide members.

43. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means, second hydraulic pressure generating means for generating and supplying a second hydraulic pressure lower than said first hydraulic pressure to said first and second hydraulic drive means, valve means for switching said supply of hydraulic pressure to said first and second hydraulic drive means between said first and second hydraulic pressures, hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said transmission ratio when said value indicates that said ratio of rotation is higher than said specified ratio;

said valve means comprising:

a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means, said valve means comprising:

a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means;

a first slide member axially movable in said valve body; and a second slide member axially movable in said body relative to said first slide member, said second slide member being moved in the same direction as one direction, in which said first slide member is moved to bring selectively said first and second pressure inlet ports into communication with both said first and second pressure outlet ports, following said inclination of said roller to shut off communication between said first and second pressure inlet ports and said first and second pressure outlet ports;

said ratio of rotation between said drive apparatus and said drive wheels being varied depending on a relative position between said first and second first and second slide members.

44. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means, second hydraulic pressure generating means for generating and supplying a second hydraulic pressure lower than said first hydraulic pressure to said first and second hydraulic drive means, valve means for switching said supply of hydraulic pressure to said first and second hydraulic drive means between said first and second hydraulic pressures, hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said second hydraulic pressure so as thereby to vary said transmission ratio when said value indicates that said ratio of rotation is higher than said specified ratio.

45. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means, second hydraulic pressure generating means for generating and supplying a second hydraulic pressure lower than said first hydraulic pressure to said first and second hydraulic drive means, valve means for switching said supply of hydraulic pressure to said first and second hydraulic drive means between said first and second hydraulic pressures, hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said second hydraulic pressure so as thereby to vary said transmission ratio when said value indicates that said ratio of rotation is higher than said specified ratio;

said valve means comprising:
a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means;

a first slide member axially movable in said valve body; and a second slide member axially movable in said body relative to said first slide member, said second slide member being moved in the same direction as one direction, in which said first slide member is moved to bring selectively said first and second pressure inlet ports into communication with both said first and second pressure outlet ports, following said inclination of said roller to shut off communication between said first and second pressure inlet ports and said first and second pressure outlet ports;

said ratio of rotation between said drive apparatus and said drive wheels being varied depending on a relative position between said first and second first and second slide members.

46. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means;

second hydraulic pressure generating means for generating and supplying a second hydraulic pressure lower than said first hydraulic pressure to said first and second hydraulic drive means;

valve means for switching said supply of hydraulic pressure to said first and second hydraulic drive means between said first and second hydraulic pressures, said valve means comprising a forward valve to operate only while the vehicle moves forward and a reverse valve to operate only while the vehicle moves back;

hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said transmission ratio when said value indicates that said ratio of rotation is higher than said specified ratio.

47. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means, second hydraulic pressure generating means for generating and supplying a second hydraulic pressure lower than said first hydraulic pressure to said first and second hydraulic drive means, valve means, which comprises a forward valve to operate only while the vehicle moves forward and a reverse valve to operate only while the vehicle moves back, for switching said supply of hydraulic pressure to said first and second hydraulic drive means between said first and second hydraulic pressures, hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said transmission ratio when said value indicates that said ratio of rotation is higher than said specified ratio;

each of said forward and reverse valve means comprising:
- a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means;
- a first slide member axially movable in said valve body; and
- a second slide member axially movable in said body relative to said first slide member, said second slide member being moved in the same direction as one direction, in which said first slide member is moved to bring selectively said first and second pressure inlet ports into communication with both said first and second pressure outlet ports, following said inclination of said roller to shut off communication between said first and second pressure inlet ports and said first and second pressure outlet ports;
- said ratio of rotation between said drive apparatus and said drive wheels being varied depending on a relative position between said first and second first and second slide members and said forward valve being provided with a stopper for restricting movement of said first slide member to a position where the vehicle is allowed to move back.

48. A control system for controlling a toroidal type continuously variable transmission for an automotive vehicle which comprises a toroidal CVT mechanism and a gear mechanism which has a first gear element to which output torque from a drive apparatus of the vehicle is transmitted after changed by said toroidal CVT mechanism, a second gear element to which said output torque is directly transmitted without being changed by said toroidal CVT mechanism and a third gear element always meshed with said first and second gear elements through which said output torque is transmitted to drive wheels of the vehicle, said toroidal CVT mechanism being comprised of a rotary input disk having a torus surface and connected to a drive apparatus of the automotive vehicle, a rotary output disk having an torus surface facing said rotary input disk, through which driving force is transmitted to drive wheels of the automotive vehicle, a roller interposed between and in contact with said torus surface of said input and rotary output disks for transmitting rotation to said rotary output disk from said rotary input disk at a variable transmission ratio, a roller support for supporting said roller, said roller support having first hydraulic drive means for hydraulically driving said roller to vary an angle of inclination of said roller with respect to said input and rotary output disks in one direction so as to increase said transmission ratio and second hydraulic drive means for hydraulically driving said roller to vary said angle of inclination of said roller with respect to said input and rotary output disks in another direction so as to decrease said transmission ratio, said control system comprising:

first hydraulic pressure generating means for generating and supplying a first hydraulic pressure to said first and second hydraulic drive means, second hydraulic pressure generating means for generating and supplying a second hydraulic pressure lower than said first hydraulic pressure to said first and second hydraulic drive means, valve means, which comprises a forward valve to operate only while the vehicle moves forward and a reverse valve to operate only while the vehicle moves back, for switching said supply of hydraulic pressure to said first and second hydraulic drive means between said first and second hydraulic pressures, hydraulic pressure varying means for varying at least one of said first and second hydraulic pressures;

driving condition detecting means for detecting driving conditions including at least a value relating to a ratio of rotation between said drive apparatus and said drive wheels; and control means for controlling said valve means and said hydraulic pressure varying means according to said driving conditions to vary said transmission ratio, said control means controlling said valve means to vary said transmission ratio when said value indicates that said ratio of rotation is lower than a specified ratio for low speed control and controlling said hydraulic pressure varying means to vary said second hydraulic pressure so as thereby to vary said transmission ratio when said value indicates that said ratio of rotation is higher than said specified ratio;

each of said forward and reverse valve means comprising:
- a valve body having a first pressure outlet port in communication with said first hydraulic drive means, a second pressure outlet port in communication with said second hydraulic drive means, a first pressure inlet port in communication with said first hydraulic pressure generating means, and a second pressure inlet port in communication with said second hydraulic pressure generating means;
- a first slide member axially movable in said valve body; and
- a second slide member axially movable in said body relative to said first slide member, said second slide member being moved in the same direction as one direction, in which said first slide member is moved to bring selectively said first and second pressure inlet ports into communication with both said first and second pressure outlet ports, following said inclination of said roller to shut off communication between said first and second pressure inlet ports and said first and second pressure outlet ports;
- said ratio of rotation between said drive apparatus and said drive wheels being varied depending on a relative position between said first and second first and second slide members and said forward valve being provided with a stopper for restricting movement of said first slide member to a position where the vehicle is allowed to move back.

* * * * *